United States Patent [19]

Everett, Jr. et al.

[11] Patent Number: 5,111,401

[45] Date of Patent: May 5, 1992

[54] NAVIGATIONAL CONTROL SYSTEM FOR AN AUTONOMOUS VEHICLE

[75] Inventors: Hobart R. Everett, Jr.; Gary A. Gilbreath; Robin T. Laird, all of San Diego, Calif.

[73] Assignee: The United States of America as represented by the Secretary of the Navy, Washington, D.C.

[21] Appl. No.: 531,483

[22] Filed: May 19, 1990

[51] Int. Cl.[5] .......................................... G06F 15/50
[52] U.S. Cl. ............................... 364/424.02; 180/169; 318/568.12
[58] Field of Search ............... 364/424.02, 443; 180/167-169; 318/568.12

[56] References Cited

U.S. PATENT DOCUMENTS

| 4,307,791 | 12/1981 | De Bruine | 180/168 |
|---|---|---|---|
| 4,530,056 | 7/1985 | Mackinnon et al. | 364/424 |
| 4,541,049 | 9/1985 | Ahlbom | 364/424.02 |
| 4,566,032 | 1/1986 | Hirooka et al. | 358/424.02 |
| 4,593,238 | 6/1986 | Yamamoto | 318/587 |
| 4,593,239 | 6/1986 | Yamamoto | 318/587 |
| 4,626,995 | 12/1986 | Lofgren et al. | 364/424 |
| 4,727,492 | 2/1988 | Reeve et al. | 364/424.02 |
| 4,772,875 | 9/1988 | Maddox | 340/522 |
| 4,773,018 | 9/1988 | Lundstrom | 364/443 |
| 4,777,601 | 10/1988 | Boegli | 364/424.02 |
| 4,780,817 | 10/1988 | Lofgren | 364/424.01 |
| 4,790,402 | 12/1988 | Field et al. | 180/169 |
| 4,802,096 | 1/1989 | Hainsworth et al. | 364/461 |
| 4,811,228 | 3/1989 | Hyyppa | 364/424.02 |
| 4,811,229 | 3/1989 | Wilson | 364/424.02 |
| 4,817,000 | 3/1989 | Eberhardt | 364/443 |
| 4,821,192 | 4/1989 | Taivalkoski et al. | 364/424.02 |
| 4,846,297 | 7/1989 | Field et al. | 180/169 |
| 4,857,912 | 8/1989 | Everett, Jr. et al. | 340/825.3 |
| 4,858,132 | 8/1989 | Holmquist | 364/424.02 |
| 4,860,209 | 8/1989 | Sugimoto et al. | 364/424.02 |
| 4,862,373 | 8/1989 | Meng | 364/444 |
| 4,954,962 | 9/1990 | Evans, Jr. et al. | 364/513 |
| 4,982,329 | 1/1991 | Tabata et al. | 364/424.02 |

OTHER PUBLICATIONS

Technical Document No. 1450, Naval Ocean Systems Center, Jan. 1989 titled "A Robotic Security Test Bed" by H. R. Everett et al.

Primary Examiner—Thomas G. Black
Attorney, Agent, or Firm—Harvey Fendelman; Thomas Glenn Keough; Michael A. Kagan

[57] ABSTRACT

A navigational control system directs an autonomous vehicle to travel along a floor from a first location to a destination within an environment, and includes a propulsion module having a processor that receives navigation control signals for directing the motion of the module and provides position signals. At least one reflective, encoded stripe is applied to the floor of the environment. If stripe detecting means, mounted to the module, detects the stripe, recognition signals are provided. Ranging means mounted to the module measures the range between the vehicle and any object within a predetermined distance of the vehicle. A host computer determine an initial path for the vehicle to follow in order to reach the destination; provides the navigation control signals to the processor; receives data from the processor for determining an estimated dead-reckoning position of the vehicle; and receives the recognition signals for directing the vehicle to follow the stripe if any of the coordinates of the stripe are coincident with the coordinates of the initial path. The position estimation of the vehicle is updated by the host computer as the vehicles travels along the initial path. The updated position is functionally related to the coordinates of the detected region of the stripe and to the estimated dead-reckoning position. If the ranging means measures an obstruction blocking the initial path, the module is directed to avoid the obstruction.

23 Claims, 35 Drawing Sheets

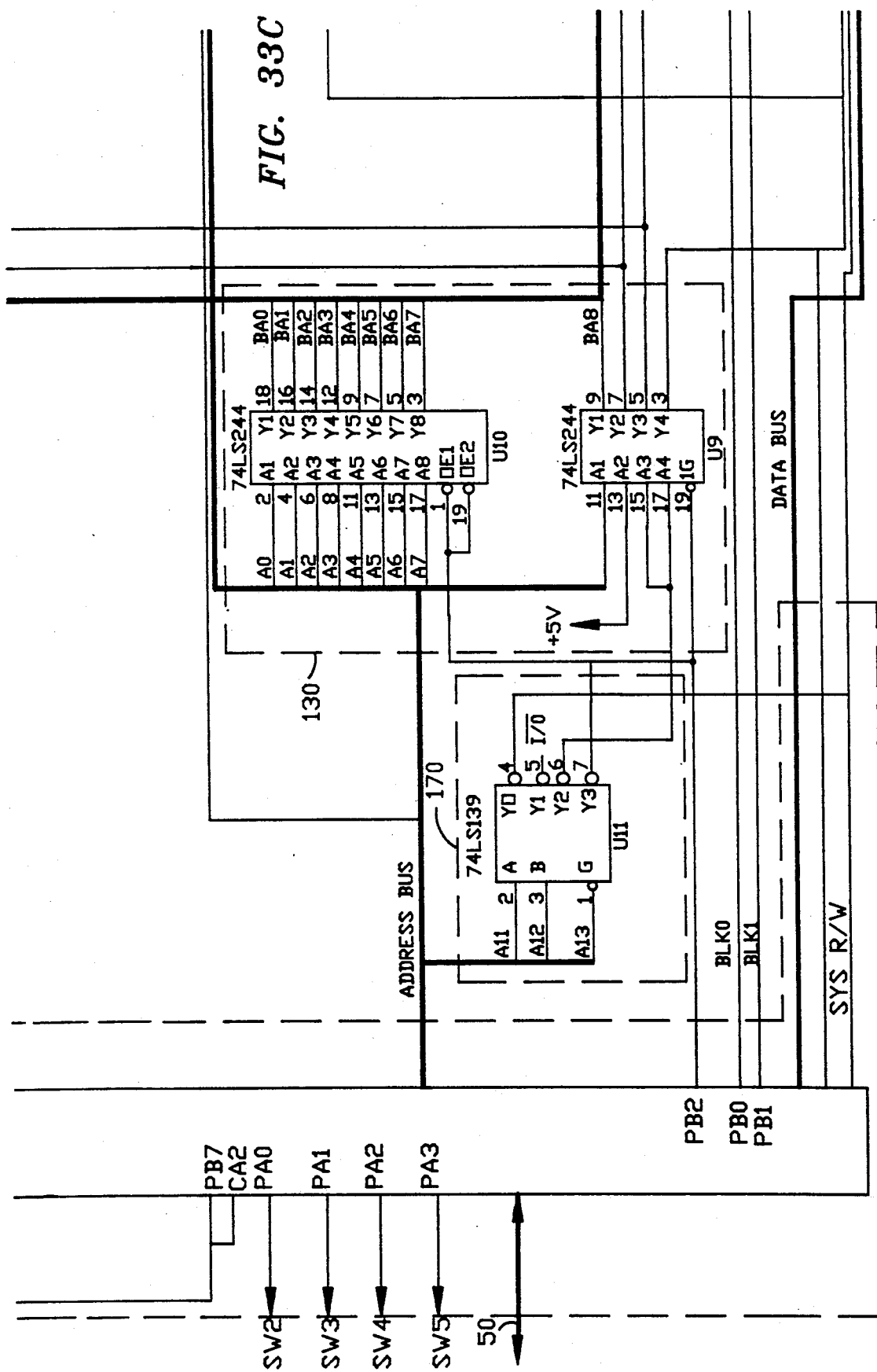

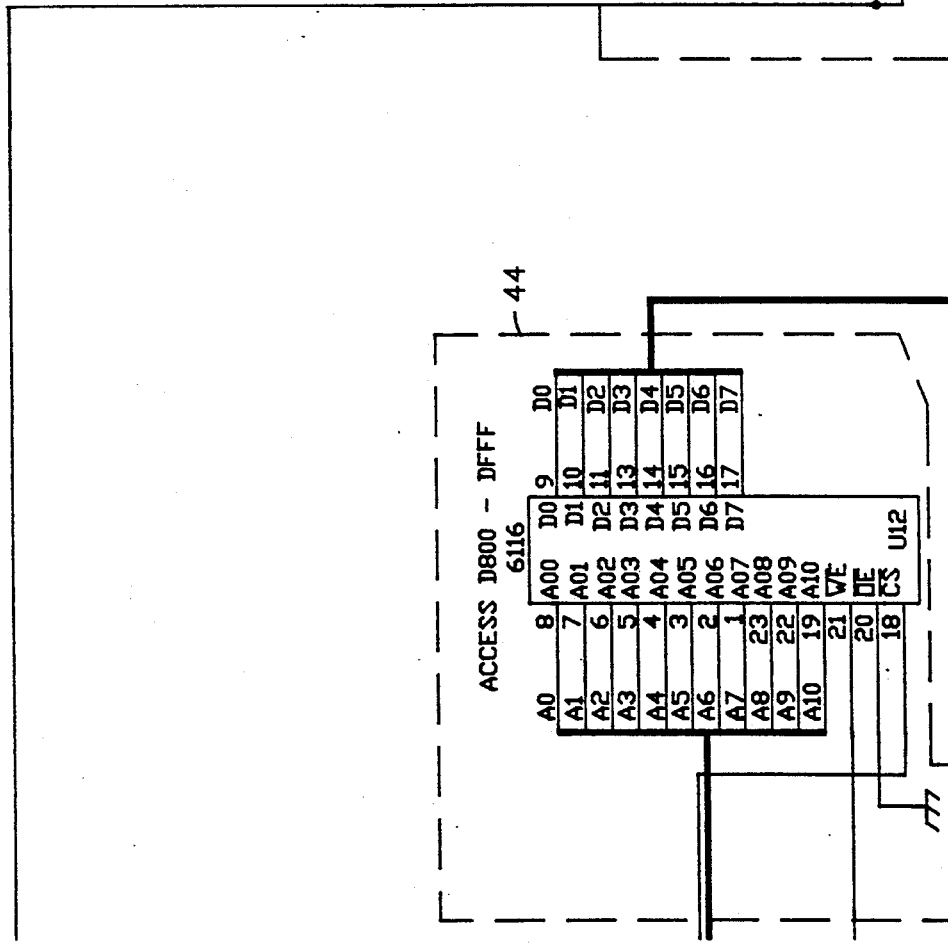

NAVIGATIONAL CONTROL SYSTEM FOR AN AUTONOMOUS VEHICLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the field of robotics and automated guided vehicles. More particularly, the present invention relates to a navigational control system for autonomous vehicles.

The ultimate goal of a robotic system is to perform some useful function in place of a human counterpart. Benefits typically associated with the installation of fixed-location industrial robots are improved operational effectiveness, higher quality, reductions in manpower, greater efficiency, reliability, and cost savings. Additionally, robots perform tasks for which humans are incapable or ill-suited, and can operate in environments which are dangerous to humans.

The concept of mobility has always suggested an additional range of applications beyond that of the typical factory floor, wherein free-roaming robots may move about with an added versatility beyond that of stationary robotic systems and which offer the potential of even greater returns. In practice, however, the realization of this dream has not been fully realized.

A significant technological requirement of a truly mobile robot is the need to successfully interact with the physical objects and entities in its environment. A mobile robot must be able to navigate from a known position to a desired new location and orientation, and avoid any contact with fixed or moving objects while enroute.

As shown in FIG. 1, one category of autonomous mobile robot control may be referred to as "reflexive" or "guidepath" control. The term reflexive control refers to a navigational control loop which reacts (in a reflexive manner) to the sensed position of some external guiding reference, as will be discussed later. The purpose of reflexive control is to free a human operator from the requirement of having to steer the moving platform. This type of control scheme is commonly employed on automated guided vehicles (AGV's).

Automated guided vehicles have found extensive use in automated factories and warehouses for material transfer, in modern office scenarios for material and mail pickup and delivery, and in hospitals for delivery of meals and supplies to nursing stations, to name but a few. Such devices are guided while in transit by a number of schemes, the most common being some type of stripe or wire guidepath that is detected by sensors installed on the front of the platform and used to servo-control the steering mechanism so as to cause the vehicle to follow the intended route. Reflexive guidance schemes of this type may be divided into two general categories: 1) those which sense and follow the audio frequency (AF) or radio frequency (RF) field from a closed-loop wire embedded in the floor, and, 2) those which optically sense and follow some type of stripe affixed to the floor surface.

Various implementations of the stripe-following concept exist, including the most simplistic case of tracking a high-contrast (dark-on-light, light-on-dark) line. Other methods include systems which track a special reflective tape illuminated by an onboard light source, and a system developed by Litton Corporation which tracks a chemical stripe that glows when irradiated by ultraviolet energy.

Advantages of reflexive control are seen primarily in the improved efficiency and reduction of manpower which arises from the fact that an operator is no longer required to guide the vehicle. Large numbers of AGV's can operate simultaneously in a plant or warehouse, scheduled and controlled by a central computer which monitors overall system operation and vehicle flow with minimal or no human intervention. Navigational problems do not arise because the vehicles are following designated routes suitably encoded so as to provide a positional reference at all times for any given vehicle. The central computer can thus keep track of the exact location of all vehicles in the system. Communication with individual vehicles is accomplished over RF links or directional near-infrared modulated light beams, or other means. The fundamental disadvantage of reflexive control is the lack of flexibility in the system whereby a vehicle cannot be commanded to go to a new location unless the guide path is first modified. This is a significant factor in the event of changes to product flow lines in assembly plants, or in the case of a security robot which must investigate a potential break-in at a designated remote location.

Again referring to FIG. 1, a second type of autonomous control system may be referred to as "unrestricted" or "absolute world coordinate" control, which implies the ability of a free-roaming platform to travel anywhere so desired, subject to nominal considerations of terrain traversability. Many potential applications await an indoor mobile robot that could move in a purposeful fashion from room to room without following a set guidepath, with the intelligence to avoid objects, and if necessary, choose alternative routes of its own planning.

Apart from the field of AGV's, however, successful implementation of robotics technology to date has been almost exclusively limited to fixed-place industrial robots operating in high-volume manufacturing scenarios that justify the intense "teach pendant" programming required to train the robot, which then repeats the taught sequences over and over under tightly controlled, highly structured conditions. The increasing use of process control and feedback sensors has started a trend toward implementation of adaptive control in flexible automation. Attempts to transfer this specialized assembly-line technology over into the unstructured world of a mobile robot, however, have met with little success; the problems are fundamentally different.

The difficulties can be directly related to the unstructured nature of the mobile robot's operating environment. Industrial process control systems used in flexible manufacturing (factory of the future) scenarios rely on carefully placed sensors which exploit the target characteristics. Background conditions are arranged to provide minimal interference, and often aid in the detection process by increasing the on-off differential or contrast. In addressing the collision avoidance requirements of a mobile robot, however, the nature and orientation of the target surface, such as an obstruction, is not known with any certainty. Yet, to be effective, the system must be able to detect a wide variety of surfaces with varying angles of incidence. Control of background and ambient conditions may not be possible. Preprogrammed information regarding the relative positions, orientations, and nature of objects within the field-of-view of the sensors becomes difficult indeed for a moving platform.

Specialized sensors specifically intended to cope with these problems must be coupled with some type of "world modeling" capability that represents the relative/absolute locations of objects detected by these sensors in order to provide a mobile platform with sufficient awareness of its surroundings to allow it to move about in a realistic fashion. The accuracy of this model, which must be constructed and refined in a continuous fashion as the robot moves about its workspace, is directly dependent throughout this process upon the validity of the robot's perceived location and orientation. Accumulated dead-reckoning errors soon render the information entered into the model invalid in that the associated geographical reference point for data acquired relative to the robot's position is incorrect. As the accuracy of the model degrades, the ability of the robot to successfully navigate and avoid collisions diminishes rapidly, until it fails altogether. A robust navigational scheme that preserves the validity of the world model for free-roaming platforms has remained an elusive research goal, and for this reason many potential applications of autonomous mobile robots are not yet practical.

Therefore, there is a need for a robust vehicle guidance system which is capable of guiding a vehicle such as a mobile platform to a dynamically determined destination along a path which automatically avoids randomly distributed obstacles that may be positioned between the vehicle and the destination.

SUMMARY OF THE INVENTION

The fundamental purpose of the present invention is to provide a robust navigational capability for an autonomous platform, which specifically addresses the problem of world model degradation due to accumulated dead reckoning errors. The hybrid navigational scheme of the present invention overcomes this problem while retaining the free-roaming flexibility of "unrestricted" planner-directed motion by merging elements of reflexive control into the system. In other words, the advantages of "guidepath" control (inherent X-Y position and heading updates) are combined with the advantages of "unrestricted," planner-directed navigation [FIG. 1] to yield a navigational control system superior to either of these alternative schemes alone. Certain highly-traveled runs (i.e., a straightline run down a long hallway, or through the center of a large warehouse) are designated as "freeways" and marked accordingly with some type of guidepath stripe as is commonly used by AGV's. Using a Cartesian coordinate system, the absolute lateral position and orientation of the freeway to be followed by the vehicle is known by a computer program, hereinafter referred to as a "path planner." The stripe is encoded so as to provide a series of position references along the longitudinal axis as the vehicle moves. These specially marked reference locations are referred to as "exits" in keeping with the freeway analogy.

Under this scheme, the path planner calculates the nearest intercept with the freeway in planning a route to a given destination. The vehicle then moves to intercept the freeway, at which point a transition is made to reflexive (stripe-guided) control. The vehicle travels down the freeway to the exit which has been determined by the planner to be most appropriate for the goal position. At this location, position and heading are reset to the coordinates of the exit, and the robot leaves the freeway to resume "unrestricted" autonomous transit. Each time the system returns to the freeway guidepath at various points in the course of normal operations, the dead-reckoning parameters are reset to preserve the accuracy of the modeling.

More specifically, the present invention provides a navigational control system for directing an autonomous vehicle to travel along a generally planar floor surface from a first location to a destination within a mathematically-modeled environment. The invention includes a self-propelled and steerable propulsion module having a drive controller data processor. The drive controller data processor receives control signals for directing the motion of the module which is guided to travel in accordance with the control signals. The drive controller data processor provides position signals corresponding to a dead-reckoning determination by the drive controller data processor of a position and a bearing (heading) of the module with respect to a reference position. The invention also includes at least one long, narrow guidepath stripe applied to the floor of the environment which defines a desired route along which the module may be selectively guided. The guidepath stripe is encoded with a plurality of displacement markers positioned at predetermined intervals having predetermined coordinates which are suitably encoded in the mathematical model of the operating environment. Stripe detecting means is mounted to the module for detecting the stripe and the displacement markers, and for providing recognition data signals when the stripe detecting means detects the stripe. The stripe detecting means also provides recognition data signals when the stripe detection means detects one of the displacement markers. Ranging means mounted to the module measures the range between the autonomous vehicle and any object within a predetermined distance of the vehicle and provides range data signals corresponding to the detected range. A host computer, which may be mounted to the autonomous vehicle or remotely positioned, determines an initial path, having a set of associated coordinates, for the vehicle to follow from its current position to the destination. The host computer provides the navigation data signals to the drive controller data processor via the local processor so that the vehicle may be guided along the initial path.

The host computer receives the position data signals from the drive controller data processor for determining an estimated dead-reckoning position of the vehicle as the vehicle travels along the initial path. The host computer also receives the recognition data signals identifying the guidepath stripe position and orientation for those portions of the route where the set of coordinates of the stripe are coincident with the coordinates of the path. Similarly, the host computer receives the recognition data signals corresponding to the displacement markers along the stripe when such are encountered. The position estimation of the vehicle is thereby routinely updated in real-time by the host computer as the vehicle travels along the guidepath, where the updated position is functionally related to the coordinates of the stripe and associated detected displacement markers, and to the estimated dead-reckoning position. If range data signals indicating the presence of an obstruction blocking the initial path are received by the host computer, the host computer determines a revised path to the destination for the vehicle to follow. A set of revised signals, provided by the host computer, guide the vehicle along the new path.

FIG'S. 6 and 7 are flowcharts of the function of the controlling processor associated with the sonar system of the present invention.

Figure 8:
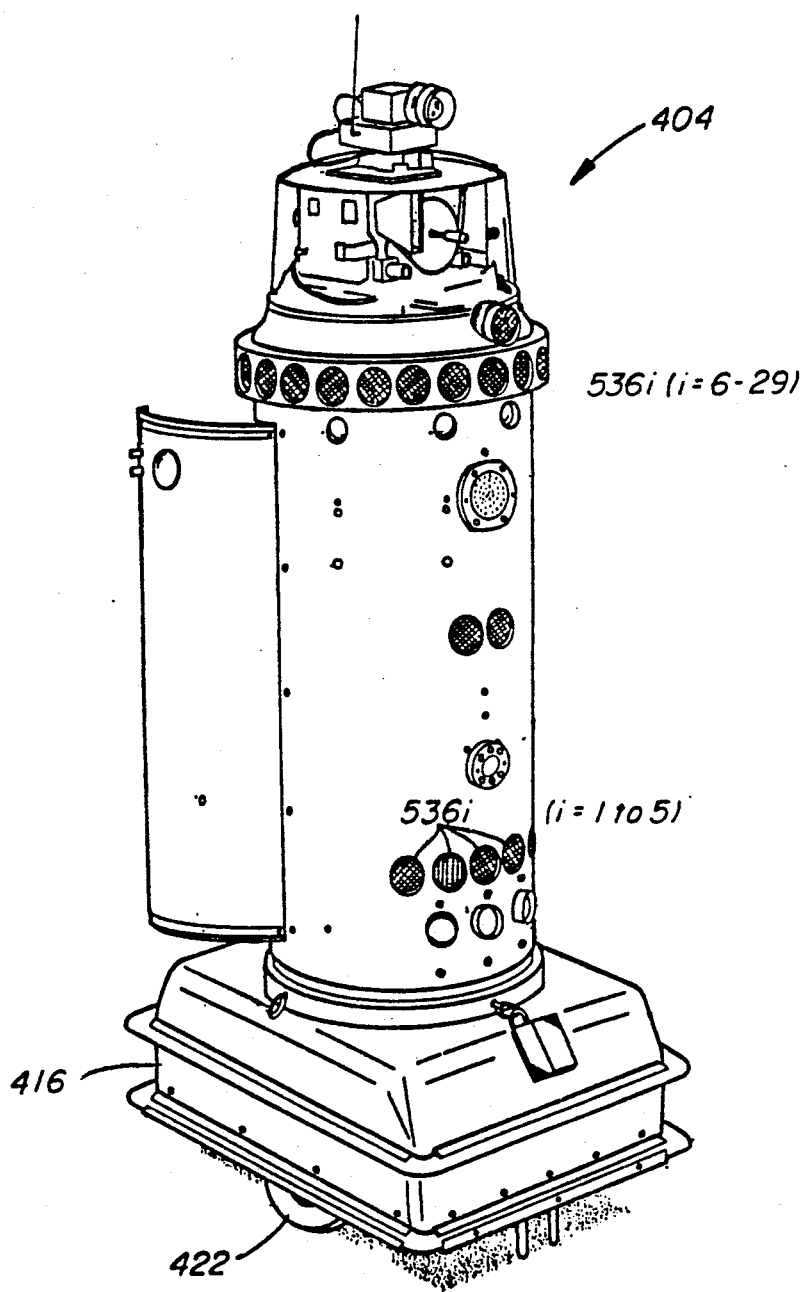

FIG. 8 is a perspective view of the autonomous vehicle used in conjunction with the present invention.

Figure 9:
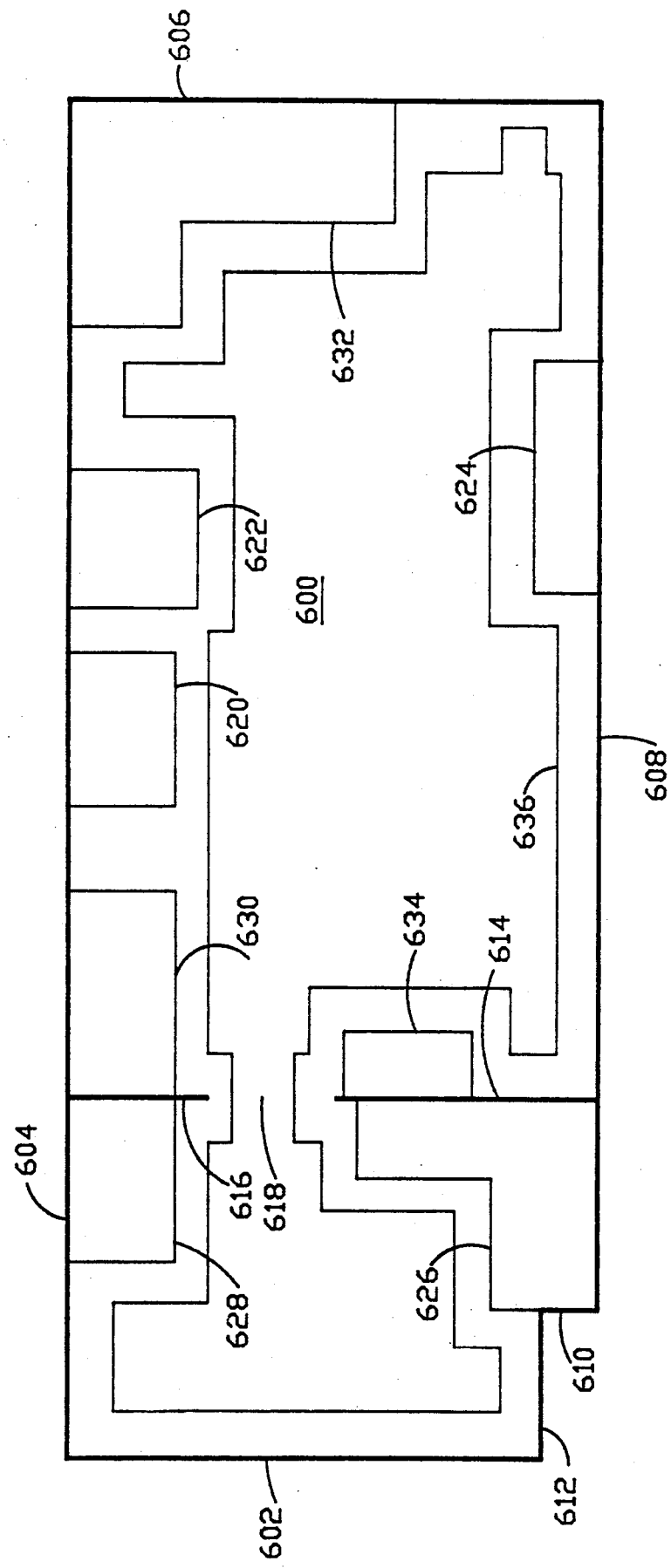

FIG. 9 is an example of an environment in which the present invention may operate.

Figure 10:
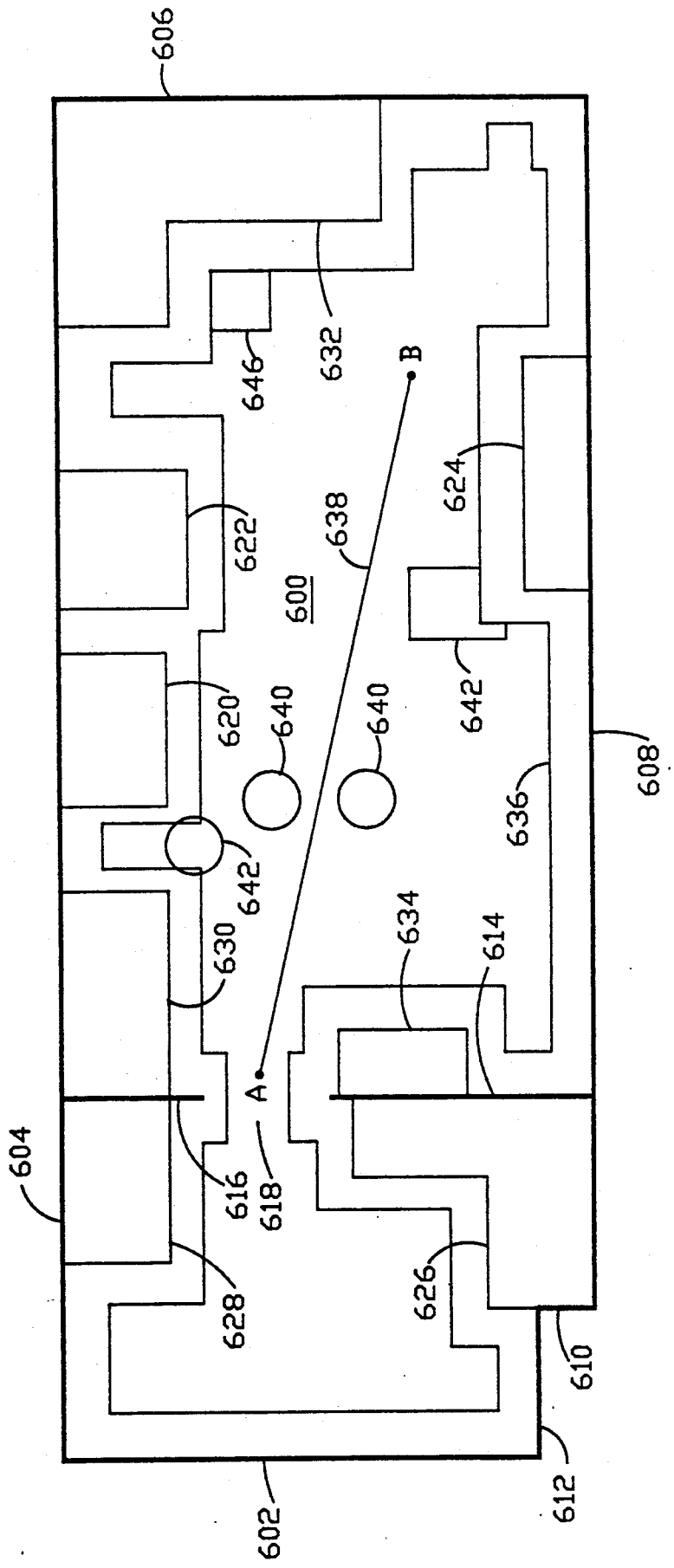

FIG. 10 illustrates a path and obstacles obstructing the path of the vehicle within the environment presented in FIG. 9.

Figure 11:
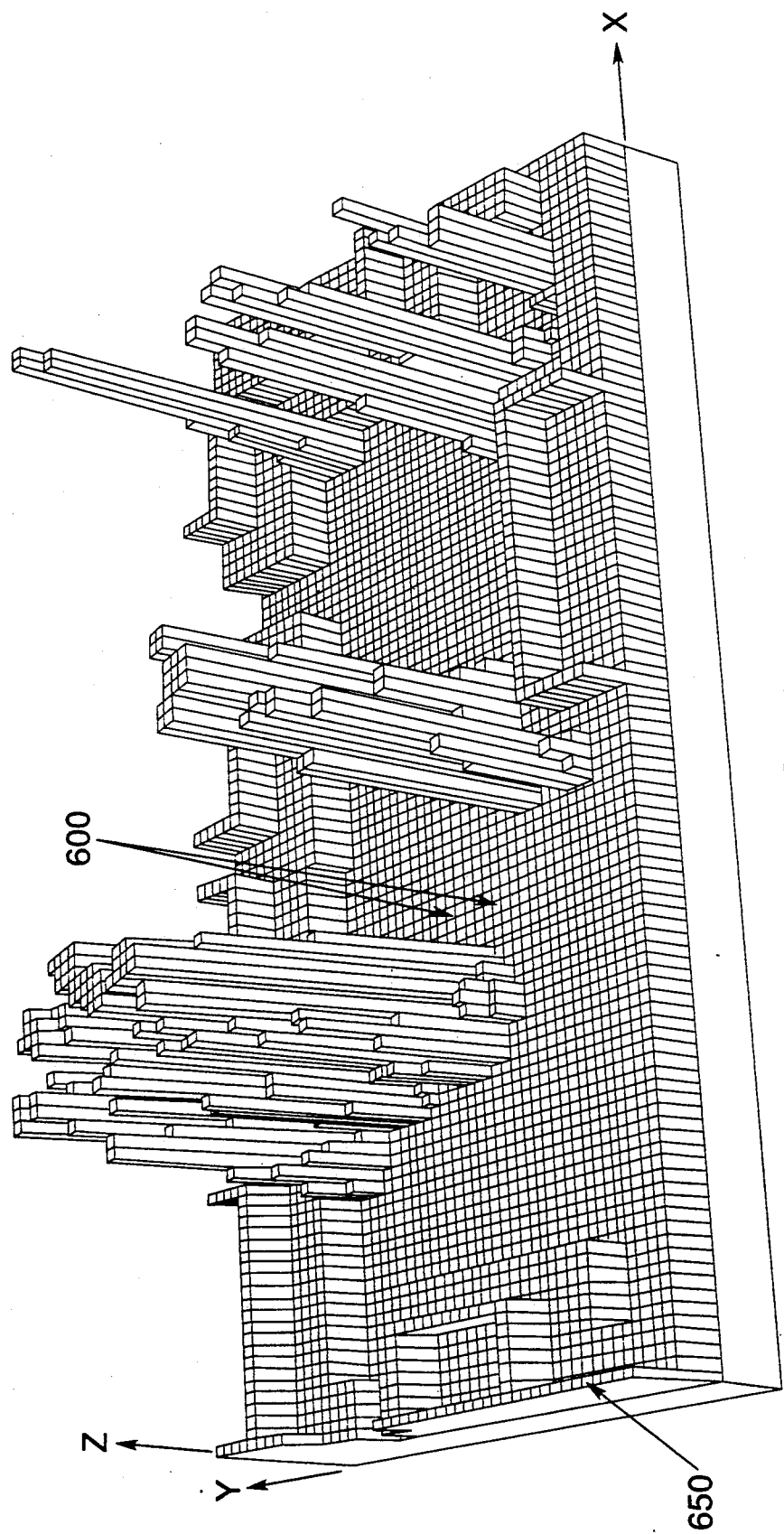

FIG. 11 is a three dimensional probability distribution plot showing the perceived location of nearby objects and obstacles within the environment illustrated in FIG. 10.

Figure 12:
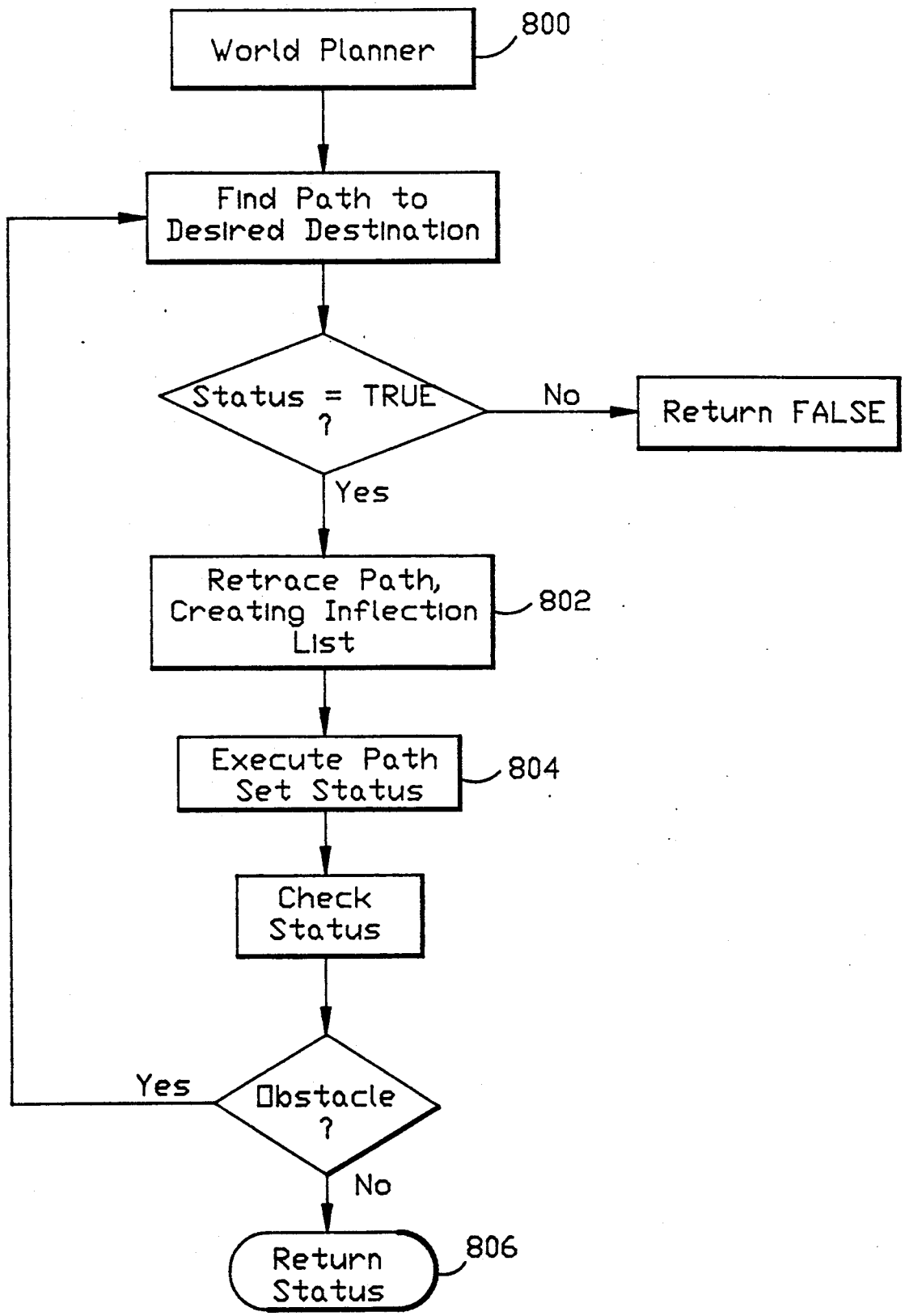

FIG. 12 is a flowchart of the Path (World) Planner program software.

Figure 13:
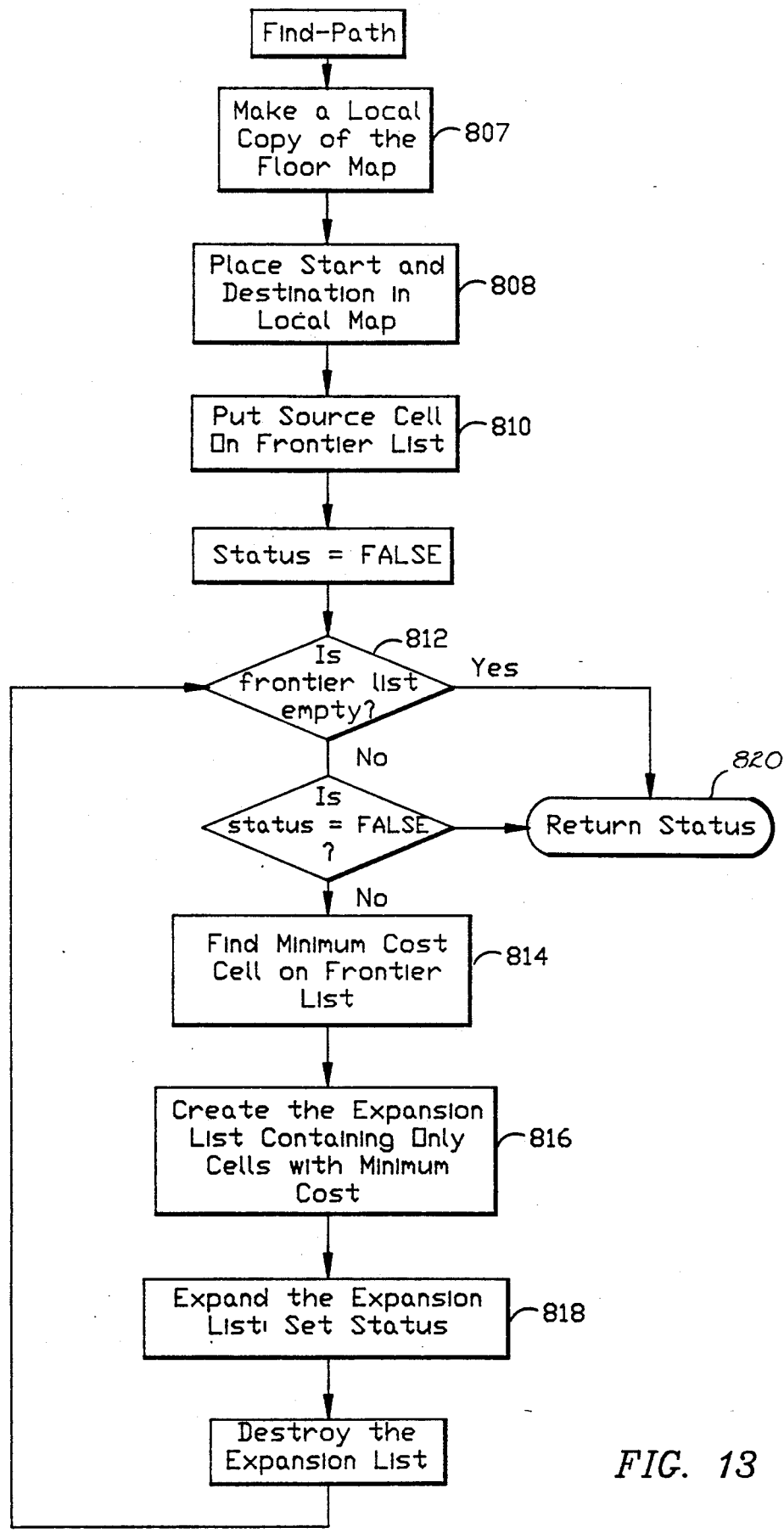

FIG. 13 is a flowchart of the Find-Path program software.

Figure 14:
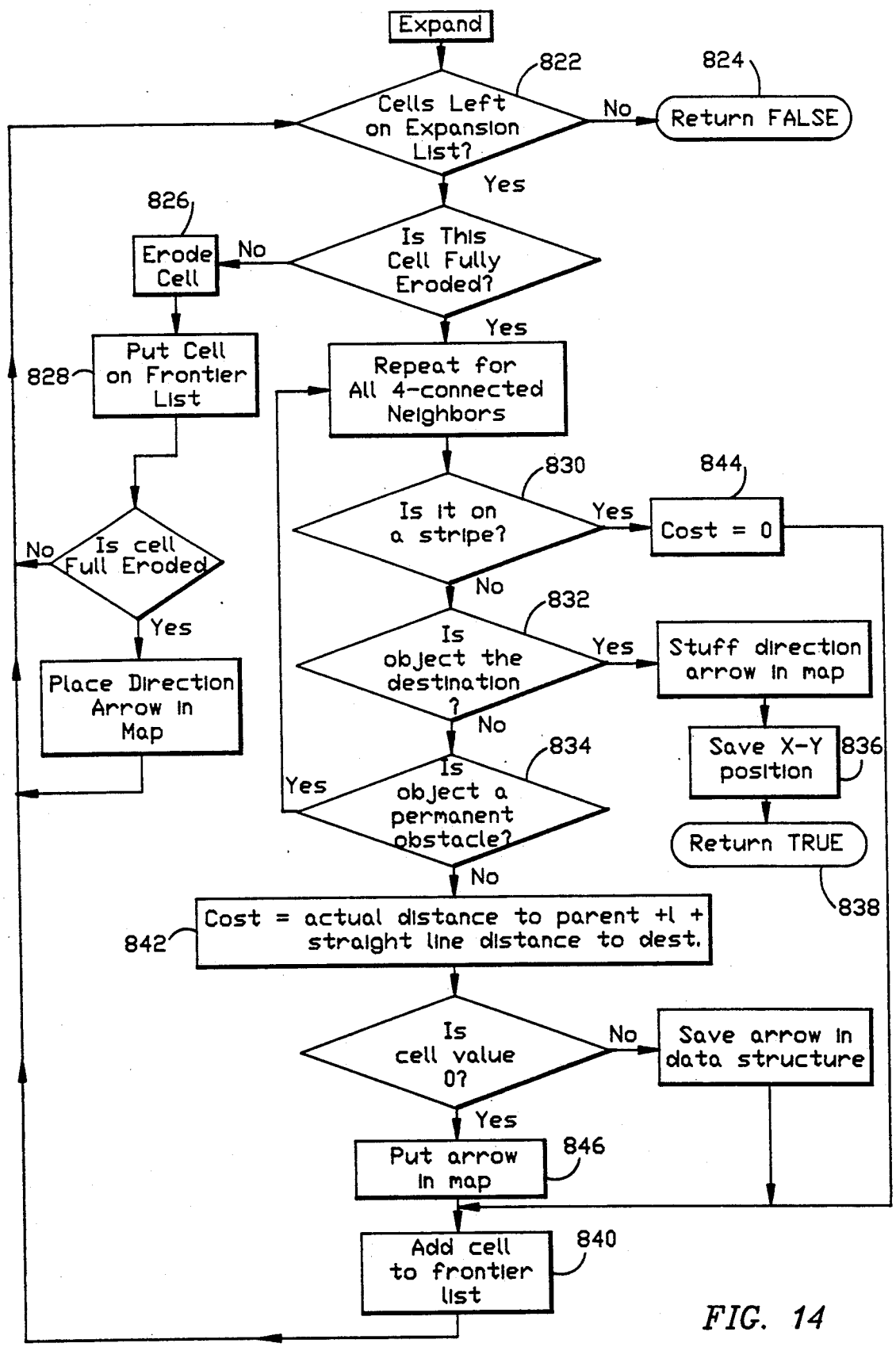

FIG. 14 is a flowchart of the Expand program software.

Figure 15:
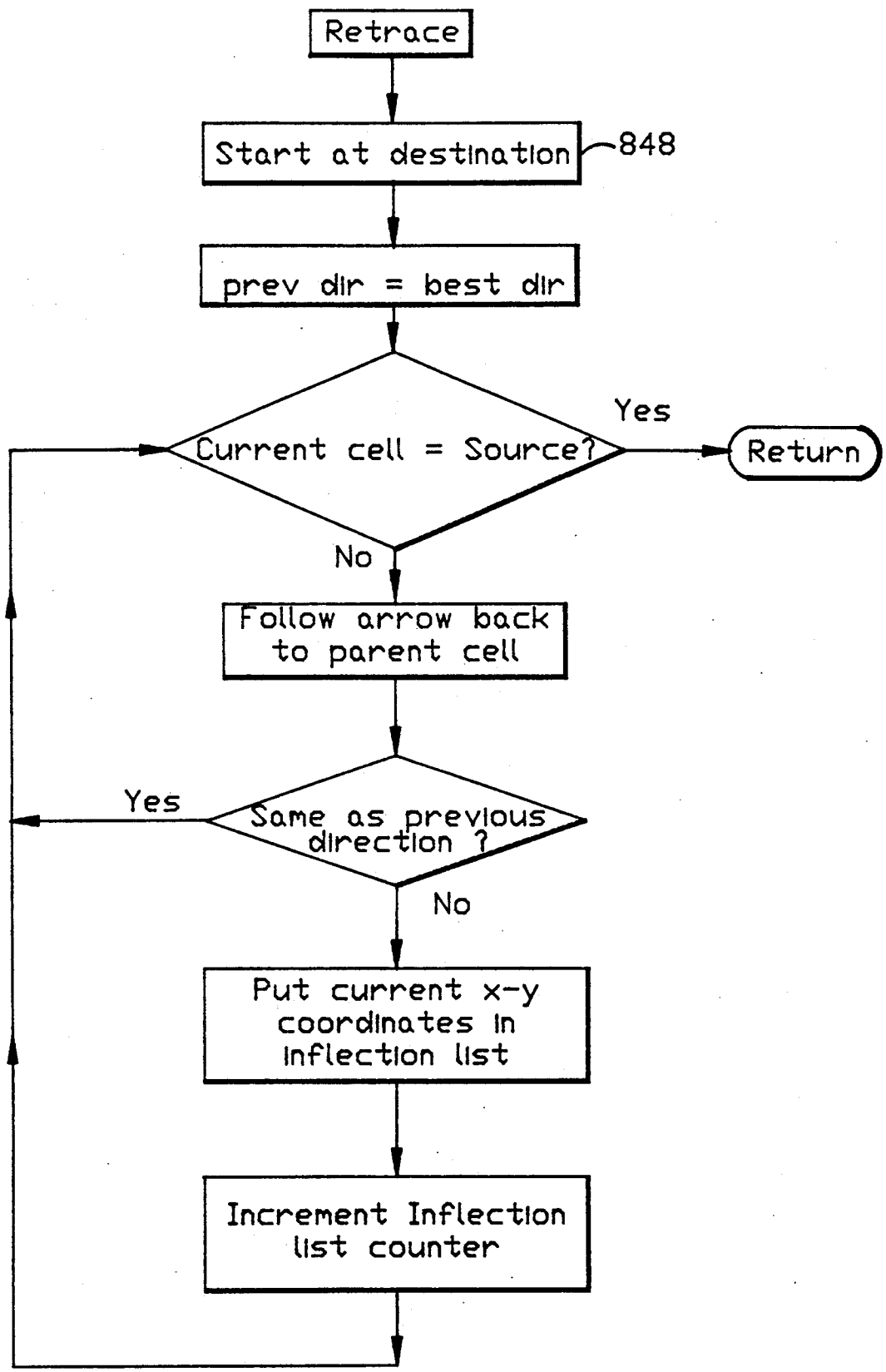

FIG. 15 is a flowchart of the Retrace program software.

Figure 16:
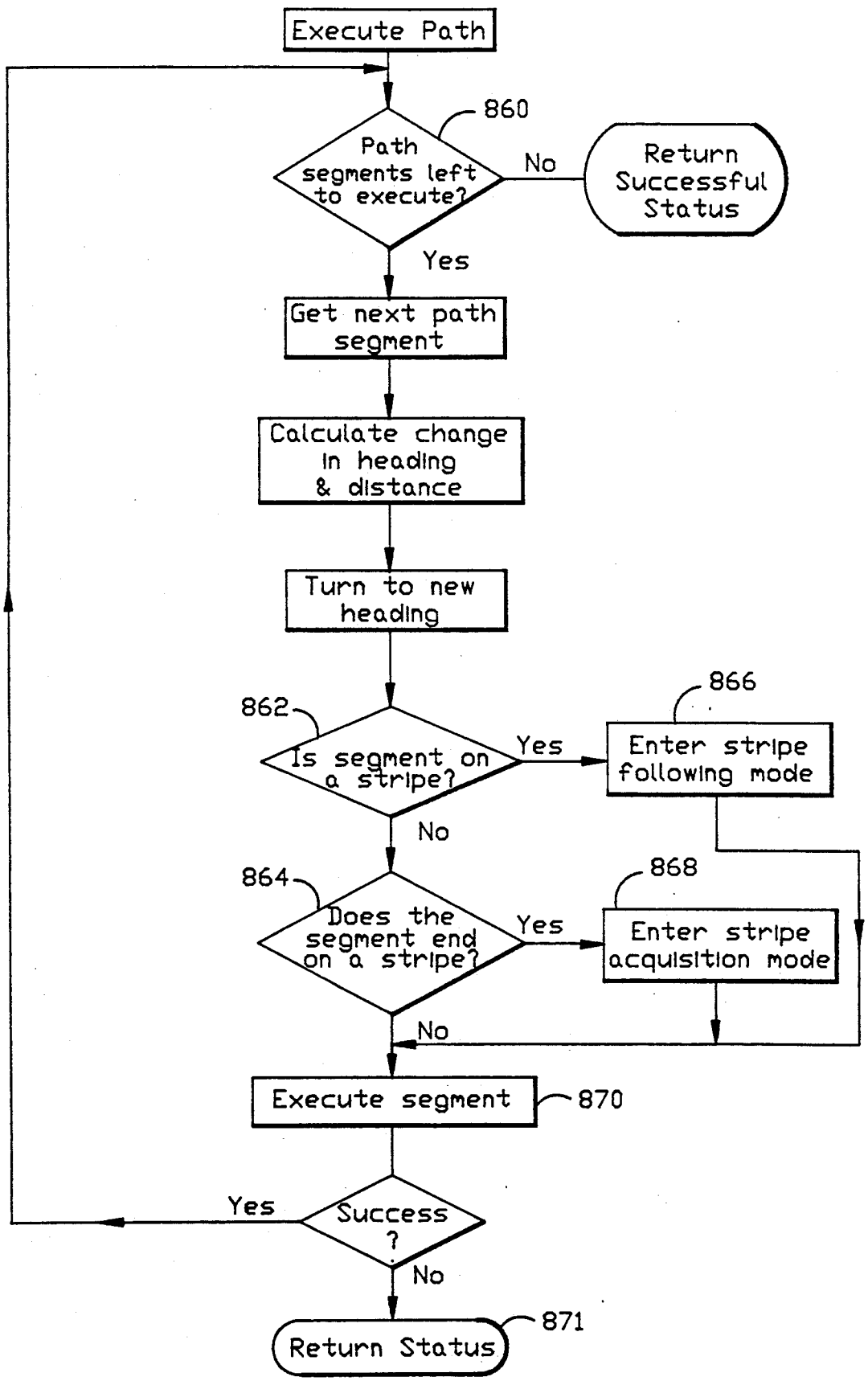

FIG. 16 is a flowchart of the Execute Path program software.

Figure 17:
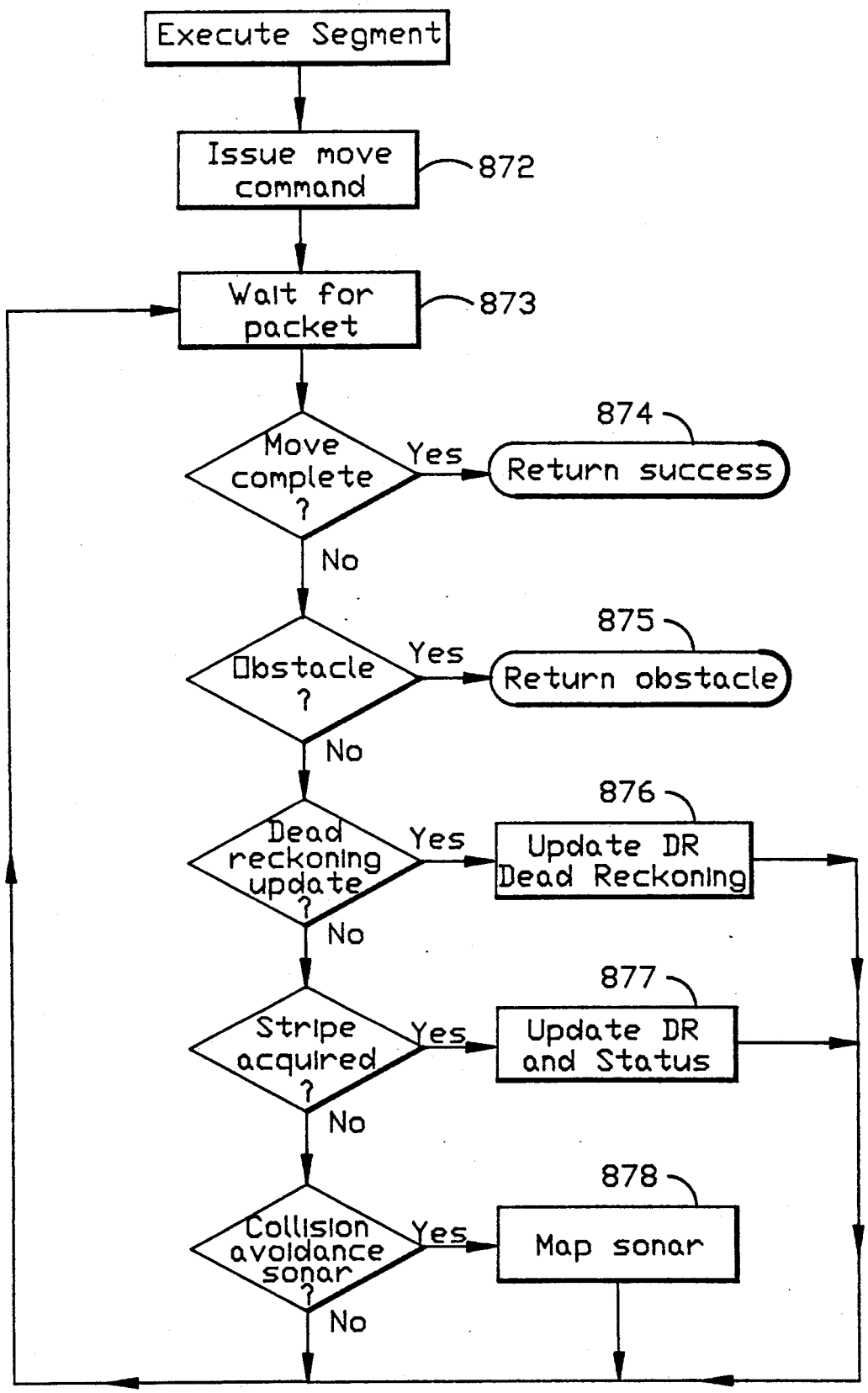

FIG. 17 is a flowchart of the Execute Segment program software.

Figure 18:
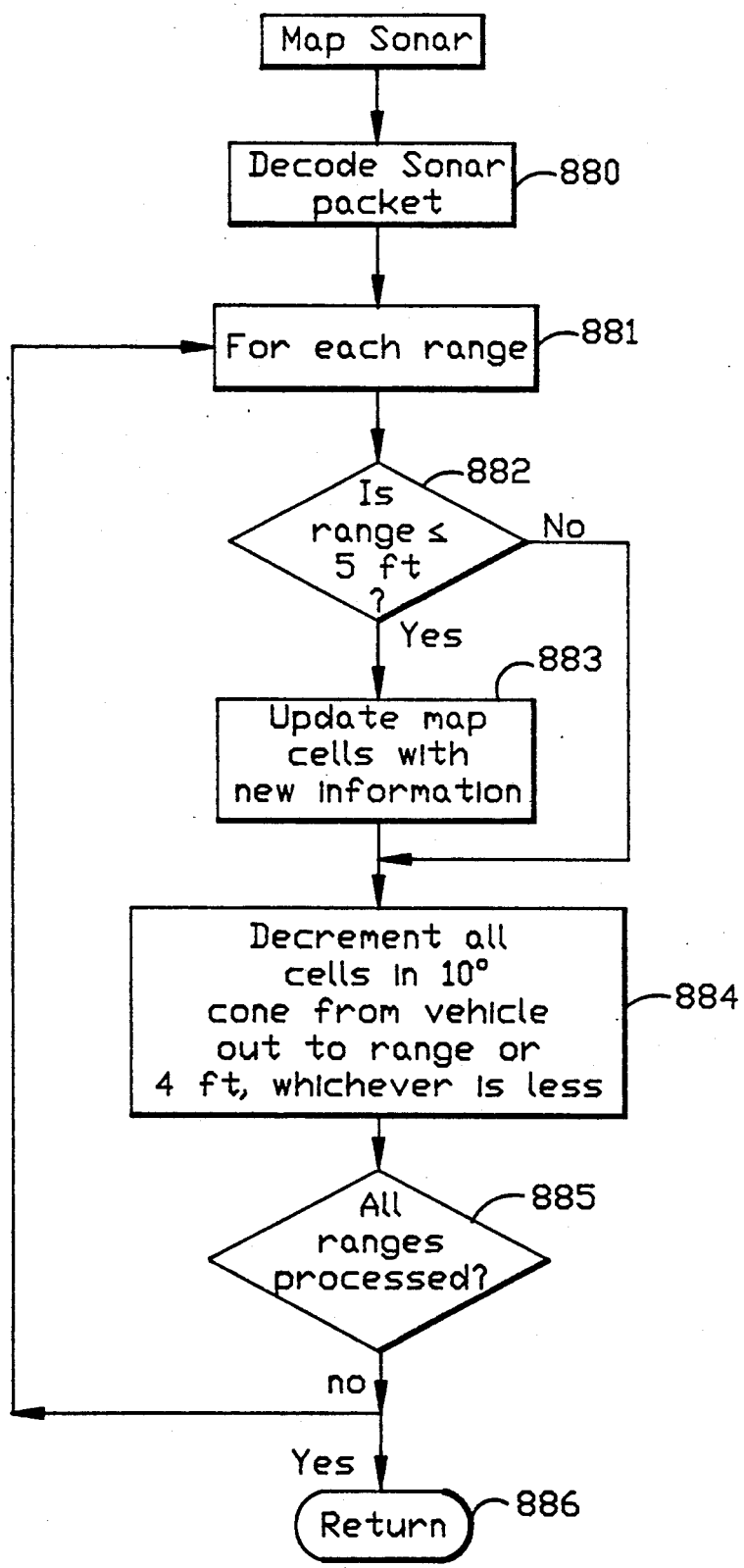

FIG. 18 is a flowchart of the Map Sonar program software.

Figure 19:
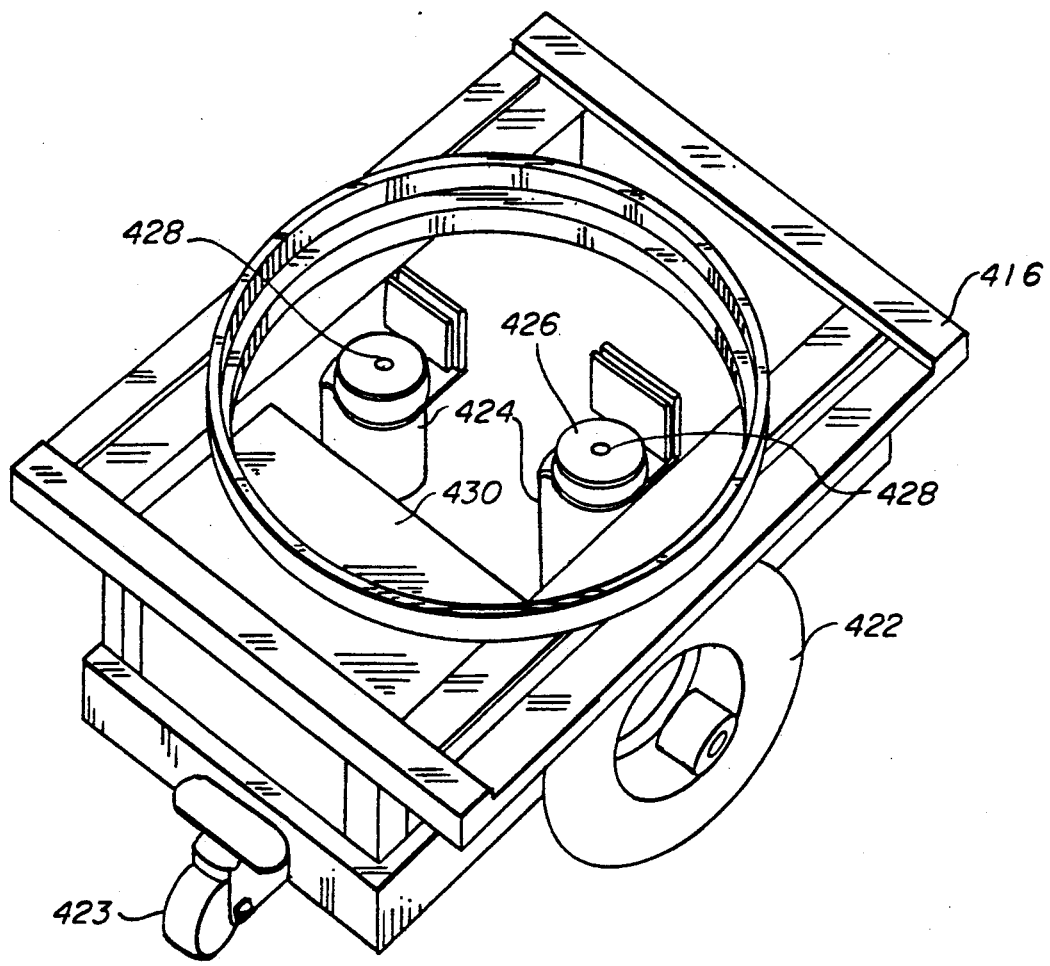

FIG. 19 is a top, perspective view of the computer-controlled propulsion module of the autonomous vehicle of FIG. 8.

Figure 20:
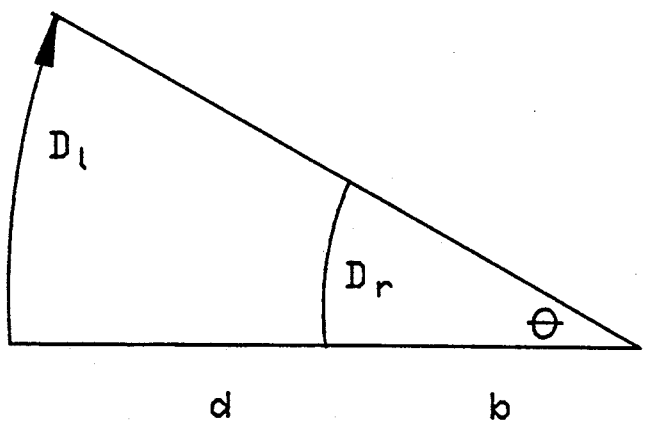

FIG. 20 represents portions of circles traced by the left and right wheels traveling at different but constant velocities, for a change in heading of the autonomous vehicle.

Figure 21:
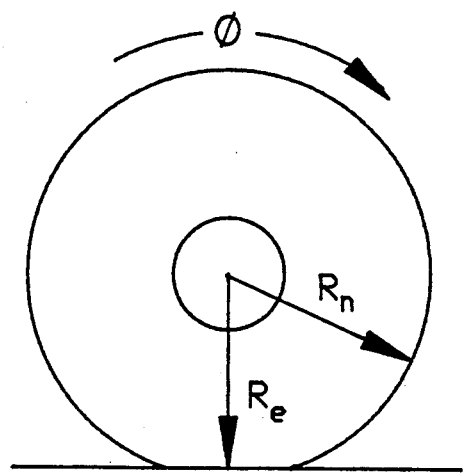

FIG. 21 illustrates the effective wheel radius of the drive wheels of the propulsion module of the autonomous vehicle.

Figure 22:
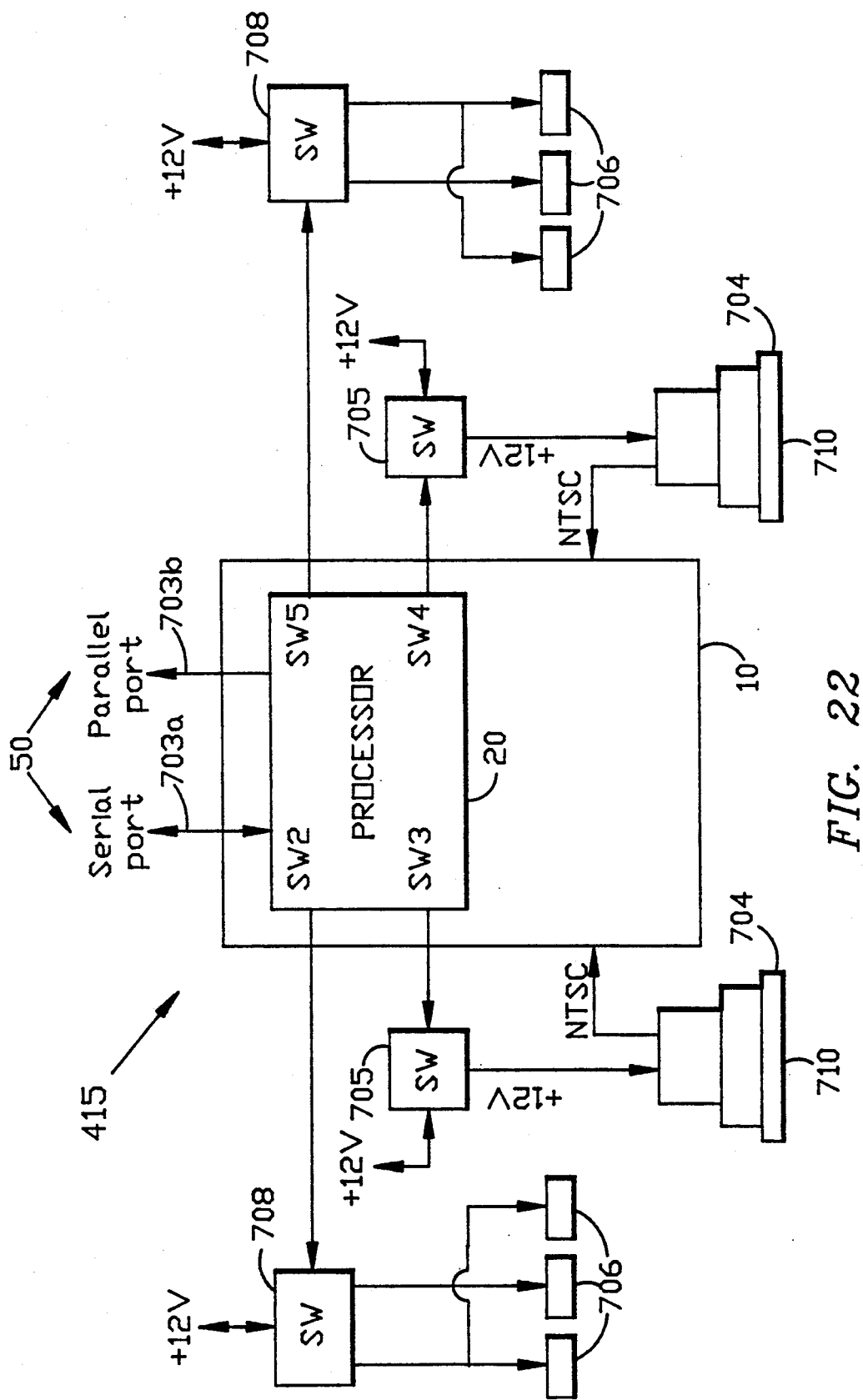

FIG. 22 is a functional block diagram of the stripe following subsystem of the present invention.

Figure 23:
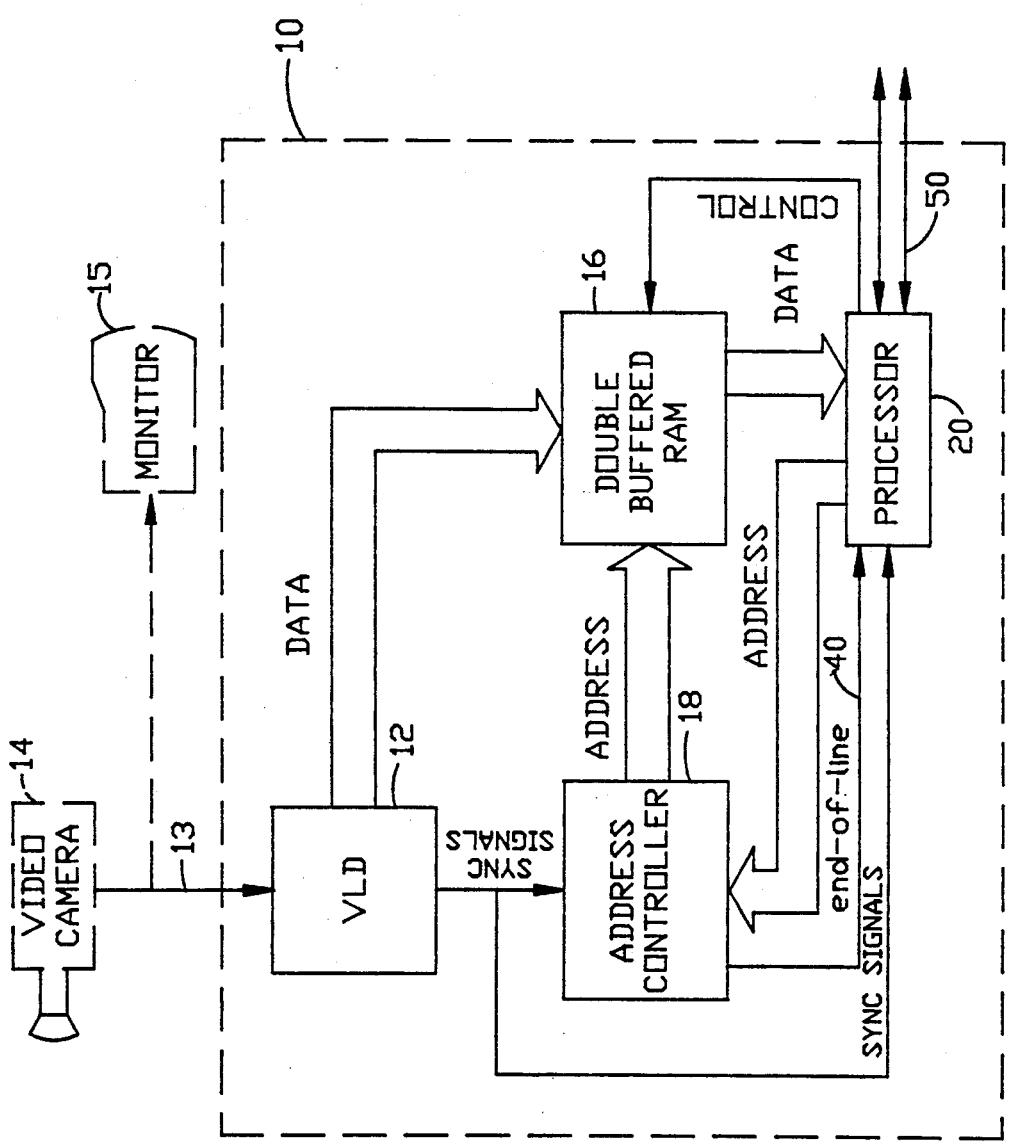

FIG. 23 is a functional block diagram of the video line digitizer of the stripe follower subsystem.

Figure 24:
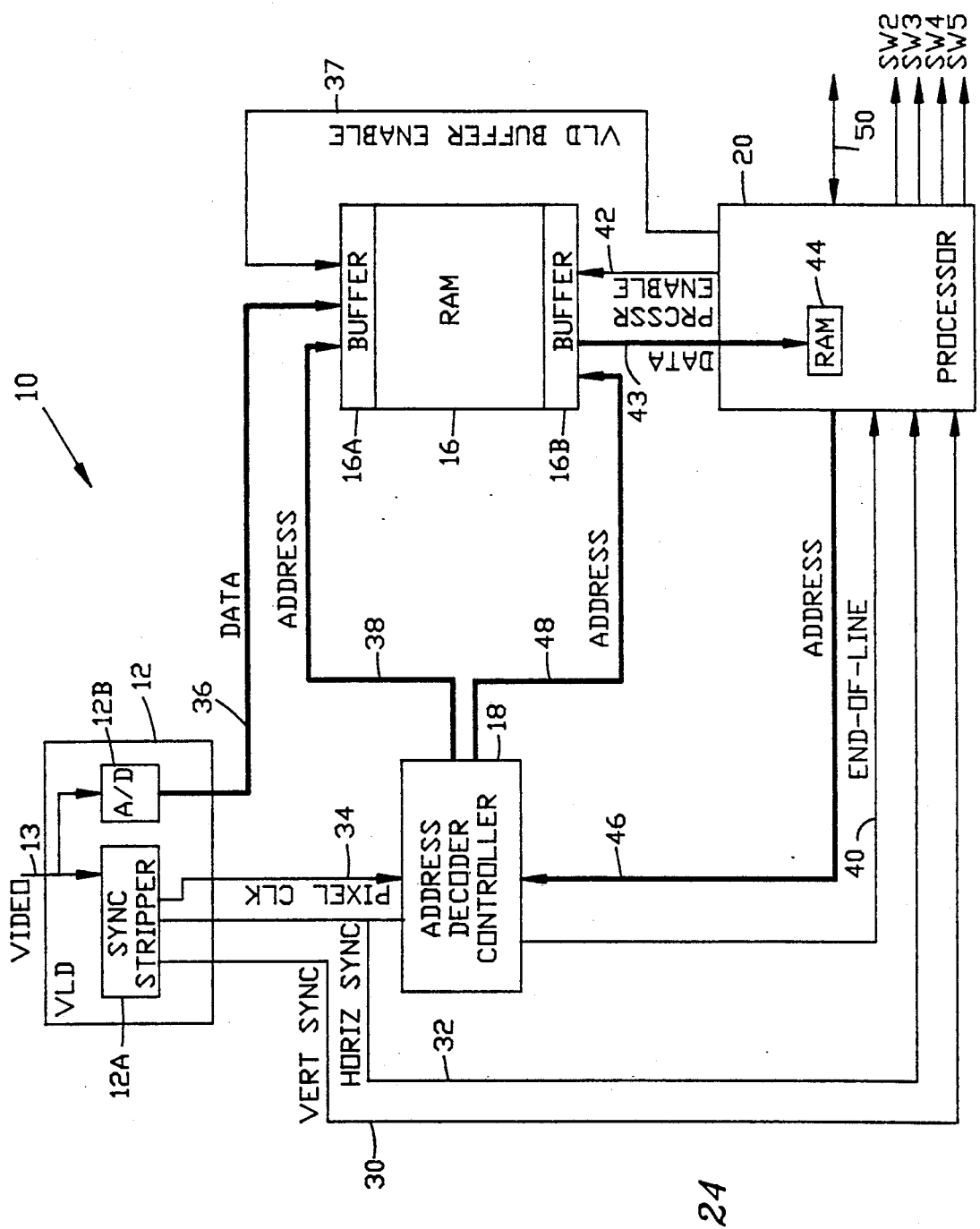

FIG. 24 is a block diagram of the video line digitizer that elaborates on the diagram presented in FIG. 23.

Figure 25:
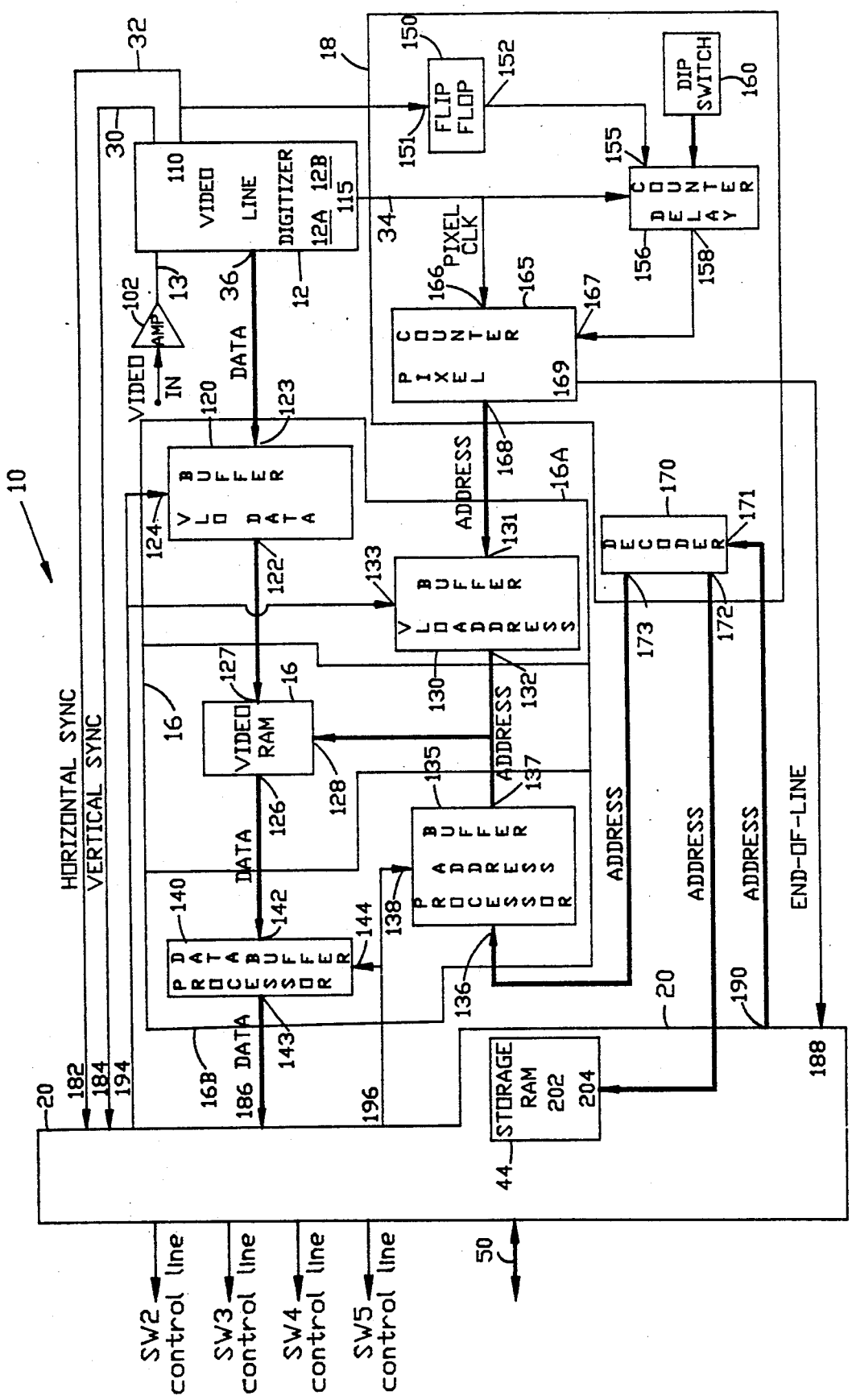

FIG. 25 is a block diagram depicting one means of implementing the video line digitizer.

Figure 26:
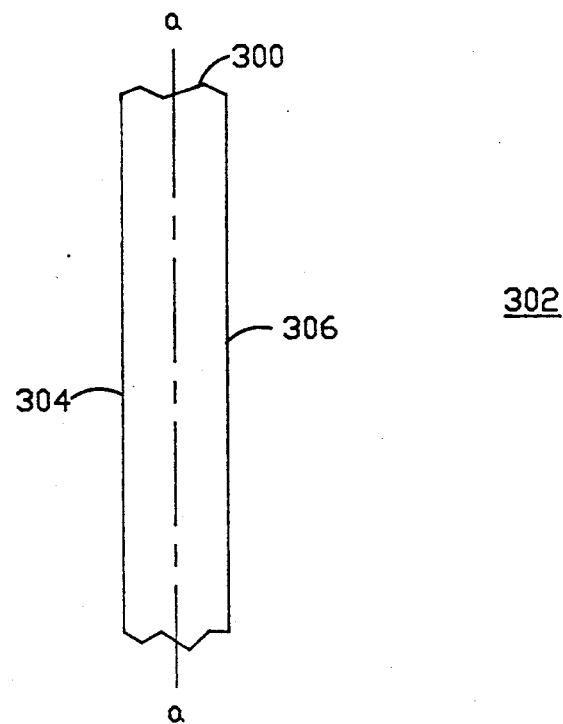

FIG. 26 illustrates a "freeway" guidepath stripe which the autonomous vehicle of the present invention may follow under certain circumstances.

Figure 27:
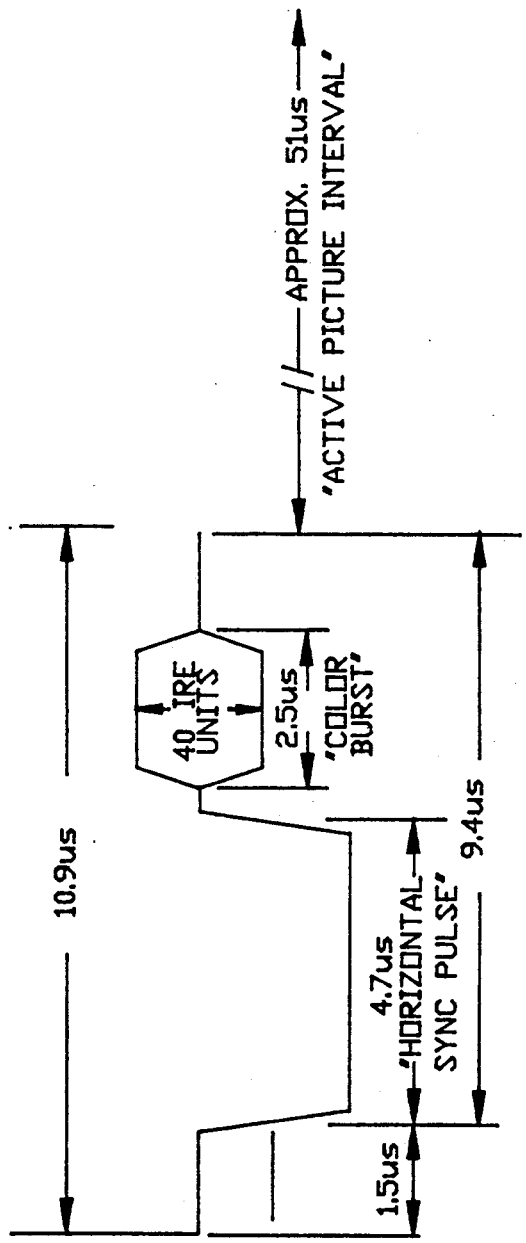

FIG. 27 illustrates a graphical representation of one line of an NTSC video signal.

Figure 28:
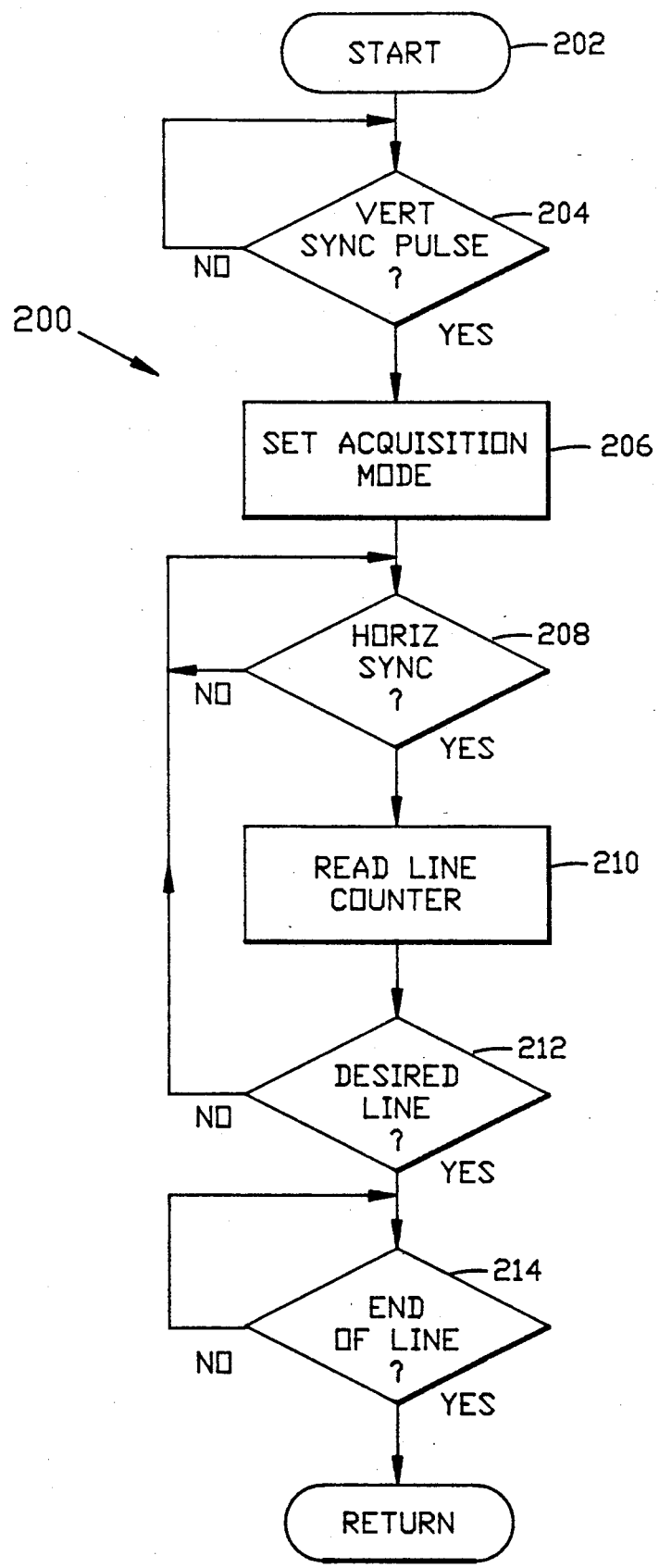

FIG. 28 is a flow chart that illustrates a subroutine for identifying, digitizing, and storing a predetermined line of a video frame.

Figure 29:
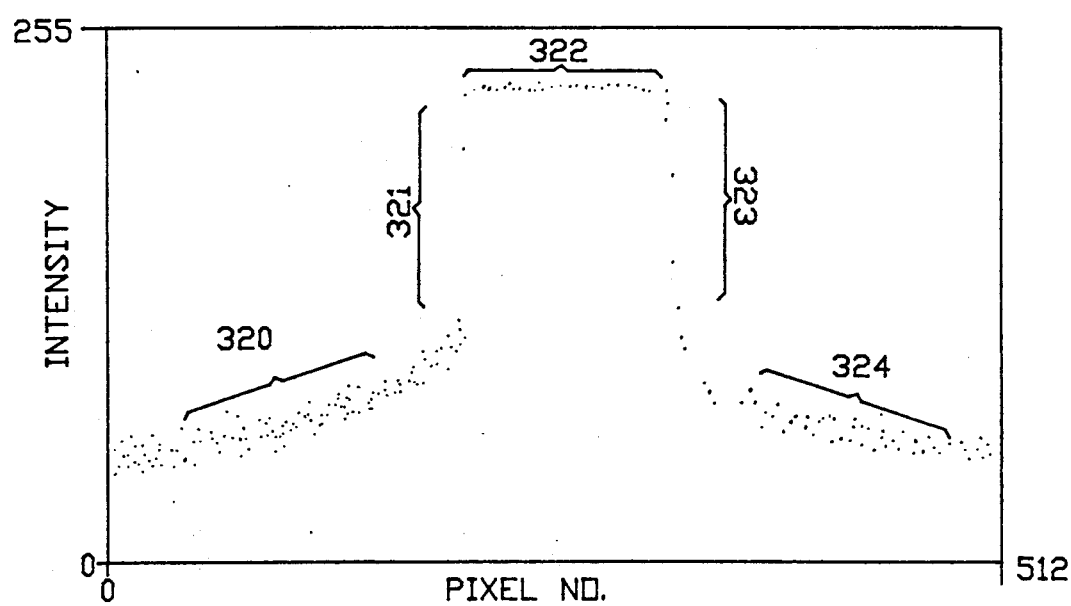

FIG. 29 illustrates pixel intensity values across a horizontal line of video, obtained from a camera viewing the stripe of FIG. 26.

Figure 30:
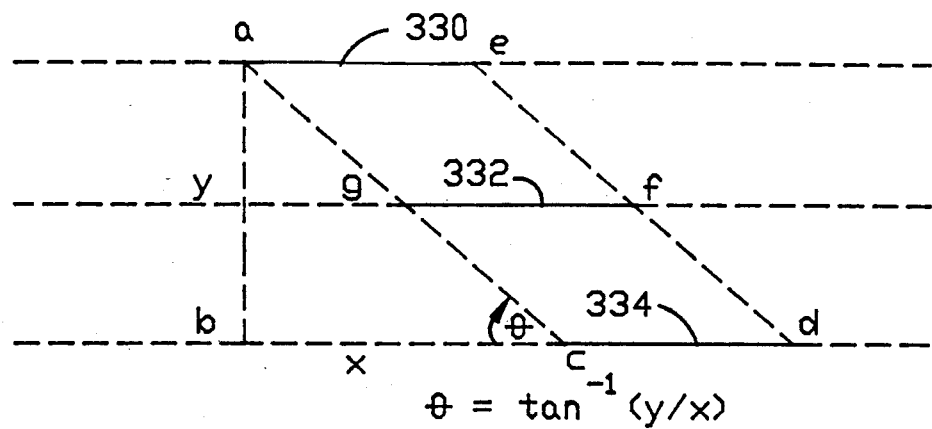

FIG. 30 illustrates a view of a guidepath stripe by video camera 740 when vehicle 404 is not centered on that stripe which vehicle 404 is attempting to align with and follow.

Figure 31:
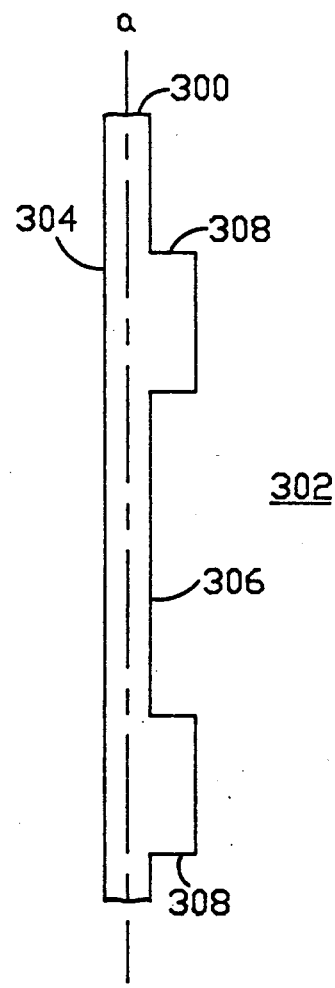

FIG. 31 illustrates displacement markers periodically positioned along the guidepath stripe.

Figure 32:
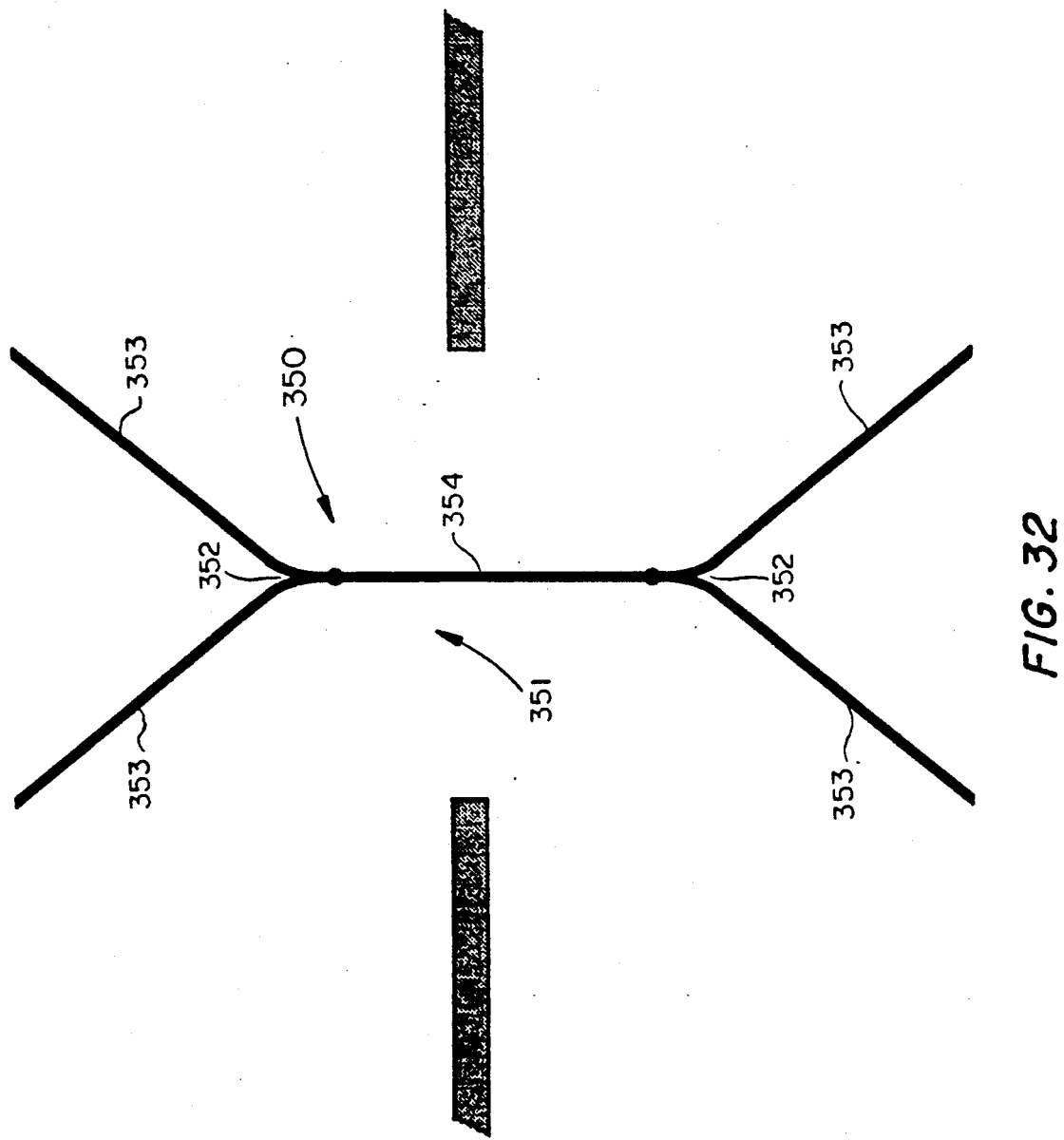
Figure 33A:
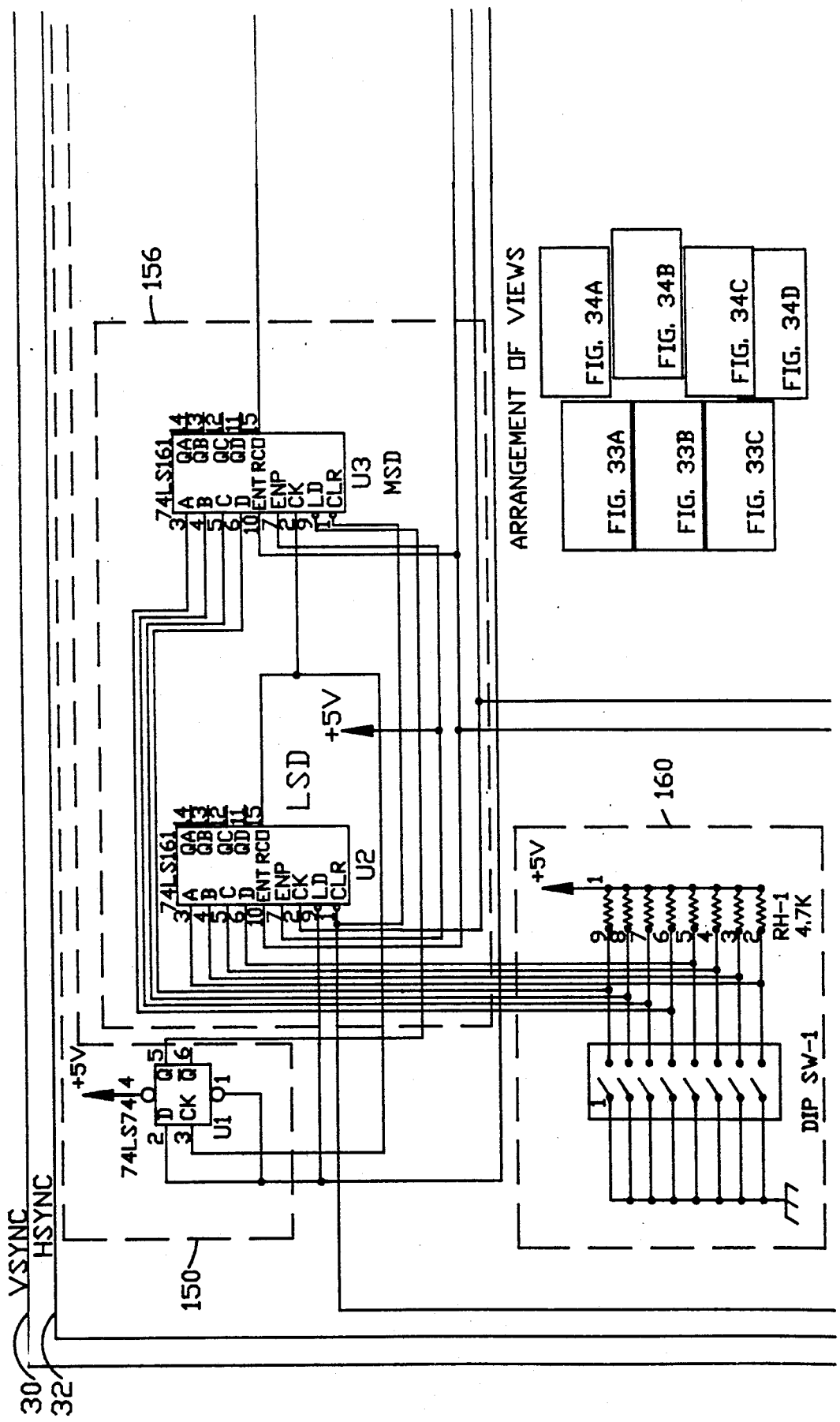
Figure 33B:
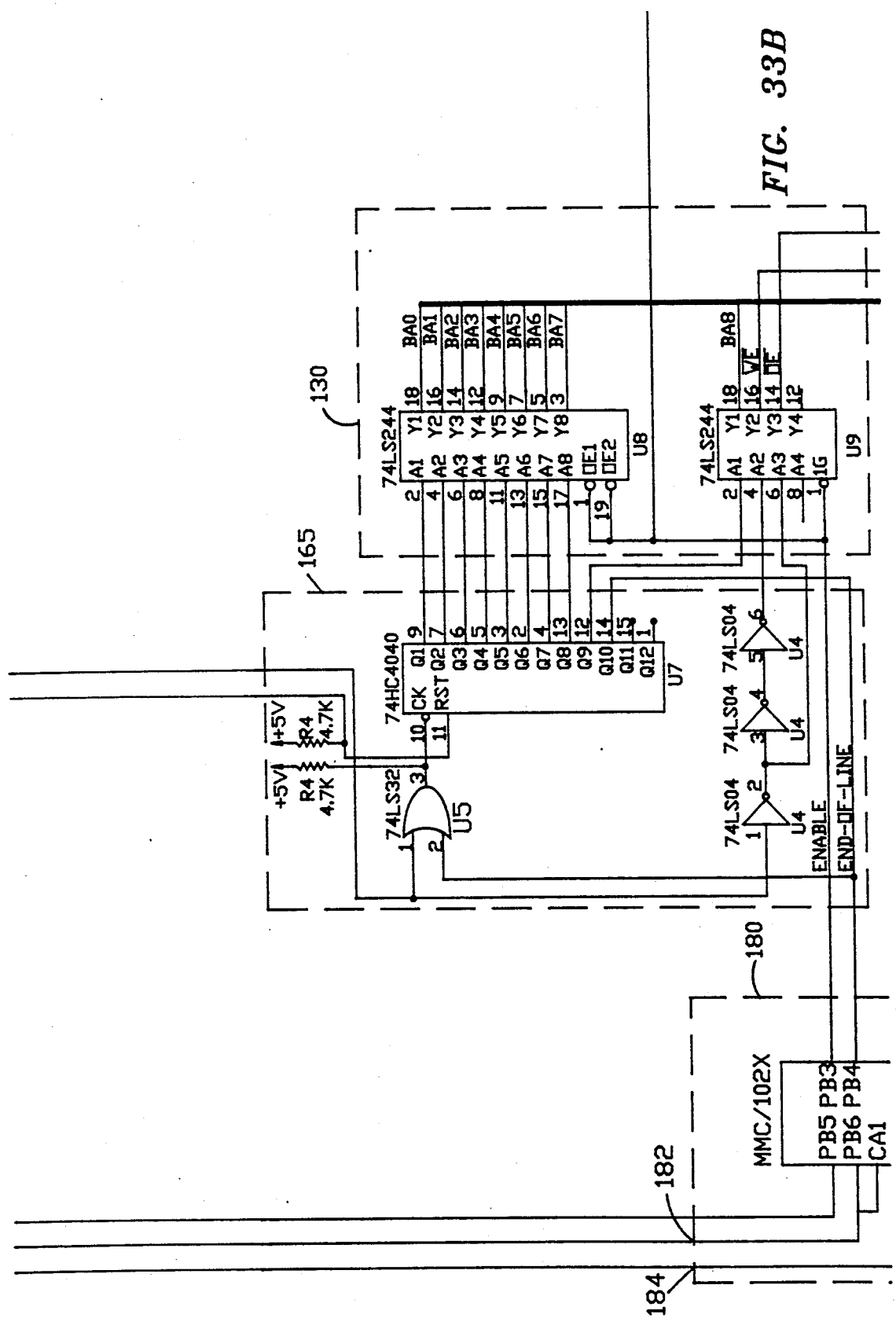
Figure 34A:
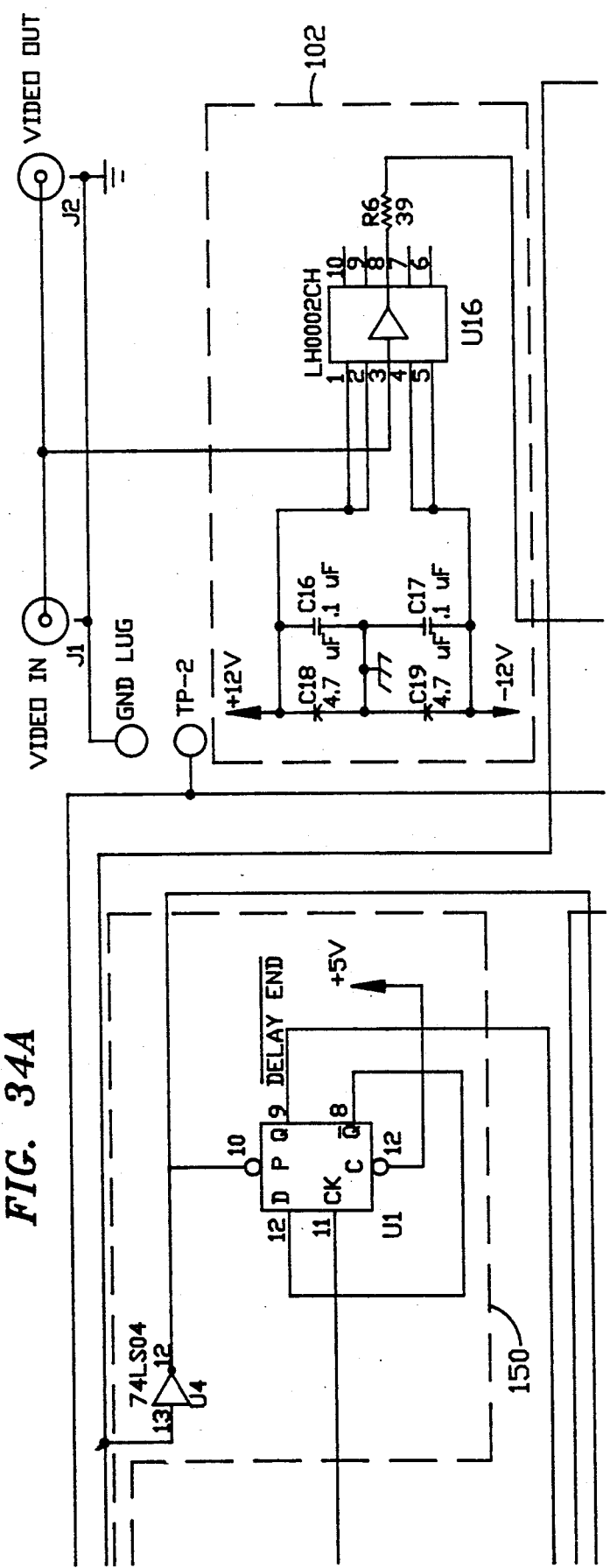
Figure 34B:
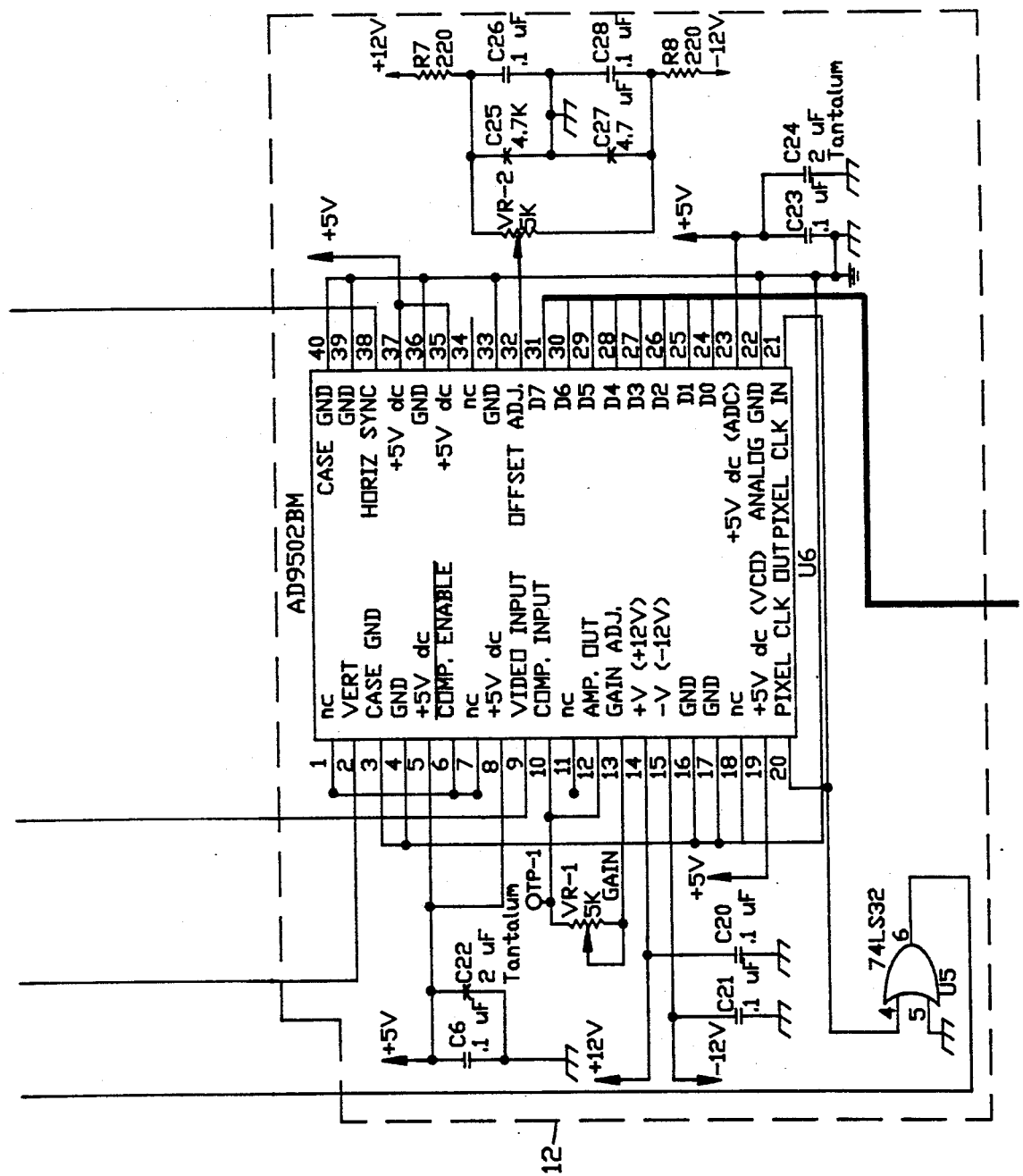
Figure 34D:
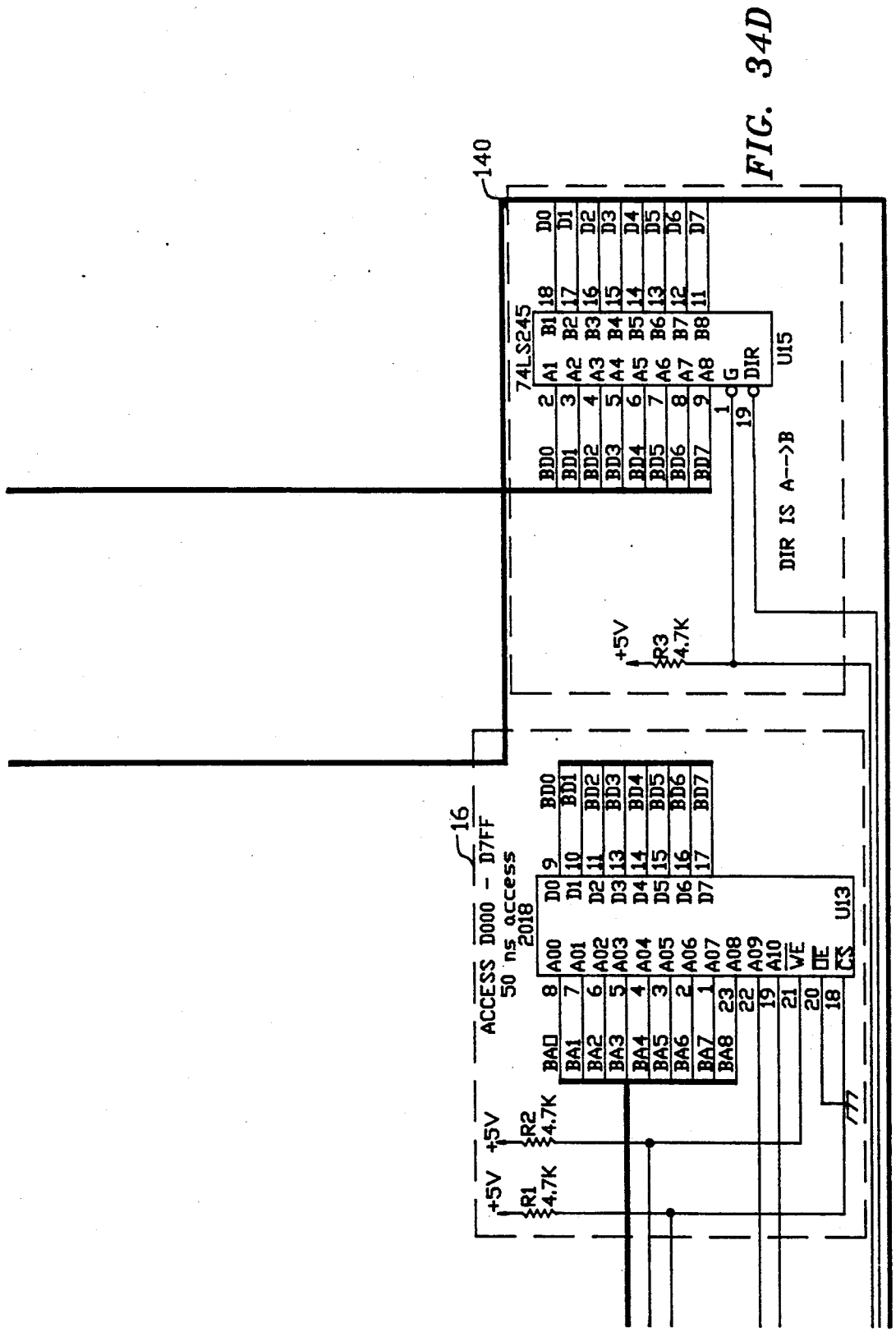

FIG. 32 illustrates a doorway path guide.

FIG.'s 33A, 33B and 33C (hereafter referred to collectively as 33) and 34A, 34B, 34C and 34D—(hereafter referred to collectively as 34) together provide an electrical circuit diagram that illustrates one means of implementing the video line digitizer.

Figure 35:
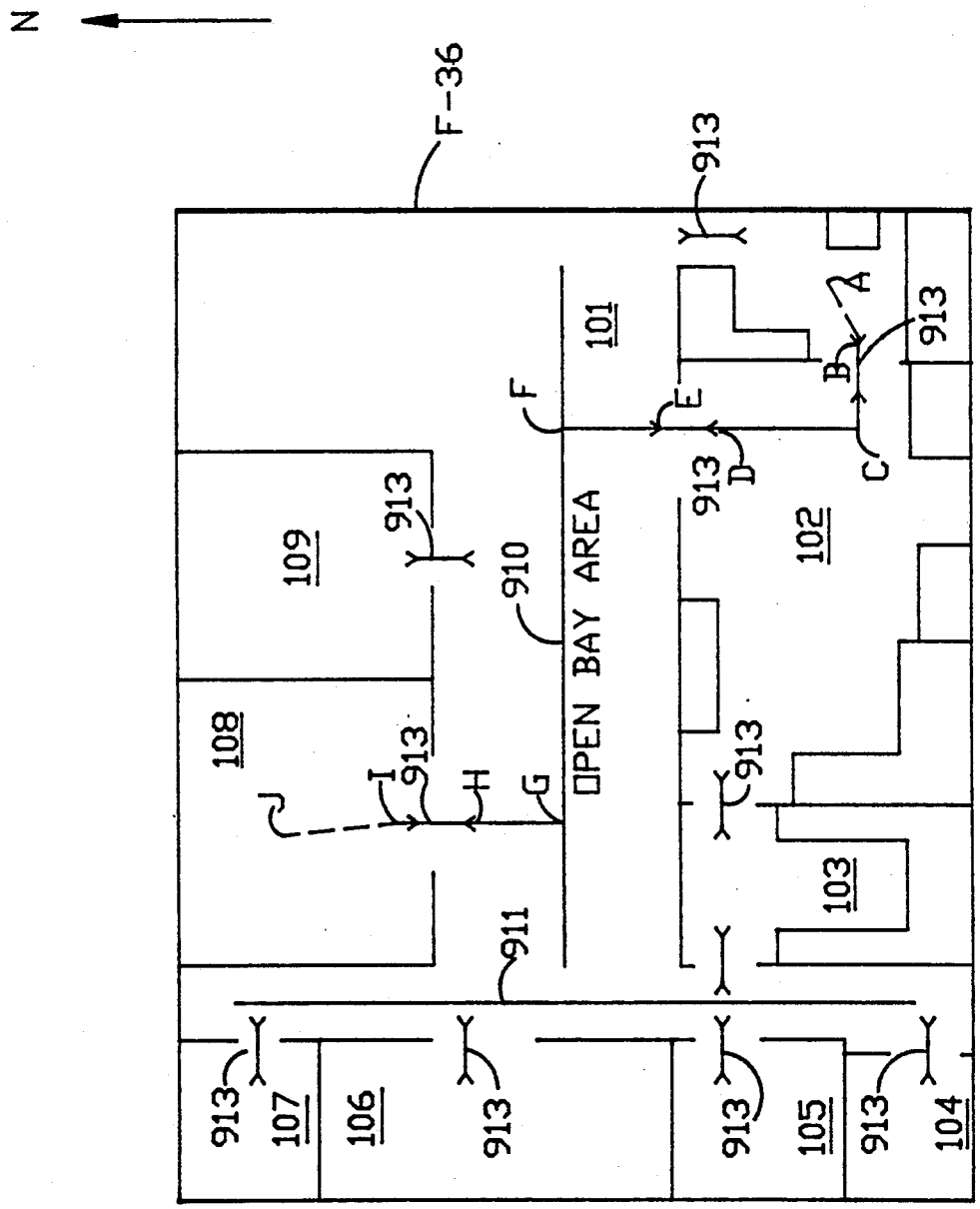

FIG. 35 illustrates an example of an application of the present invention whereby vehicle 404 is directed to calculate a path from an initial point to a destination within an operating environment.

DESCRIPTION OF THE PREFERRED EMBODIMENT

This invention addresses the problems associated with navigational control of a mobile robotic vehicle or AGV, which can be briefly summarized as follows: 1) periodically identifying the location and orientation of the vehicle, 2) planning a path for the vehicle to follow from its present location to its intended destination, and 3) providing directions to the vehicle so that the path is executed in a manner whereby the vehicle avoids running into anything. The present invention accomplishes these functions and therefore represents an innovative and robust scheme for the integration of reflexive "guidepath" control and "unrestricted" absolute (world coordinate) control of mobile vehicles, which makes previously impractical applications requiring mobility now achievable.

The present invention seeks to combine a dynamic world modeling scheme (capable of planning an optimum path from the vehicle's current position to a desired destination) with a reflexive guidepath-following scheme, as is typically employed on AGV's. Under this scheme, the path planner calculates the nearest intercept with a "freeway" (guidepath stripe located on the floor of the operating environment) in planning a route to a given destination. The vehicle then moves to intercept the freeway, at which point a transition is made to reflexive guidepath control. The vehicle travels down the freeway to an "exit" determined by the planner to be most appropriate for the goal position. At the appropriate exit, the vehicle resets its position and heading to the coordinates of the exit, leaves the freeway and resumes autonomous transit. Each time the vehicle returns to the freeway at various points in the course of normal operations, a "dead-reckoning" system is reset to preserve the accuracy of the modeling which takes place when the vehicle is operating in the unrestricted navigational mode. The result is a robust navigational scheme which has the ability to dispatch an autonomous vehicle to any desired location within a given, defined environment, yet which is able to take advantage of designated freeways for high speed transit and automatic positional updates. In this fashion, accumulated dead-reckoning errors that result when the vehicle operates off of the guidepath under unrestricted world coordinate control are routinely eliminated upon returning to the guidepath for operation under reflexive control.

A functional block diagram overview of the systems which comprise the preferred embodiment of the present invention is described with reference to FIG. 2. Host computer 400 is linked to local processor 402 via the communication link that may include transceivers 406 and 408, and antennas 410 and 412. Local processor 402 is mounted on autonomous vehicle 404 which also includes guidepath tracking subsystem 414, propulsion module 416, and sonar subsystem 418. Sonar subsystem 418 includes navigational subsystem 419a and collision avoidance subsystem 419b. Generally, host computer 400 performs the functions of maintaining a "world model" and planning the path of autonomous vehicle 404. The world model is a mathematical representation of the environment in which the autonomous vehicle 404 is to operate. Local processor 402 coordinates the operations of guidepath tracking subsystem 414, propulsion module 416, and sonar subsystem 418 through interactive communications with host computer 400. Guidepath tracking subsystem 414 enables propulsion module 416 to recognize and be directed by host computer 400 acting through local processor 402 along one of several "freeway stripes" which are applied on the planar floor of the environment, where each freeway stripe is associated with a particular route (path) having a known position and orientation. Sonar subsystem 418 and data provided by navigational sonar system 419a enable host computer 400 to create a "world map," which is a mathematical representation of the operating environment. Sonar subsystem 418 includes collision avoidance subsystem 419b which provides data that enables local processor 402 to identify obstacles which may obstruct the path of autonomous vehicle 404. This sonar data is received by host computer 400 which then attempts to plan a path for autonomous vehicle 404 which avoids the detected obstacles. Alternatively, host computer 400 could be mounted on vehicle 404, thus avoiding the necessity of having the communication link that includes transceivers 406 and 408, and antennas 410 and 412.

HOST COMPUTER

Host computer 400 performs functions of building and maintaining the "world model"; performing path planning to generate the initial route of vehicle 404; rerouting vehicle 404 for collision avoidance purposes during execution of the path; and providing an operator interface if desired. Host computer 400 may be, by way of example, a 16-bit Intel 80386-based personal computer. Host computer 400 is programmed in a high level language such as "C". By way of example, the source code program listings of this software are presented in Appendices 1-35, and are collectively described immediately below.

Figure 1:
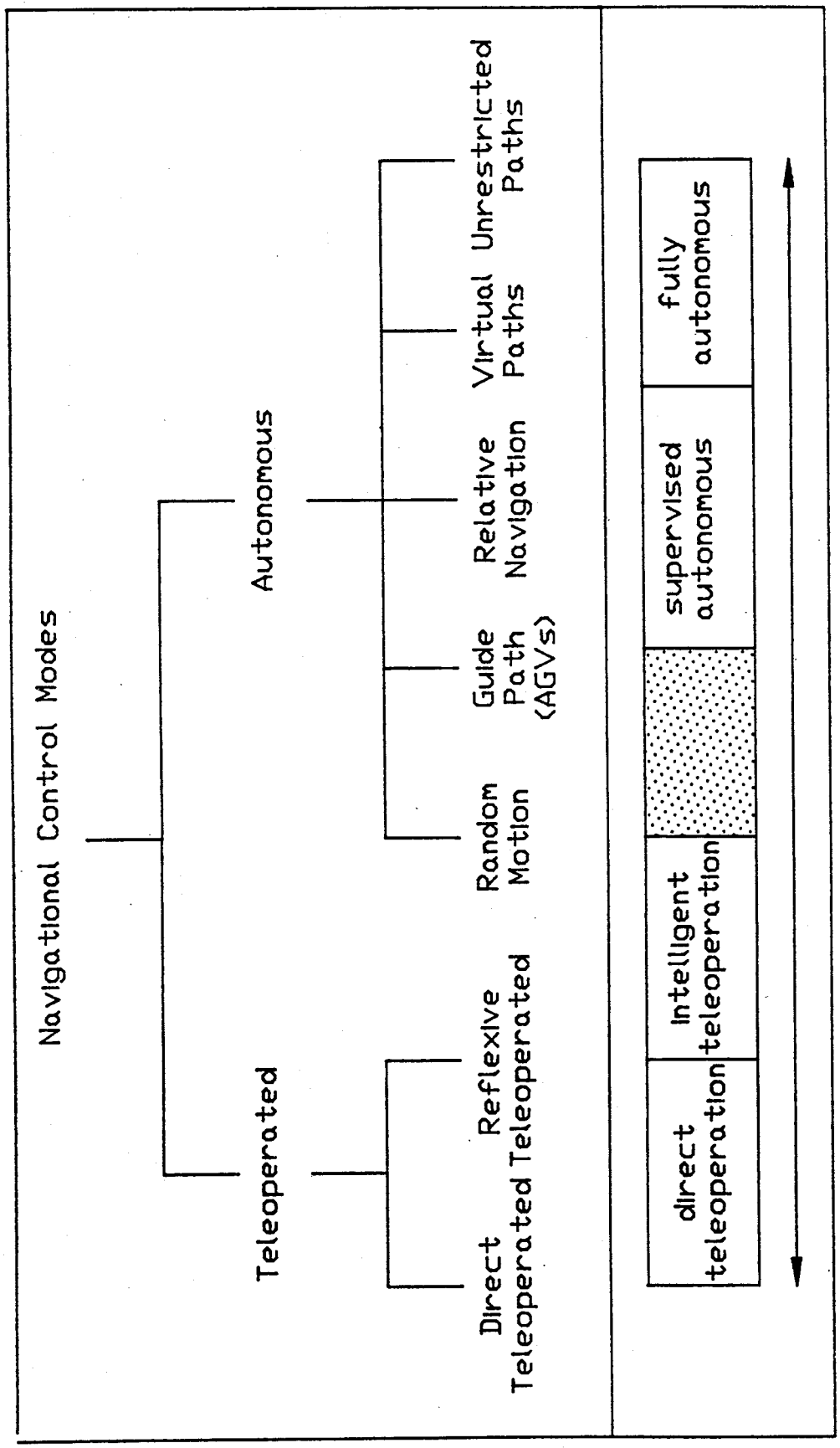
FIG. 1 is an outline of various navigational control modes of autonomous vehicles.

Providing the capability of supporting autonomous movement of a vehicle involves the acquisition of information regarding ranges and bearings to nearby objects, and the subsequent interpretation of that data in building and maintaining a "world" model, "which is a mathematical description of the environment in which the vehicle operates. The "world model" is specific to each operating location. The algorithms which are used to create and update the "world" model are processed in host computer 400, shown in FIG. 1.

The map representation employed in the preferred embodiment, by way of example, is a two-dimensional array of cells, where each cell in the array corresponds to a square of fixed size in the region being mapped. Free space is indicated with a cell value of zero; a non-zero cell value indicates the presence of an object. The cell value thus represents the probability of a given square being occupied, which is useful when the precise location of an object is unknown.

Figure 4:
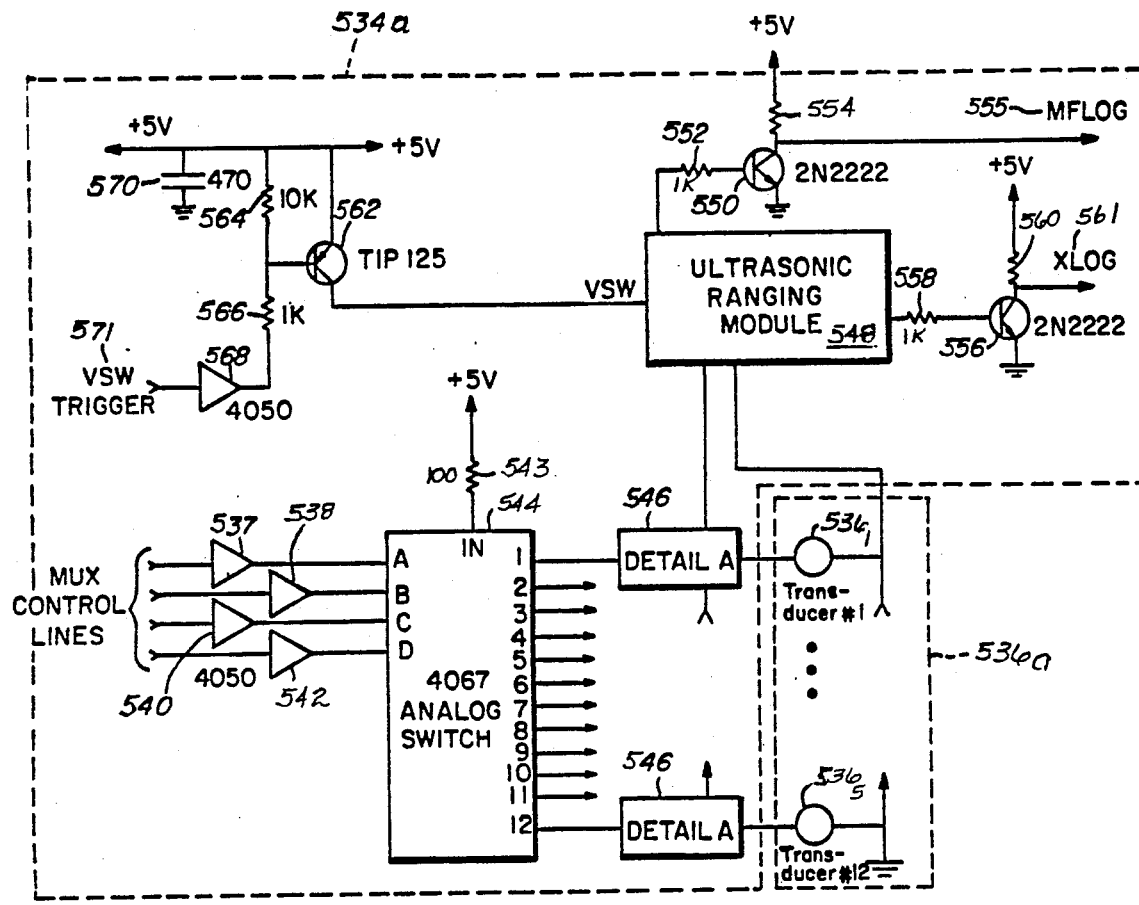
FIG. 4 is a schematic electrical diagram of the multiplexer portion depicted in FIG. 3 of the present invention.

The acquisition of range data is accomplished by use of the collision avoidance subsystem 419b, described in detail in the section further herein entitled "Sonar Subsystem." Collision avoidance subsystem 419b may include commercially available sonar ranging modules 548 (refer to FIG. 4), such as those manufactured by Polaroid Corporation, which are multiplexed to multiple transducers and which are driven by processor 532, shown in FIG.'s 1 and 3, which converts elapsed time to distance and stores the results. Such target distance information is ultimately provided to host computer 400 which assimilates the data into the world model as the vehicle is moving. Effective interpretation and utilization of range data is critical to achieve a reasonably accurate representation of surrounding obstacles. By using a simplified probability scheme and range gating fixed arrays of sonar sensors, the mapping process can take place in real-time while the vehicle is in motion. Two different mapping procedures are used, one for creating the initial world map, and another for updating the map during the execution of a path.

To initially generate the world map, vehicle 404, illustrated in FIG.'s 2 and 8, is directed to move very slowly around the boundaries of the environment in which it is to be operated, while firing all 24 transducers $536_i$, where $i=6$ to 29, which are configured in a 360 degree array. A detailed description of navigational sonar subsystem 419a is described further herein in the section entitled "Navigational Subsystem." FIG. 9 is a plan view of an example of an operating environment 600, or "world," which for purposes of illustration, may be a two-room laboratory, where the perimeter of the environment is composed of wall segments 602, 604, 606, 608, 610, and 612. Furthermore, by way of example to illustrate how the world map is constructed, environment 600 may also include interior walls 614 and 616; doorway 618; book shelves 620 and 622; file cabinet 624; and tables 626, 628, 630, 632, and 634. The sonars are modeled as rays and the data is range-gated to six feet. The floor area of operating environment 600 may be divided into squares or "cells." The size, and hence number, of the cells which comprise operating environment 600 are determined in accordance with the desired resolution required to provide sufficient precision for any particular application. If the indicated distance between vehicle 404 and a surface, such as wall 602, is less than six feet, the probability value assigned to the cell corresponding to that location in the map is incremented once. The probability value corresponds to the probability that a surface has been detected by one or more of the transducers. After the room has been completely traversed, the data is thresholded to remove noise and achieve the best map definition. The map can next be manually edited to add additional features, such as hidden lines, doorways, etc. Each object in the world model is then automatically "grown" by half the width of the vehicle in order to model the vehicle as a point during the Find-Path operation, described further within this section. This growth is represented by the outer perimeter 636 of operating environment 600.

When entering data from collision avoidance subsystem 419b (FIG. 1 and 3-7), a different scheme is used than the one for generating the world map, in that only five transducers $536_i$ (where i=1 to 5) in transducer array 536 are used, shown in FIG.'s 3 and 4. If a given transducer $536_i$ return (echo) shows that an object is within five feet of array 536, the cell at the indicated location of the return is incremented twice (up to a specified maximum). Also, the probability value assigned to each of the eight neighboring cells is incremented once, to partially take into account uncertainties arising from the 30-degree dispersion angle of the ultrasonic beam generated by array 536a.

In addition, each time a return is processed, all the cells within a cone 10 degrees wide and four feet long (or less if an object appears within four feet) have their assigned values decremented by 1. This erodes objects from the model that are no longer present, and also serves to refine the representation of objects as the vehicle approaches. Objects are erased from the map at a slower rate than they are entered, so that the vehicle tends to err on the side of not running in to obstructions.

An example of how data provided by collision avoidance system 419b may be transformed into a mathematical model of one example of an operating environment, such as environment 600, is presented in FIG. 10, where a path 648 from point A to point B, along which vehicle 404 (not shown) may be directed to follow, is obstructed by two obstacles 640. Other objects 642, 644, and 648 are also positioned within environment 600. A three dimensional probability distribution plot showing the perceived location of nearby objects in environment 600 is illustrated in FIG. 11. The floor area of environment area 600 is divided into cells (nodes) 650. The probability that any particular cell is occupied by an object is proportional to the upward projection of any cell along the "Z" axis.

The world map contains positional information about all the known objects in the environment. It may be either vehicle or human generated, or a combination of both. Techniques for creating maps of an operating environment or "motion area," suitable for use in the present invention are well known, as for example, those taught in U.S. Pat. No. 4,811,228, "Method of Navigating An Automated Guided Vehicle, by Kalevi Hyyppa, Mar. 7, 1989, incorporated herein by reference. In either case, only relatively immobile objects such as walls, inventory racks, desks, filing cabinets, etc., are recorded during the world map generation procedure, and used in the initial find path operation. Objects more likely to be transitory in nature are not recorded (chairs, trash cans, carts, etc), and present a problem during actual path execution, giving rise to the need for an effective collision avoidance capability. One method for generating the initial world map is to download data into the host computer, where the data represents the operating environment that is obtained from CAD drawings such as AutoCAD, a designing program by means of which any drawing can be reproduced in a microcomputer. A second method is to manually input data into the host computer where the data represents the coordinates of the features of the environment using the MAPEDIT.C subroutine (Appendix 18). A third method for generating the world map is to have vehicle 404 travel along its anticipated routes and use its sonar subsystem 418 to generate data regarding the features of the environment that is then provided to host computer 400. Also, a combination of all three methods may be employed to create or modify the world model. [Refer to U.S. Pat. No. 4,811,228, column 4, line 7 to column 5, line 6].

The path planner operates on the information stored in the world map to find a route from the vehicle's current position to its desired destination. The basic search algorithm begins by "expanding" the initial cell corresponding to the vehicle's current position in the floor map, i.e., each unoccupied neighbor cell is added to the "expansion list." Then each cell on the expansion list is expanded. This process continues until the destination cell is placed on the expansion list, or the list becomes empty, in which case no path exists.

When a cell is placed on the expansion list, a value indicating the direction to the parent cell is stored in the map array. Once the destination cell has been reached, retracing the path consists of merely following the directional arrows back to the source. During this process, only those points representing a change in direction (an inflection point) are recorded. The entire path is completely specified by the straight line segments connecting these inflection points. Details of this operation are presented in the following sections.

PATH PLANNER

Referring to Appendix 23, the path planner is implemented as a set of algorithms running on host computer 400 which enables autonomous vehicle 404 to be directed along a calculated path from the present position of vehicle 404 to a different position, where the positions are defined by Cartesian coordinates. Implementation of the path planner is, by way of example, a modification of techniques taught in: Winston, Patrick Henry, *Artificial Intelligence*, Addison-Wesley, Reading, Mass., 1984. However, it is to be understood that the scope of the invention includes other implementations of a world planner than those specifically presented herein.

There are four basic tasks the path planner must address in order to direct vehicle 404 from point A to point B. They are described immediately below with reference to FIG. 12:

1. Finding a path to the destination (point B), hereafter referred to as the "Find-Path" operation at step 800. If no path exists, then this operation returns a value of FALSE to the calling program.

2. Retracing (or backtracking) the path found by the above "Find-Path" operation (discussed more fully further herein) to create a list of straight-line segments describing the route from source to destination, where the source represents the present position (point A) of autonomous vehicle 404. This operation is performed at step 802.

3. Creating the movement commands which are ultimately directed to propulsion module 416 via local processor 402 in order to execute the path. These operations are performed at step 804.

4. If the path is successfully executed, then the path planner program is to return a "successful" status from step 806 to the calling program. Otherwise, the program returns to step 800 in order to plan a new path.

Inability of autonomous vehicle 404 to reach its intended destination is usually attributable to obstacles or closed doorways blocking the route. In that case, the planner returns to step 800 to try to find a different path.

The path planner includes the following subroutines: Find-Path, Expansion, Backtracking, Path-Execution, Segment-Execution, and Sonar-Mapping. These subroutines are described below.

FIND-PATH SUBROUTINE

As mentioned above, the Find-Path subroutine (Refer to Appendix 7) is a set of algorithms which implement a modification of an A* search which is described with reference to FIG. 13 below. The A* search is a type of search technique which is well known by those skilled in this art and which is taught in: Winston, Patrick Henry, *Artificial Intelligence*, Addison-Wesley, Reading, Mass., 1984. In the Find-Path subroutine, a mathematical model of the operating environment, also referred to more conveniently as a world map, is provided to this subroutine at step 807. The environment is divided into a finite number of squares. The world map is implemented as a two dimensional array of memory locations, and contains a byte for each square in the environment, such as a room, where the size of a square can range from one inch up to several feet, depending on the desired map resolution and the size of the operating environment.

Next, two special bytes are stored in this memory array at step 808 which represents the world map. One byte indicates the present location ("START") of vehicle 404; the second byte indicates the desired destination ("DEST"). During the A* search process, the host computer 400 looks for the floor cell containing the DEST byte and similarly, during the backtrack process, described below, the computer looks for the START byte.

Next, at step 810, information about the source cell (such as X-Y location, cost, distance traveled, etc.) is put onto a "frontier" list which is a list of points on the outer edge of the search envelope that are candidates for the "expansion" process, described more fully below. Putting the source cell on the frontier list "seeds" the path planner subroutine so that it has a cell to expand. A loop is then entered at step 812 that terminates only when there are no more cells on the frontier list or a path has been found. If the frontier list is empty, then no path is possible and the search fails.

The first step within the loop is to find all the cells on the frontier list with minimum cost at step 814 and then put them on the expansion list at step 816. The "cost" of a cell is typically some computation of how "expensive" it is for vehicle 404 to travel to the location represented by that particular cell. The actual cost function used in this implementation is described further herein.

Next, all the cells on the expansion list are expanded at step 818, as described more fully in the next section. If the destination cell is reached, a path has been found and the algorithm terminates with a solution and returns to the calling program from step 820. Otherwise, the loop continues with the new frontier list (updated by the expansion process).

EXPANSION SUBROUTINE

Referring to FIG. 14, the expansion routine (Refer to Appendix 7) performs most of the numerical processing. Very simply, the expansion process looks at all the neighbor cells of each cell on the expansion list. Each neighbor cell that is unoccupied and not on either the expansion or frontier list is placed on the frontier list. The actual details are discussed below.

A loop is entered at step 822 that terminates when all the cells on the current expansion list have been expanded. If no cells are left on the list, then a value of FALSE is returned from step 824 to the path planner at step 818, indicating that the destination was not reached during the current expansion and that further searching of the updated frontier list is necessary.

The next cell (or first cell if this is the first time through the loop beginning at step 822) on the expansion list is selected. First, a check is made to see if this cell can be expanded yet. The only cells that can be expanded are those whose corresponding byte in the floor map is equal to zero. If the value is not zero, this cell may be occupied by an obstacle which has been detected by the robot's sensors. If so, then the value is decremented at step 826 and the cell is put back onto the frontier list at step 828 to be expanded later. This technique enables vehicle 404 to travel a clear path in preference to a cluttered path, if a clear one exists. If no uncluttered path is found, vehicle 404 may still be able to traverse the cluttered path. The ability of the expand subroutine to determine alternative paths enables the robot to find a path even if the sonar data provided by sonar subsystem 418 is somewhat faulty.

If the contents of the current floor map cell are zero, then the cell can be expanded. Each of the cell's neighbors may be examined at steps 830, 832, or 834 to see if any of the neighbors are occupied or unoccupied. "Neighbor" in this case refers to the four cells immediately adjacent to the current cell, i.e., located to the north, east, south and west of the current cell. These four "neighbors" may also be referred to as the "4-connected" neighbors. If the neighbor contains the special byte "DEST," then a path has been found at step 832, the X-Y location of the cell is saved at step 836, and a "TRUE" status is returned from step 838 to step 818 of the Find-Path subroutine. Otherwise, if the neighbor cell is unoccupied it is placed on the frontier list at step 840. If it is occupied, it is ignored.

Additionally, each cell has a "cost" associated with it. As in a typical A* search, at step 842, the cost is set equal to the distance traveled from the initial position of autonomous vehicle 404 in order to get to the cell corresponding to the present location of vehicle 404, plus the straight line distance to the destination cell. This is guaranteed to be less than or equal to the actual total distance from the source cell (present location) to the destination. This particular cost function tends to make the search expand in a direction towards the goal, thereby decreasing the search time. However, if the cell is determined, at step 830, to be on a "freeway" guidepath stripe, then the cost of that cell is set to zero at step 844. This forces the expansion to preferentially hug the stripe, which is a high-speed path.

Finally, "arrow" information, used by the backtracking subroutine, described below, is stored in the floor map cell corresponding to the current neighbor at step 846. An "arrow" is one of four values indicating direction, i.e., north, south, east, and west. The arrow indicates the direction to the neighbor's parent, which is the cell currently being expanded.

Control is now returned from step 840 to the top of the loop at step 822.

BACKTRACKING SUBROUTINE

Referring to FIG. 15 and Appendix 23, backtracking (also called retracing or segmentation) is a subroutine that creates a list of path segments which describe the desired path, based on the contents of the current floor map following the Find-Path operation, as described above. The procedure is very simple. Starting with the destination cell, the steps presented below are performed:

1. Follow the arrow in the current cell to the next cell.

Make the new cell the current cell.

2. Return to the program that called the path planner if the new cell contains the value START, indicating that a path to the destination has been found.

3. Return to step 1, above, if the direction arrow of the current cell is the same as the direction arrow of the previous cell.

4. Add the current X-Y coordinate to the path segment list and update the segment counter.

The output of the backtracking subroutine is a list of X-Y coordinates describing the "waypoints" through which vehicle 404 must pass in order for the vehicle 404 to reach the ultimate destination.

PATH EXECUTION SUBROUTINE

Referring to FIG. 16 and Appendix 23, once a path segment list has been found, vehicle 404 must then physically traverse the calculated path to reach the destination. Each segment of the path is executed individually in a loop beginning at step 860, whereby this process consists of having vehicle 404 turn to the required heading and then having it travel in a straight line for a predetermined distance.

Additionally, at steps 862 and 864, the path execution program checks to see if the current path segment ends on a freeway guidepath stripe or follows such a stripe. If the path segment is determined at step 864 to end on a stripe, then vehicle 404 is directed by step 868 to enter the "stripe acquisition" mode. In this mode, vehicle 404 is not initially located over a stripe, but runs across it during execution of the path. If the segment follows a stripe, then vehicle 404 should already have acquired the stripe during the execution of the previous path segment, and it should now enter the "stripe following" mode. These modes are discussed in greater detail further herein under the section entitled "Guidepath Tracking Subsystem."

Control is passed to the segment execution routine at step 870. A status condition is returned from step 871 to step 804 of the path planner, where the status condition indicates whether or not vehicle 404 was able to successfully execute the segment. If it was successful, then the subroutine proceeds to step 860 where the next path segment (if any) is executed. Otherwise, an error condition is returned from step 871 to step 804 of the path planner.

SEGMENT-EXECUTION SUBROUTINE

Referring to FIG. 17 and Appendix 23, during the execution of a subroutine referred to as "Segment-Execution," the planner performs a number of tasks. First, step 872 sends a command to propulsion module 416 to begin moving forward for a predetermined distance required by the path segment. Next, "Segment-Execution" enters a loop at step 873 which looks for status packets sent back by local processor 402. These consist of one or more of the following:

1. A "move complete" report, indicating that propulsion module 416 has finished moving the desired distance. If this occurs, an indication of successful status is returned by step 874 to step 870, illustrated in FIG. 16.

2. An "obstacle" report, indicating that propulsion module 416 has stopped because an obstacle detected by sonar subsystem 418 impedes its path is returned by step 875 to step 870, illustrated in FIG. 16.

3. A "dead-reckoning" update. The present dead-reckoned position of vehicle 404 is updated in the world map at step 876.

4. An indication that a stripe has been found during the stripe acquisition mode is provided to host computer 400 is provided by step 877. The status byte, which is a variable of the path planner, is set to indicate stripe acquisition. Either the X or Y position variables of the path planner (i.e., one axis only) is updated.

5. A collision avoidance sonar packet is provided when sonar data is received by local processor 402, at which time the "sonar-mapping" subroutine, represented by the flowchart of FIG. 18, is invoked and the current representation of the world map is updated at step 878.

The loop beginning at step 873 is repeated until either of the steps 874 or 875 within the loop is executed.

SONAR-MAPPING SUBROUTINE

Referring to FIG. 18 and Appendix 21, "sonar-mapping" is a subroutine that receives the range information obtained by collision avoidance subsystem 419b which is then used to update the local map. Although in the preferred embodiment, range information is obtained by use of ultrasonic transducers 536i, other types of sensors could also be used to acquire such information, as for example, laser or optical range finders.

One of the primary sources of errors with ultrasonic sonars is specular reflection. In order to reduce the number of erroneous sensor readings due to these types of errors, all detected ranges greater than five feet are ignored. Whenever a range reading is five feet or less, the value of the cell at the indicated range and bearing is incremented twice (up to some maximum, as for example, 16), and each of its 8-connected neighbors (all 4-connected neighbors plus each of the diagonals) is incremented once.

During the execution of this subroutine, sonar range returns or packets provided by processor 532 through local processor 402 to host computer 400 are processed and mapped. The sonar packets are decoded at step 880. Then a loop is entered at step 881 that continues until each range has been processed. At step 882, the range is compared with five feet. If the range is greater than five feet, then processing proceeds to step 884. Otherwise, a transient obstacle will be added to the map at step 883 by incrementing the appropriate cell (indicated by the current range and bearing) by two, and each of the eight surrounding cells by one. This is the manner in which transient obstacles are added to the map. In step 884, all of the cells in a ten degree cone emanating from the location of the transducer out to the range return or four feet, whichever is less, ares decremented by one. This is the way that transient obstacles that are no longer detected are gradually erased from the map.

COLLISION AVOIDANCE

For a vehicle to be truly autonomous, it must cope with the classic problem of avoiding an unexpected, unmapped obstacle. In the present invention, all collision avoidance sensor information is statistically represented in the world map, based on the number of times that an object was detected at a given cell location. Conversely, when a previously modeled object is no longer detected at its original position, the probability of occupancy for the associated cell is decreased; if the probability is reduced to zero, the cell is again regarded as free space. Transient objects are added to the world map as they are encountered, and subsequently removed from the model later if no longer detected at the same location. Since previously encountered obstacles are recorded in the world map, the vehicle can avoid them at the planning stage rather than during path execution.

A sample map created in this fashion is depicted in FIG. 11. Free space is represented by an array value of zero and is shown in by the plane coincident with the X-Y plane. It is important to note that object space is subdivided into the two categories of permanent (displayed as having cross-hatched top surfaces) and transient objects (having black top surfaces). An example of a transient object is a doorway which can be open or closed or the vehicle's battery recharging station, not shown.

This distinction between permanent and transient objects is an important feature which is largely responsible for the robust nature of the modeling scheme employed in the present invention. Permanent objects remain in the model as a baseline from which to restart if the model for some reason becomes overly congested and must be flushed; only the transient objects are deleted. In addition, the path planner will always avoid permanent objects and their associated growth, whereas if necessary, the planner can "eat through" temporary growth surrounding transient objects in an attempt to find a path. This ability was found to be necessary in cluttered environments because the growth operation often closes off feasible paths due to inaccuracies inherent in the range data. The cost of traversing growth increases linearly in the direction of the associated object, to minimize chances of a collision.

On completion of a path, all the transient cell probabilities are decreased by a small amount. This forced "amnesia" helps to eliminate sensor noise, and over a period of time causes all transient objects to be erased from areas that are seldom visited. This is advantageous in dynamic environments where it is likely that the position of objects has changed since an area was last mapped by the vehicle.

As stated earlier, the validity of the model is highly dependent upon the dead-reckoning and position estimation accuracies of the vehicle. Minor errors in perceived heading can result in considerable positional uncertainties after straight line runs of any significant length, as for example, 10 to 15 feet. Accordingly, it is necessary to provide the path planner with periodic position updates which accurately reset variables representing the absolute position and orientation of the vehicle. In addition, unrestricted, path-planner directed transit through a congested room is somewhat slower than is desirable in some applications, in that the vehicle must feel its way around newly discovered transient objects.

The hybrid navigational scheme of the present invention overcomes these two drawbacks while preserving the free-roaming flexibility of unrestricted absolute (world coordinate) control by merging elements of reflexive control into the subsystem. Certain highly-traveled runs (i.e., a straightline run down a long hallway, or through the center of a large warehouse) are designated as "freeways" and marked accordingly with some type of guidepath as is commonly used by automated guided vehicles. The vehicle traverses this path, which is kept relatively obstacle free, at significantly higher speeds than typically possible in the autonomous mode. The absolute lateral position and orientation of the path is known by the planner, and the path is encoded every three feet so as to provide a position reference along the longitudinal axis as the vehicle moves. These specially marked locations are referred to as "exits" in keeping with the freeway analogy.

Under this scheme, the path planner calculates the nearest intercept with the freeway in planning a route to a given destination. The vehicle then moves in the "unrestricted" autonomous mode to intercept the freeway, at which point a transition is made to reflexive "guidepath" control. The vehicle travels down the freeway to the exit determined by the planner to be most appropriate for the goal position. At the appropriate exit, the vehicle resets its position and heading to the coordinates of the exit, leaves the freeway and resumes autonomous transit. Each time the vehicle returns to the freeway at various points in the course of normal operations, the dead-reckoning system is reset to preserve the accuracy of the modeling which takes place when in the autonomous mode.

AUTONOMOUS VEHICLE

Referring to FIG.'s 2, 8, and 19, autonomous vehicle 404 is a mobile system which includes local processor 402, propulsion module 416, guidepath follower subsystem 414, and sonar subsystem 418. Sonar subsystem 418 includes navigational control subsystem 419a and collision avoidance subsystem 419b. Propulsion module 416 is a mobility platform which can receive instructions which direct it along a particular path and provide its initial position. Guidepath follower subsystem 414 provides data to host computer 400 which in turn directs propulsion module 416 to follow a specified guidepath such as a stripe located on the floor of the environment in which autonomous vehicle 404 operates. Collision avoidance subsystem 419b provides data to host computer 400 via local processor 402 that indicates the presence of obstacles that may obstruct the path of autonomous vehicle 404. Navigational sonar system 419a provides data to host computer 400 via local processor 402 that is used to create the world map. Local processor 402 coordinates the operations of guidepath subsystem 414, propulsion module 416, and sonar subsystem 418. More detailed descriptions of each of these subsystems which comprise autonomous vehicle 404 are presented further herein.

LOCAL PROCESSOR

Figure 2:
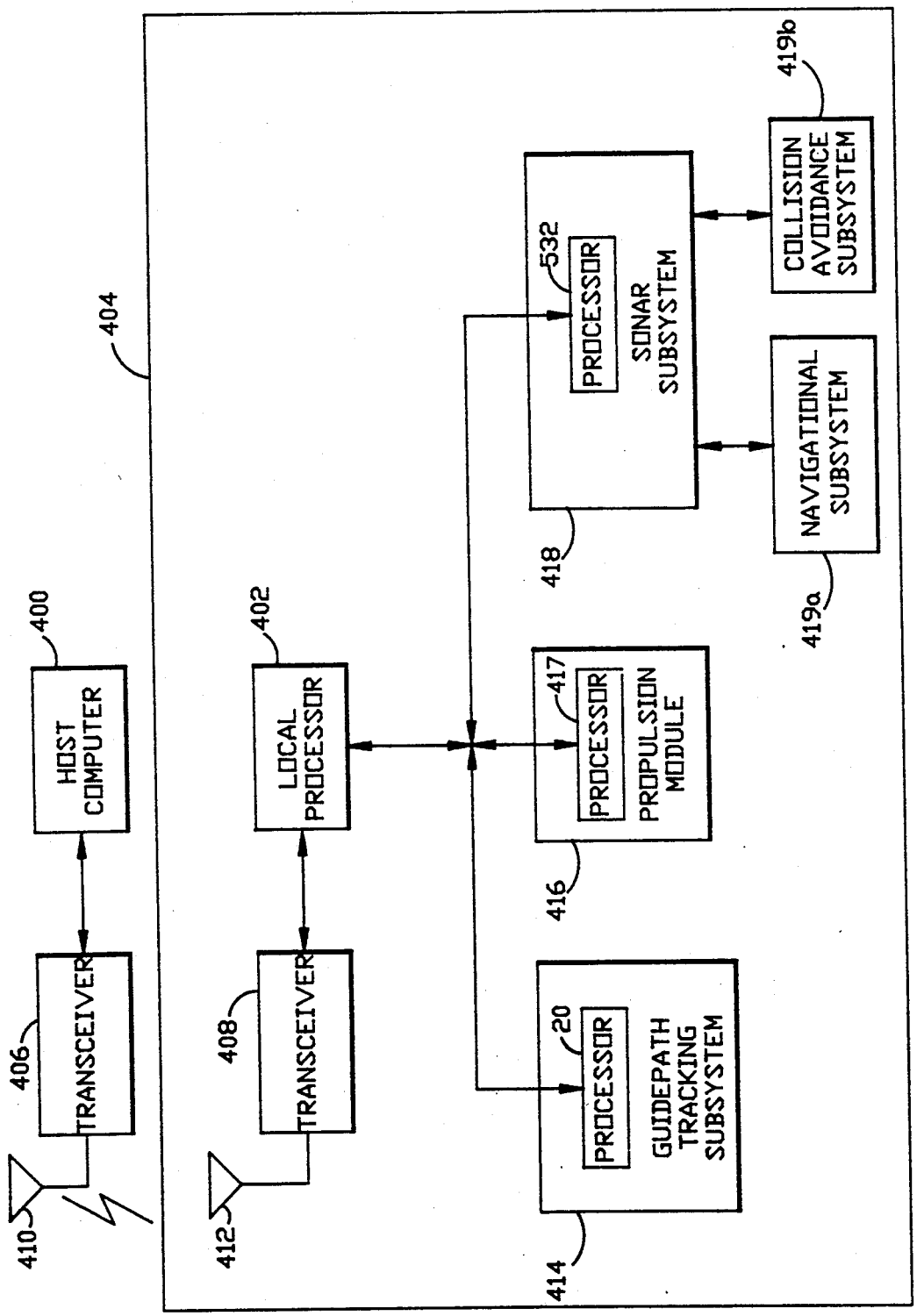
FIG. 2 is a functional block diagram of a hybrid navigational system of the present invention.
Figure 3:
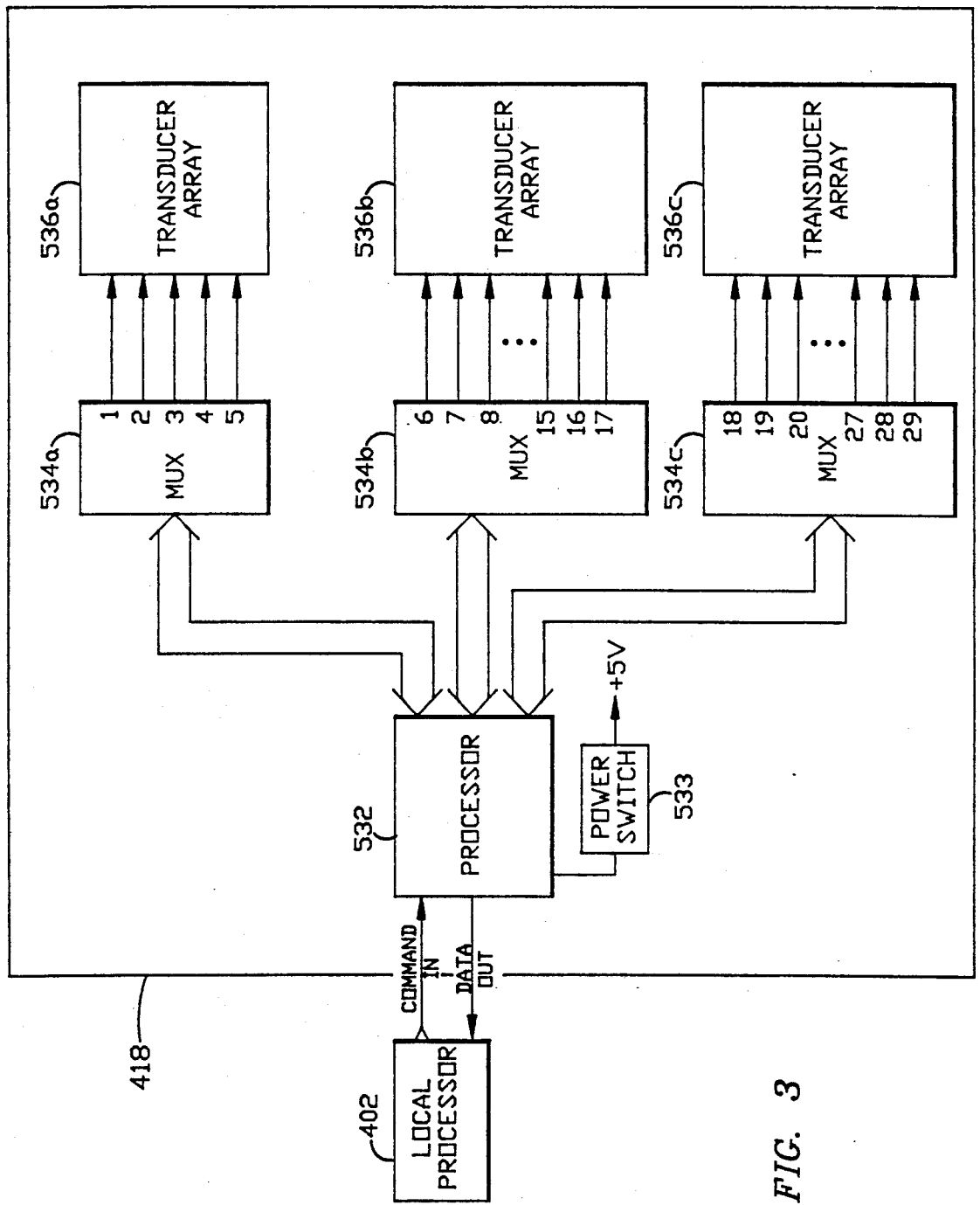
FIG. 3 is a functional block diagram of the sonar subsystem.

Referring to FIG. 2, local processor 402 coordinates the operations of guidepath tracking subsystem 414 through processor 20, propulsion module 416 through processor 417, not shown, that is generally included with commercially available propulsion modules of the type employed in the preferred embodiment, and sonar subsystem 418 through processor 532, all part of autonomous vehicle 404. Local processor 402 performs the following functions: 1) receives high level instructions from host computer 400; 2) coordinates onboard activities of all subsystems; 3) passes drive commands to propulsion module 416; 4) receives X-Y position and heading updates from processor 417 of propulsion module 416; 5) receives range and bearing data describing surroundings from processor 532 of sonar subsystem 418; 6) checks for potential collision conditions; 7) sends stop commands to propulsion module 416 if a collision is eminent; 8) receives data from guidepath tracking subsystem 414; 9) checks for the presence of a guidepath such as a stripe which may be located on the floor of the operating environment; 10) calculates steering corrections for propulsion module 416; 11) checking for the presence of longitudinal displacement markers; 12) resets dead-reckoning registers in propulsion module 416; and 13) passes required positional and sonar information to host computer 400.

Local processor 402 may be programmed to perform the above recited functions in a high level language such as "C", or in an assembly language, such as 6502, in accordance with well known techniques.

PROPULSION MODULE

Referring to FIG.'s 2, 8, and 19, mobility and dead-reckoning position determination of autonomous vehicle 404 depends on two degree-of-freedom, computer-controlled propulsion module 416 whose motion is directed by local processor 402 which is mounted on autonomous vehicle 404. Local processor 402 provides output instructions to processor 417 of propulsion module 416 in response to data received from host computer 400 so that automonous vehicle 404 may follow a path calculated by host computer 400, or in response to information received from guidepath tracking subsystem 414 so that vehicle 404 may follow a guidepath stripe along a predesignated route which may be suitably marked on the floor of the operating environment. Processor 417 is typically provided as a component of commercially available propulsion modules of the type employed in the preferred embodiment of the present invention.

Referring to FIG. 2 and Appendix 2, commands are passed by local processor 402 to processor 417 that controls propulsion module 416 over a serial or parallel bus as a series of hexadecimal bytes which specify: (1) the direction in which to move or pivot, (2) the velocity, and, (3) the duration (distance or number of degrees.) The functions of propulsion module 416 include executing movement commands received from local processor 402 and performing dead-reckoning calculations. In an example of the preferred embodiment, these commands are:

Byte 1—Type Motion Requested (00 to 07)
00—Move forward
01—Move reverse
02—Pivot left
03—Pivot right
04—Offset left
05—Offset right
07—Stop
  Byte 2—Requested Velocity
Upper nibble is the port motor velocity;
Lower nibble is the starboard motor velocity.
  Byte 3—Distance to Move (Inches) or,
Duration of Pivot (Degrees) or,
Amount of Offset (Tenths of Degrees)

Velocity control and acceleration/deceleration ramping are performed by processor 417 on an interrupt basis, while the main code performs all dead reckoning calculations. Cumulative X and Y components of displacement as well as current heading, $\Theta$, are passed up the hierarchy via local processor 402 at recurring intervals so that host computer 400 knows the location of autonomous vehicle 404 in order to integrate data from sonar subsystem 418 into the world model which is constantly being updated with new information. The programming which enables local processor 402 to control propulsion module 416 is typically provided with commercially available propulsion modules similar to the type described above. Specific models of examples of this type of vehicle are provided further herein.

Also referring to FIG.'s 8 and 19, propulsion module 416 includes a pair (only one wheel is shown in each of FIG.'s 8 and 19) of coaxially aligned wheels 422 which are each driven by separate motors 424 which enable propulsion module 416 to be differentially steered by rotating each wheel 422 by different amounts, both in angular displacement and direction. Wheels 422, may for example, have 8-inch rubber tires, which when coupled with motors 424, provide a quiet, powerful propulsion subsystem with minimal wheel slippage. Passive casters 423 mounted to propulsion module 416 provide it with stability. Armature shafts 428 of motors 424 are each coupled to a high-resolution optical rotary shaft encoder 426 that provides phase-quadrature, square-wave outputs, where each square-wave output corresponds to a specific increment of angular displacement of a wheel 422. By way of example only, in the preferred embodiment, encoders 426 produce 200 counts per revolution of armature shaft 428, which translates to 9725 counts per wheel revolution. Commands from local processor 402 direct the kinematics of the platform, as for example, heading, velocity, and acceleration. Processor 416 of propulsion module 416 provides host computer 400 with its instantaneously computed dead-reckoning position and heading which is calculated by counting the number and discerning the phase relationships of the square-wave outputs of each encoder associated with each wheel 422. Power to operate autonomous vehicle 404 is provided by battery 430 in accordance with well known techniques.

Programmable propulsion modules similar to the type described above, as well as the programming necessary to control their motion, are commercially available and well known by those skilled in this art. For example, a mobile base of the type represented by the "LabMate," manufactured by Transitions Research Corporation, 15 Great Pasture Road, Danbury, Conn. 06810, was found particularly suitable for this application. However, it is to be understood that the scope of the invention also includes the use of other programmable propulsion units, such as the "Navmaster" by Cybernation, 5457 Aerospace Road, Roanoke, Va., 24014, or a number of automated vehicles manufactured by Litton Industrial Automation Systems, Inc. 2200 Litton Lane, Hebron, Ky., 41048.

The theoretical underpinnings by which the dead-reckoned position of a differentially-steered mobile platform is determined and by which the motion and direction of such a platform may be controlled are discussed below.

Unit displacement D along the path of travel is given by the equation $$D = \frac{D_l + D_r}{2} \qquad (1)$$

where
  $D_l$ = displacement of left wheel
  $D_r$ = displacement of right wheel
Similarly, the platform velocity V is given by the equation $$V = \frac{V_l + V_r}{2} \quad (2)$$

where
- $V_l$ = velocity of left wheel
- $V_r$ = velocity of right wheel

Referring to FIG. 20, arc $D_l$ represents a portion of the circumference of a circle of radius $d+b$.

$$C_l = 2\pi(d+b) \quad (3)$$

where
- $C_l$ = Circumference of circle traced by left wheel
- $d$ = Distance between left and right drive wheels
- $b$ = Inner turn radius In addition, the relationship $$\frac{D_l}{C_l} = \frac{\Theta}{2\pi} \text{ yields } C_l = \frac{2\pi D_l}{\Theta} \quad (4)$$

Combining equations 3 and 4 and solving for $\Theta$ $$\Theta = \frac{D_l}{d+b} \quad (5)$$

Similarly, the shorter arc $D_r$ represents a portion of the circumference of a circle of radius $b$.

$$C_r = 2\pi b \quad (6)$$

where $C_r$ = Circumference of circle traced by right wheel
And the relationship $$\frac{D_r}{C_r} = \frac{\Theta}{2\pi} \text{ yields } C_r = \frac{2\pi D_r}{\Theta} \quad (7)$$

Combining equations 6 and 7 and solving for $b$ $$b = \frac{D_r}{\Theta} \quad (8)$$

Substituting this expression for $b$ into equation 5

$$\Theta = \frac{D_l}{d + \frac{D_r}{\Theta}} = \frac{D_l - D_r}{d} \quad (9)$$

Note that this expression for the change in vehicle orientation $\Theta$ is a function of the displacements of the left and right drive wheels and is completely independent of the path taken. Referring now to FIG. 21, wheel displacement $D_l$ is given by the equation $$D_l = R_{el}\phi \quad (10)$$

where
- $R_{el}$ = effective left wheel radius
- $\phi$ = wheel rotation (radians)

Expressing in terms of encoder counts yields $$D_l = \frac{2\pi N_l}{9,725} R_{el} \quad (11)$$

where $N_l$ = number of counts left encoder
Similarly, for the right drive wheel $$D_r = \frac{2\pi N_r}{9,725} R_{er} \quad (12)$$

where
- $N_r$ = number of counts right shaft encoder
- $R_{er}$ = effective right wheel radius Thus, it can be appreciated that counting wheel rotations can enable one to obtain an estimate of the position of an autonomous vehicle. Furthermore, it can be seen that an autonomous vehicle may be controlled to follow a predetermined path by imparting a series of instructions that result in rotation of each wheel by specific amounts.

The drive controller will attempt to make the robot travel a straight line by ensuring that $N_r$ and $N_l$ are the same. Note, however, that effective wheel radius is a function of the compliance of the tire and the weight of the robot, and must be determined empirically. In actuality, $R_{el}$ may not be equal to $R_{er}$. For some tires, the compliance (and hence the effective radius) was found to actually vary as a function of wheel rotation. In any event, it was found to be virtually impossible to precisely match the left and right drive wheel displacements while motor velocities were held constant, due to minor variations in the tire materials. Slight deviations in the autonomous vehicle's heading were observed after straight line runs of 15 to 20 feet, resulting in positional errors which accumulate as the mobile platform changes its position and heading.

GUIDEPATH TRACKING SUBSYSTEM:

Referring to FIG. 22, in the preferred embodiment, guidepath tracking subsystem 414, by way of example, is implemented as stripe follower subsystem 415 which is mounted on autonomous vehicle 404. The principal purpose of stripe follower subsystem 415 is to detect and track a guidepath located on the floor so that the position and heading of vehicle 404 can be accurately determined, thus eliminating accumulated dead-reckoning error. Control systems for guiding a vehicle over a reflective stripe applied to a floor, of the type employed in the present invention, are well known. For example, one such system, suitable for use in the present invention, is taught in U.S. Pat. No. 4,811,229, "Control System For Automatic Guided Vehicles," by Richard A. Wilson, Mar. 7, 1989, incorporated herein by reference.

Stripe follower subsystem 415 employed in the preferred embodiment of the present invention includes processor 20 of stripe follower subsystem 415 which receives commands from local processor 402 and provides an output to local processor 402 describing the lateral position and orientation of any detected guidepath stripe within the field of view of the active CCD camera 704 of stripe follower subsystem 415. When energized by the local processor 402, processor 20 does a power-on reset, initializes all input/output ports and resisters, and then waits for a command. In the preferred embodiment, commands are of the form:

Byte 1—Type Mode Requested
00—Acquisition Mode
01—Tracking Mode
Byte 2—Direction of Intended Travel
00—Forward
01—Reverse The stripe follower subsystem 415 consists of a controlling processor 20, illustrated in FIG. 22 that selectively controls the activation of conventional CCD cameras 704, each equipped with a wide-angle lens, through dual input switches 705, and the activation of ultraviolet light source 706 through input switches 708, and video line digitizer 10 (Refer to FIG.'s 22-25). Each camera 704 is positioned so that the camera lens faces downwardly so as to view the guide path along the floor of the operating area within the operating environment. Optical filters 710, such as Vivitar No. 10 green filters, may be placed over the lens of each camera 704 to maximize contrast between the floor surface of the operating environment and the stripe itself. Ambient lighting may be blocked by a shroud, not shown, surrounding the field-of-view of each camera 704. Each ultraviolet light source 706 may consist of one or more ultraviolet lamps, which in the preferred embodiment are three 4-watt lamps such as Ultraviolet Products, Inc., Lamp No. 34001001. These ultraviolet lamps may be arranged under a cylindrical reflector (not shown) of the type that would be well known by those skilled in this technology so as to provide a footprint of illumination on the floor of the operating environment which may be 2 inches by 15 inches. A chemical guidepath stripe, normally invisible under ambient lighting conditions, will fluoresce brightly when irradiated by ultraviolet energy from ultraviolet light sources 706. All three lamps of sources 706 are active when the stripe follower subsystem 415 is in the stripe acquisition mode, where the stripe follower subsystem is looking for the stripe. In order to save energy, only the center lamp of each source 706 remains energized once a stripe has been located and stripe follower subsystem 415 is in the "stripe following" mode with the stripe centered in the field-of-view of one of the cameras 704. Although the guidepath tracking subsystem 414 has been described as a stripe following subsystem, it is to be understood that the scope of the invention comprehends the use of other types of guidepath tracking subsystems such as a wire-guided system or light-beacon-guided system, as are commonly employed on AGV's.

Although not shown, CCD cameras 704 and the associated ultraviolet light sources 706 can be located at either end of a conventional AGV to allow stripe tracking in either the forward or reverse direction of motion of vehicle 404. Alternatively, on a highly maneuverable robotic vehicle, only one CCD camera 704 that faces the forward direction of vehicle 404 may be necessary.

Stripe follower subsystem 414 is activated by local processor 402 which provides instructions to processor 20 via serial port 703a or parallel port 703b upon instructions from the host computer 400, whereupon processor 20 provides power to the appropriate video camera 704, depending on the direction of travel of vehicle 404, and the corresponding ultraviolet light sources 706.

When directed by host computer 400 via local processor 402, stripe follower subsystem 414 then enters the "acquisition" mode to begin searching for the stripe, and switches to the "tracking" mode once the stripe has been located. In the tracking mode, processor 20 provides calculated stripe offset information back to local processor 402 through either port 703a or 703b after each video frame, and powers down the two outer ultraviolet lamps 706 to save electrical power. The world model maintained on host computer 400 contains information describing the locations and orientations of all freeways, and can direct autonomous vehicle 404 to follow a guidepath stripe such as that illustrated in FIG. 26. By updating the dead reckoning position of the autonomous vehicle 404 with the known locations of any one of a multitude of predetermined displacement markers 308 on stripe 300, depicted in FIG. 31, host computer 400 can maintain an accurate position fix for autonomous vehicle 404.

The output of the stripe following camera is provided to reconfigurable video line digitizer 10 which may be embodied as described below. Up to three predetermined lines of an NTSC video signal can be selected to represent the top, middle, and bottom of the field-of-view of the camera so as to provide information on the orientation of the stripe, as well as its lateral position with respect to a reference point of autonomous vehicle 404. Minor discontinuities in the stripe which usually result from abrasion of the stripe over a period of time are less significant in that the line can be observed at three separate positions. This feature also provides extra opportunities to read encoded information that may be missed on the first pass of the camera scan over the stripe.

A general description of the reconfigurable video line digitizer is described immediately below and is followed by a more detailed description.

The video line digitizer converts predetermined lines of successive frames of a composite video signal, such as an NTSC video signal, into a digital data representation of the video signal. An NTSC signal consists of successive video frames having a fixed number of lines. Each line is composed of a fixed number of pixels where each pixel has an associated intensity. The digital data representation corresponds to the intensities of the respective pixels along the horizontal line. The digitizer also provides a digital output consisting of horizontal and vertical sync pulses extracted from the composite video signal and also provides a pixel clock output. A high speed, random access memory (RAM) receives the digital data representation from the digitizer and stores the data in memory upon receipt of an instruction from an address decoder/controller when the controller detects the beginning of a predetermined video line. Processor 20 receives an end-of-line control signal 40 from the digitizer in order to identify the end of the current video line, whereupon processor 20 downloads the data from the high speed RAM into a secondary storage RAM 44. This process of identification, storage, and downloading is repeated with the storage RAM 44 receiving digital data representations of predetermined lines of successive frames. Processor 20 uses this data to determine the lateral position and angular orientation of the guidepath stripe.

The step of acquiring this predetermined line, in the preferred embodiment, is accomplished through use of an external event counter, used as a line counter, which can be accessed by the firmware resident on the controlling data processor. This line counter is reset for each new video frame by the associated vertical sync pulse, and automatically incremented by the arrival of a horizontal sync pulse at the beginning of each line. A second counter is needed to identify the start of actual video information at a predetermined time after the arrival of the horizontal sync pulse, in order to ensure that digitization of the composite video signal begins at the proper time. A third counter is required to terminate the digitization sequence at the end of the video information on the predetermined line. The second and third counters are implemented directly in hardware as opposed to a combination of hardware/firmware in order to achieve the necessary quick response. The second counter is a delay counter that is driven by the pixel clock output of the video line digitizer, and reset by the horizontal sync pulse. The length of the desired delay is preset on a dip switch coupled to the delay counter. The third counter is a pixel counter which is then started after the delay counter times out.

The pixel counter directly increments the address of the high-speed video RAM, allowing it to store incoming data provided by the digitizer. This process is repeated for each new line in the frame, with the previously stored data values being overwritten by new data for the current line. When the internal line counter indicates to the data processor that the desired line has been stored in RAM, the data acquisition process is halted. Thus, values corresponding to the grey scale levels of the pixels that comprise the predetermined line are stored in the RAM. At this point the line digitizer switches from the data "acquisition" mode to a data "processing" mode, whereby the data processor transfers the contents of the video RAM into a storage RAM, accessible by the data processor for subsequent analysis. This acquisition cycle is continuously repeated to provided updated information about the position and orientation of the guidepath stripe.

Referring to FIG. 23, which illustrates a functional block diagram of reconfigurable video line digitizer 10, there is shown video line digitizer (VLD) 12 which receives composite video signal 13. Composite video signal 13 may be provided, as shown by way of example only, from video camera 704. Composite video signal 13 consists of successive frames each having a fixed number of lines that are composed of a number of pixels. One example of a composite video signal of this type is a National Television System Committee Standard (NTSC) video signal. Video digitizer 12 outputs digital synchronization signals consisting of information extracted from the composite video signal that can be correlated with frame arrival, horizontal line arrival, and pixel count; and converts the analog portion of the composite video signal (i.e., the active picture interval in FIG. 27) to a data representation of the intensity of each pixel of a horizontal line of the composite video signal. The data output representation is provided to double-buffered high-speed RAM (random access memory) 16 from digitizer 12.

Address controller 18 receives the sync signals from video line digitizer 12 from which address controller 18 continuously monitors the line number and pixel count of composite video signal 13 in real time. Address controller 18 provides address location control for double-buffered RAM 16 that allows RAM 16 to store the incoming data corresponding to the predetermined line in specific address locations. Upon the arrival of the predetermined line, address decoder controller 18 provides address information through output 38 to RAM 16 which directs RAM 16 to store the data being received by RAM 16 in particular memory addresses, as would be well known by those of ordinary skill who practice in this field of technology. Storage of a digitized data representation of the predetermined line of composite video signal 13 continues until a predetermined number of pixels are counted by an internal counter (not shown) in address controller 18 which receives pixel counts from VLD 12, and provides an end-of-line output 40 to data processor 20.

When the predetermined number of pixels are counted by address controller 18, data processor 20 prevents RAM 16 from storing any more data in accordance with a signal provided by a control link between data processor 20 and RAM 16. This process by which incoming data corresponding to a predetermined line of video is stored may be referred to as the "data acquisition" mode of line digitizer 10.

Upon receipt of the end-of-line signal 40 from address controller 18, data processor 20 provides the appropriate address and control signals to double buffered RAM 16 whereby the data stored in RAM 16 is downloaded to another RAM (not shown) which is accessed by data processor 20 in order to analyze the data. Data processor 20 provides an output over link 50 which is functionally related to differences in pixel intensities for a given line, or between corresponding pixels of the same predetermined lines of successive frames. Optionally, a video monitor, such as video monitor 15, may be operably coupled to receive composite video signal 13 to provide a video image of the visual scene being digitized.

FIG. 24 presents a more detailed view of reconfigurable video line digitizer 10 than does in FIG. 23, where video line digitizer 12 is shown to include sync stripper 12a and analog-to-digital converter 12b. A sync stripper is a circuit that extracts horizontal and vertical synchronization signals from a composite video signal and is well known to those skilled in this technology. Sync stripper 12a receives composite video signal 13 and extracts vertical synchronization information provided by output 30, horizontal synchronization information provided by output 32 from the composite video signal, and generates pixel clock timing information provided by output 34. Analog-to-digital converter 12b converts analog portion of composite video signal 13 into a digital representation of composite video signal 13 that is provided at output 36.

Data output 36 is received by random access memory (RAM) 16 through buffer 16a which is enabled upon receipt of a VLD buffer-enable signal provided by output 37 from data processor 20 while buffer 16b is in a disabled condition. Storage of the digital representation of predetermined lines of the composite video signal in video RAM 16 is initiated by address decoder/controller 18 when it determines the presence of the predetermined line of interest, using information derived from horizontal sync output 32 and pixel clock output 34.

Data processor 20 receives vertical and horizontal synchronous outputs 30 and 32, respectively from video line digitizer 12 and is alerted to the "end-of-line" by output 40 of address decoder/controller 18. When the pixel count reaches a predetermined value, such as "512" when composite video signal 13 is an NTSC signal, the "end-of-line" signal provided by output 40 changes state, and data processor 20 directs reconfigurable video line digitizer 10 to change from the "data acquisition" mode into the "data processing" mode of operation. In this mode, data processor 20 provides a "processor-enable" signal through output 42 to enable buffer 16b, while buffer 16a is simultaneously held in a disabled condition, thereby allowing the data stored in video RAM 16 to be down loaded to storage RAM 44 of data processor 20. Data processor 20 also provides address information through output 46 to address controller 18. This information in turn is provided through output 48 and buffer 16b to RAM 16 so that the data stored in RAM 16 is accessed and downloaded through data bus 43 in proper sequence, by techniques well known by those skilled in this art.

The data "acquisition" and data "processing" modes are cyclically repeated so that after digital representations of predetermined lines are stored in RAM 44, data processor 20 processes the data in order to detect some particular scene attribute, such as discontinuities in pixel intensity values associated with edges. Data processor 20 also provides a signal through output 50 which is functionally related to differences in pixel intensity values. Mathematical techniques for manipulating digital intensity data such as stored in RAM 44 are well known by those skilled in the field of image processing, as are techniques for programming a data processor to accomplish these tasks.

Referring to FIG. 25, which illustrates a detailed block diagram of one means of implementing line digitizer 10 that further expounds upon FIG. 24, there is shown video line digitizer (VLD) 12 which includes sync stripper 12a and flash analog-to-digital converter 12b. Video line digitizer 12 receives composite video signal 13, and provides vertical sync output 30, horizontal sync output 32, pixel clock output 34, and data output 36. Vertical and horizontal sync outputs 30 and 32, respectively are provided to data processor 20. Video line digitizer 12 may be implemented as a microchip, model number AD9502, manufactured by Analog Devices, Norwood, Mass. Optionally, operational amplifier 102 may be electrically interposed in series between the video output of a video source such as camera 704 (shown in FIG. 22) and composite video input signal 13 of video line digitizer 12 in order to isolate the output of video camera 704 from line digitizer 12.

Double-buffered video RAM 16 includes RAM input buffer 16a having VLD data buffer 120 which includes data output 122 and data input 123. Output 122 is operably coupled to data input 127 of random access memory (RAM) 16, and data input 123 is operably coupled to data output 36 of video line digitizer 12. RAM 16, a high speed device, includes data output 126 and address input 128. RAM input buffer 16a also includes VLD address buffer 130 having input 131 and output 132. Double buffered video RAM 16 includes data processor address buffer 135 having address input 136 and address output 137. Address output 132 of VLD address buffer 130 and address output 137 of processor address buffer 137 are operably coupled to address input 128 of RAM 16. Processor data buffer 140 includes data input 142 operably coupled to data output 126 of RAM 16 and data output 143. Memory addresses are provided to address input 128 of RAM 16 so that digitized video data received through data input 127 of RAM 16 is sequentially stored in address cells so that the stored data can be retrieved later and located in a specific order. Buffers 120, 130, 135, and 140 serve as "switches" in order to provide selective access to RAM 16: video line digitizer 12 "writes" to RAM 16 through buffers 120 and 130; data processor 20 "reads" RAM 16 through buffers 135 and 140.

Address decoder/controller 18 includes flip-flop 150 having input 151 operably coupled to horizontal sync output 32 of video line digitizer 12 and output 152 that is operably coupled to input 155 of delay counter 156. Output 158 of delay counter 156 is operably coupled to enable input 167 of pixel counter 165. Delay counter 156 is operably coupled to dip switch 160. Pixel counter 165 includes clock input 166 operably coupled to clock output 34 of video line digitizer 12, address output 168 operably coupled to address input 131 of buffer 130, and end-of-line output 169. Address decoder/controller 18 also includes decoder 170 having address input 171, address output 172, and address output 173 operably coupled to address input 136 of processor address buffer 135. Address decoder 170 allows data processor 20 to also communicate address information to RAM 16.

Data processor 20 may be implemented as any suitable digital data processor or processor, such as an eight-bit, 2 MHz microcomputer, model MMC/102X, manufactured by R. J. Brachman Assoc., Havertown, Pa. Data processor 20 includes horizontal sync input 182 operably coupled to horizontal sync output 32, vertical sync input 184 operably coupled to vertical sync output 30, data input 186 operably coupled to data output 143 of processor data buffer 140, end-of-line input 188 operably coupled to output 169 of pixel counter 165, and address output 190 operably coupled to input 171 of decoder 170. Data processor 20 also includes RAM 44 which receives data from RAM 16 via data input 186 through means, not shown, as would be readily understood by one skilled in this field of technology. RAM 44 also includes address input 204 operably coupled to address output 172 of decoder 170 and stores the data upon which mathematical operations are performed by data processor 20. The operation of line digitizer 10 is described with respect to FIG. 25 as follows: An external event line counter (not shown) incorporated into the firmware resident in data processor 20 identifies the desired line for digitization. This external event line counter is reset for each new frame of video by receipt of a vertical sync pulse provided by vertical sync output 30 from video line digitizer 12 and is incremented line by line with the arrival of each horizontal sync pulse provided by horizontal sync pulse output 32. Delay counter 156 identifies the beginning of video data in the composite signal at a predetermined time after a horizontal sync pulse is received in order to ensure that digitization of video data begins at the beginning of the horizontal line of interest (See FIG. 27). Pixel counter 165 identifies the end of the data to be recorded in order to properly terminate the digitization sequence at the end of the line. Counters 156 and 165 are preferably implemented in hardware as opposed to software in order to achieve the quick response necessary to store this data in real-time.

Still referring to FIG. 25, delay counter 156 is driven by the pixel clock output of video line digitizer 12, and is reset by a horizontal sync pulse which causes flip-flop 150 to change state. The length of the desired delay of delay counter 156 is determined by the settings of dip switch 160. In the preferred embodiment, dip switch 160 is set to provide a delay of approximately 90 clock pulses so that storage of the digitized data begins at the beginning of a horizontal video line (See FIG. 27). However, the setting of dip switch 160 may vary slightly, depending on the characteristics of the composite video signal. Pixel counter 165 then is started after delay counter 156 times out and begins to increment the outputs corresponding to addresses of RAM 16 while RAM 16 successively stores the digitized outputs of video digitizer 12. This process is repeated for each new line in the frame, with the previous values of video data stored in the address cells of RAM 16 being overwritten by new data for the current line. When the line counter of data processor 20 reaches a number corresponding to the predetermined line of interest and the pixel counter reaches a number corresponding to the last pixel in the line, the "data acquisition" process is halted, and the data "processing" mode commences.

In the data "processing" mode, output 194 of data processor 20 provides a signal to inputs 124 and 133 of buffers 120 and 130, respectively, in order to simultaneously change the operating states of buffers 120 and 130 in order to isolate RAM 16 from digitizer circuit 12. Data processor 20 also provides a signal from output 196 to inputs 138 and 144 of buffers 135 and 140, respectively, in order to simultaneously change the operating states of buffers 135 and 140, thus facilitating transfer of the data stored in RAM 16 to RAM 44 so that the data can be used for subsequent mathematical operations such as digital picture processing. Data link 50, which may be a parallel port or an RS-232 serial link coupled to data processor 20, provides a signal corresponding to the results of any processing algorithms intended to identify some particular scene attribute, to a host computer, data processor, or other microprocessor.

Techniques of digital picture processing are well known by those skilled in this field of technology, and are discussed in: Azriel Rosenfeld and Avinast C. Kak, *Digital Picture Processing*, Second Edition, Volumes 1 and 2, Academic Press, (1982). For example, techniques for thresholding, edge detection, and feature detection are discussed. Id., Volume 2, Chapter 10.

Data processor 20 may be programmed to "capture" a predetermined line of a composite video signal when in the "data acquisition" mode in accordance with the flow chart depicted in FIG. 28. Program 200 would most likely be implemented as a subroutine of a main program along with any other subroutines which may be used to process the "captured" data during the processing mode. Program 200 is entered at 202 and proceeds to 204 where a decision is made as to whether a vertical sync pulse has been received by data processor 20. If the answer to the decision at 204 is "NO," program 200 loops until a vertical sync pulse is received, after which the program instructs reconfigurable video line digitizer 10 to go into the data "acquisition" operating mode at 206, as previously described. Next, the program proceeds to 208 where a decision is made to determine whether a horizontal sync pulse has been received by data processor 20. If the decision is "NO," the program loops continuously until a horizontal sync pulse has been received, after which program 200 proceeds to 210 which directs data processor 20 to read the external-event line counter, which is incremented by arrival of horizontal sync pulses as previously described. Program 200 proceeds to 212 where a decision is made as to whether the line being read is the predetermined line of interest which is to be digitized and stored. The number of the predetermined line may be provided as an input to data processor 20 from another device, such as a host computer, not shown, via data link 50. If the line being read is not the desired line, the program goes back to step 208. Once a decision is made at 212 that the predetermined line of interest is being read, a decision is made at 214 as to whether the predetermined line has been completely read. If the decision at 214 is "NO," the program loops until the end of the predetermined line is indicated. Program 200 may then return to a main program as shown, which marks the end of the "data acquisition" phase.

Guidepath tracking systems, including ones that can identify and follow stripes are well known by those skilled in this technology. The nature of the stripe and the associated structured light source employed on the vehicle are chosen so that the presence of the stripe generates a significantly higher image intensity than that of the ambient background. Pixel intensity values 320, 322, and 324 across a horizontal line of video, depicted in FIG. 29, obtained from a camera viewing the stripe 300 of FIG. 26 will peak sharply as the left edge 304 is encountered, remain fairly constant across the stripe, and then drop sharply to ambient levels at right edge 306. In FIG. 29, pixel intensity is represented on the ordinal axis and pixel count number for an NTSC video signal is represented on the abscissa. Pixel values 321, 322, and 323 of FIG. 29 correspond with left edge 302, stripe 300, and right edge 306, respectively, whereas pixel values 320 and 324 correspond to the floor of the operating environment. One method of locating the stripe position would be to employ a classical "edge-finding" algorithm which thresholds the digital data representation to generate a binary image wherein each pixel has been reduced from 256 possible gray scale values to only two allowed states: stripe present or stripe absent. In this example, thresholding can be easily accomplished by first finding the maximum scene intensity value, and then multiplying that maximum by a scaling factor less than one (i.e., "0.85" which is typical). The resulting value then becomes the threshold for comparison: all pixel intensities below the threshold are discarded; all values above the threshold are attributed to the presence of the line.

Referring to FIG. 30, application of the thresholding algorithm to three predesignated video scan lines produces a series of line segments 330, 332, and 334 modeled within processor 20 that represent the detected guide path stripe which may, for example, be a line having an intensity that contrasts sharply with that of the floor of the environment when irradiated with visible or ultraviolet light. In the preferred embodiment, the stripe 300 of FIG. 26 is essentially invisible to the camera 704 under ambient lighting conditions, but becomes visible when irradiated with ultraviolet light. Determining the orientation or angle of the stripe 300 with respect to vehicle 404, from the line segments 330, 332, and 334, can be accomplished by calculating the arctangent of Y/X. The arctangent of Y/X is the quotient of the lengths of the sides of the right triangle abc, illustrated in FIG. 30, which falls between $-90$ degrees and $+90$ degrees, where zero degrees corresponds to the direction of motion of vehicle 404 being coincident with the longitudinal axis a—a of stripe 300, as shown in FIG. 26. The information regarding the orientation $\Theta$ as well as the left and right edges 304 and 306, respectfully, of stripe 300 is provided by processor 20 to local processor 402. Referring now to FIG.'s 26 and 29, the lateral positions of the edges of stripe 300 are reported as pixel displacements from the center of the camera 704 field-of-view, where negative displacements are to the left. As an example, a report from stripe follower subsystem 415 of the format "$-200-100$" would indicate that the left edge 304 of the stripe was 200 pixels to the left of center, and the right edge 306 was 100 pixels to the left of center. The offset of the center of the stripe 300 is the average of these two values, or $-150$ pixels in the above example. Local processor 402 then provides commands to processor 417 of propulsion module 416 whereby vehicle 404 is directed to center itself over stripe 300 and follow it. Local processor 402 looks at the magnitude of the stripe displacement from the center of the camera 704 field-of-view, and generates a heading correction command in accordance with the formula below:

Correction Magnitude = G (Offset Magnitude)

where G is a vehicle-dependant gain constant used to scale the correction to ensure stability of response. Alternatively, a lookup table could be employed to provide a correction magnitude value for each offset value. A non-linear response could also be employed to increase the rate of corrective turn in a second-order fashion, so as to react more strongly as the stripe 300 moved away from center. In this fashion, local processor 402 passes appropriate correction commands to alter the course of vehicle 404 in the direction of the detected guidepath. (Negative corrections alter course to the left; positive correction alter course to the right). A subsequent lateral position report of "−50 50" would indicate that the stripe 300 was centered, with the left edge 50 pixels to the left and the right edge 50 pixels to the right of the optical axis of camera 704. Alternatively, vehicle 404 can be made to follow the left edge 304 of stripe 300, or the right edge 306 of stripe 300, as opposed to the center of the stripe, by using the correct offset value above. This feature is useful when branches or intersections are employed in the guidepath, and it is desired to select one branch as opposed to the other. If for some reason the stripe 300 is lost, the special case report "000000" is used to indicate "stripe not acquired", whereupon local processor 402 directs stripe follower subsystem 415 to enter the "stripe acquisition mode." Methods by which an automated guided vehicle may be directed to follow a stripe are well known by those skilled in this field of technology. For example, one such system is taught in U.S. Pat. No. 4,811,229, "Control System For Automatic Guided Vehicles," by Richard A. Wilson, Mar. 7, 1989, incorporated herein by reference.

Referring to FIG. 31, guide path stripe 300 can be modified, as illustrated, to include displacement markers 308 which are represented by an increase in the width of stripe 300 at predetermined locations along the length of stripe 300. The increased width of displacement markers 308 enables the location of vehicle 404 within the world model to be updated with known coordinates. Detection of a displacement marker 308 is accomplished by stripe follower subsystem 415 perceiving a specific minimum increase in the width of the detected stripe 300. Two or more successive scans confirming this width increase (of a displacement marker) must be identified in order to reduce false marker detection. Obviously, the simplistic marker pattern 308 on stripe 300 can be replaced by a more complex pattern so as to be uniquely identifiable if so desired, but this is typically not necessary because the path planner "knows" approximately where the vehicle is to begin with so long as position ambiguity is an order of magnitude or so less than the distance between markers. Therefore, unique identification of each marker is not needed.

Referring now to FIG. 32, doorway guide path 350 is a special case of a guidepath stripe used to guide vehicle 404 through a narrow passage such as doorway 351. Apexes 352, where the branch segment stripes 353 intersect at both ends of stripe segment 354, serve as markers to provide a positive position reference which enables host computer 400 to update the location of vehicle 404. Diverging guide path segments 353 are provided at both ends of penetration stripe segment 354 in order to increase the likelihood of stripe acquisition by vehicle 404, because while searching for the stripe, vehicle 404 is likely to be somewhat displaced from its intended position due to accumulated dead-reckoning errors. Doorway guidepath 350 is applied to floor 302 of the environment and fluoresces in the visible light wavelengths when irradiated with ultraviolet light. Detection of apexes 352 is accomplished in a manner similar to displacement markers 308, as described above, because at the intersection of the two stripes at apexes 352, the width of stripe segment 354 is approximately twice that of stripe 300. Again, successive line segments of sufficient width would have to be identified in order to correctly detect the apex marker.

FIG.'s 32 and 33 comprise a schematic diagram that illustrates a specific means of implementing reconfigurable video line digitizer 10 and is offered by way of example only. It is to be understood that the scope of the invention comprehends implementation by means other than as specifically described herein, as would be apparent to one skilled in this art.

Referring now to FIG.'s 33 and 34, collectively, the output signal of one or more CCD cameras 704 is brought into one of two RCA jacks J1 and J2, which are in parallel. The composite video signal is then amplified by amplifier 102 (U16) which is an LH0002CN current amplifier. From the amplifier 102, the composite video signal is then brought into video line digitizer 12 (U6) which is an AD9502BM Video Digitizer from Analog Devices. This module receives a composite video signal and performs a flash analog to digital (A/D) conversion, producing 512 bytes per scan line of information in real-time. It also strips out the vertical and horizontal syncs from the composite video signal, making them available for synchronization, and provides a 9.83 MHz pixel clock. Two multi-turn 5K trim pots, one for gain and the other for offset, are provided in the circuitry for fine-tuning.

The VERT SYNC output 30 from video line digitizer 12 is sent to data processor 20 (MMC/102X microcomputer) over input 184 (PB7 and CA2), and read by the system firmware to begin frame processing. The HORIZ SYNC output 32 is sent to the MMC/102X over input 182 (PB6 and CA1), used to initiate scan line digitization. HORIZ SYNC is also inverted by U4 of delay counter 156 and used to clear the U1 DELAY END signal and the MSD LD input of flip-flop 150 (U1). The MMC/102X enables the "data acquisition" mode using output PB5; then when a HORIZ SYNC signal comes in, the horizontal delay counter 156 (U2 and U3) loads in the count from dip switch 160 (DIP SW-1) and begins counting PIXEL CLK pulses received from video line digitizer 12.

When a predetermined number of pixel counts has been reached (around 90 counts for an NTSC video signal), MSD counter U3 times out via RCO and causes the DELAY END signal of U1 to go low. This signal shuts down counters U2 and U3 and simultaneously releases U7 RST of pixel counter 165 which has been held high. This initiates the storing of actual video line data and allows the AD9502 to begin writing its A/D output to video RAM 16 (U13) as controlled by U7. U7 is a 14-stage ripple counter which now begins counting PIXEL CLK pulses. When PB3 of MMC/102X is low, the AD9502 has access to the dual-ported video RAM U13, which receives the A/D information. U7 of pixel counter 165 increments with each pixel count and thus provides addressing for inputs A0–A8 of video RAM (U13). A9 and A10 of U13 are controlled by PB0 and PB1 outputs labelled Blk0 and Blk1 from the MMC- 102X, and determine the present block of 512 bytes of digitized output that is to be received by U13 from U6. When a total of 512 pulses have been counted, the end-of-line output pin 14 of U7 (labeled Q10) goes high, which disables the PIXEL CLK gate on U5 of pixel counter 165 and tells the MMC/102X via PB4 that a video line has been digitized. As previously discussed above, data processor 20 (MMC-102X) maintains an internal counter that increments each time a HORIZ SYNC pulse is received from the AD9502, and allows the digitizer to continuously overwrite itself in video RAM, until the counter reaches the value of the selected line of interest. When digitization of this specified line is finished, the MMC/102X detects the end-of-line output of U7 going high via input PB4, and switches its output PB5 to low, disabling digitization. PB3 of MMC/102X is sent high, denying the AD9502 access to the dual-ported video RAM U13, and output PB2 is set low, which now gives the MMC/102X access to RAM U13. The MMC-102X then transfers digitized data corresponding to the predetermined line of interest from video RAM 16 (U13) to storage RAM 44 (U12), which is a standard 2K RAM accessed from D800 to DFFF.

SONAR SUBSYSTEM

Sonar subsystem 418 is described with reference to FIG.'s 3-7 and includes processor 532 which controls multiplexers 534a, 534b, and 534c that each control transducer arrays 536a, 536b, and 536c, respectively. Sonar subsystem 418 is comprised of two subsystems that each include processor 532. The first subsystem is navigational sonar subsystem 419a which may be used to scan the operating environment in order to provide data from which host computer 400 is able to construct the world model. The second subsystem is collision avoidance subsystem 419b which is used to detect obstacles in the path of vehicle 404 and provides data to host computer 400 so that the path planner program can attempt to determine a path which avoids the detected obstacle. By way of example, transducer arrays 536a, 536b, and 536c each include a series of ultrasonic transducers which are selectively activated as described further herein. Processor 532 provides data and receives instructions to and from local processor 402.

Navigational sonar subsystem 419a and collision avoidance sonar subsystem 419b are described in detail in the sections immediately below.

COLLISION AVOIDANCE SUBSYSTEM

Referring to FIG.'s 3-7, collectively, collision avoidance subsystem 419b includes processor 532, multiplexer 534a and transducer array 536a. Processor 532 of collision avoidance subsystem 419b receives commands from local processor 402 and provides ranges and bearings, detected by transducer array 536a, from autonomous vehicle 404 to nearby detected surfaces that may present obstacles in the path of vehicle 404. When an obstacle is detected within 5 feet of autonomous vehicle 404, host computer 400 updates the world model, as was discussed previously, using information provided by processor 532 through local processor 402 to host computer 400. This information consists of vehicle 404 heading Θ as well as X-Y position data. If local processor 402 determines that any range reading is less than some critical threshold distance (as for example, 18 inches in the preferred embodiment), indicative of an imminent collision between autonomous vehicle 404 and an obstacle, then local processor 402 sends a "halt" command to processor 417 of vehicle propulsion subsystem 416, and informs host computer 400 of this action. Host computer 400 then calculates a new path for autonomous vehicle 404 to follow that avoids the obstacle so that autonomous vehicle 404 may proceed to the predetermined location. Collision avoidance subsystem 419b employs a multitude of prepositioned transducers such as Polaroid electrostatic transducers that can be individually activated in any desired sequence by processor 532, thus enabling collision avoidance subsystem 419b to obtain range information in any given direction within an arc centered at the front of autonomous vehicle 404 that extends forward in a 60 degree conical pattern.

Referring to FIG.'s 3-7, collectively, the preferred embodiment of collision avoidance subsystem 419b includes transducer array 536a, which may for example, consist of 5 active ultrasonic ranging sensors $536_i$, where $i$ equals 1 to 5, spaced 15 degrees apart in an arc around the front of autonomous vehicle 404, as shown in FIG. 8. Processor 532 receives commands from local processor 402 and is operably coupled to multiplexer 534a that includes outputs which selectively and sequentially activate transducers $536_i$ in accordance with instructions provided by processor 532.

The details of multiplexer 534a are illustrated generally in FIG.'s 4 and 5. The five ultrasonic transducers $536_i$ are interfaced to ultrasonic ranging module 548 through 12-channel multiplexer 534a, in such a way that only one transducer, $536_i$, is fired at a time. The ultrasonic ranging module 548 may be a "Polaroid" ranging module, Model No. SN28827, as is well known. The heart of multiplexer 534a is a 4067 analog switch shown in FIG. 4. Processor 532 thus "sees" only one transducer $536_i$ at a time through ranging module 548 and multiplexer 534a, and the software of processor 532 merely executes in a loop, each time incrementing the index which thus enables a specific transducer $536_i$ of transducer array 536a.

Ultrasonic ranging module 548, if implemented with Polaroid Model No. SN28827, is an active time-of-flight device developed for automatic camera focusing, and determines the range to target by measuring elapsed time between the transmission of a "chirp" of pulses and the detected echo. The "chirp" is of one millisecond duration and consists of four discrete frequencies transmitted back-to-back: 8 cycles at 60 kHz, 8 cycles at 56 kHz, 16 cycles at 52.5 kHz, and 24 cycles at 49.41 kHz.

To simplify the circuitry involved, all timing and time-to-distance conversions are done in software on processor 532. Three control lines are involved in the interface of the ultrasonic circuit board 548 to processor 532. The first of these, referred to as VSW, initiates operation when brought high to +5 volts. A second line labelled XLOG signals the start of pulse transmission, while the line labelled MFLOG indicates detection of the first echo. Processor 532 must therefore send VSW high, monitor the state of XLOG and commence timing when transmission begins (approximately 5 milliseconds later), and then poll MFLOG until an echo is detected or sufficient time elapses to indicate there is no echo.

Figure 5:
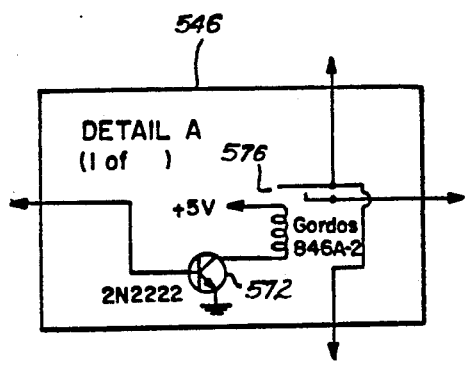
FIG. 5 is a schematic electrical diagram of the transducer switching relay (Detail A) of FIG. 4.
Figures 6, 7:
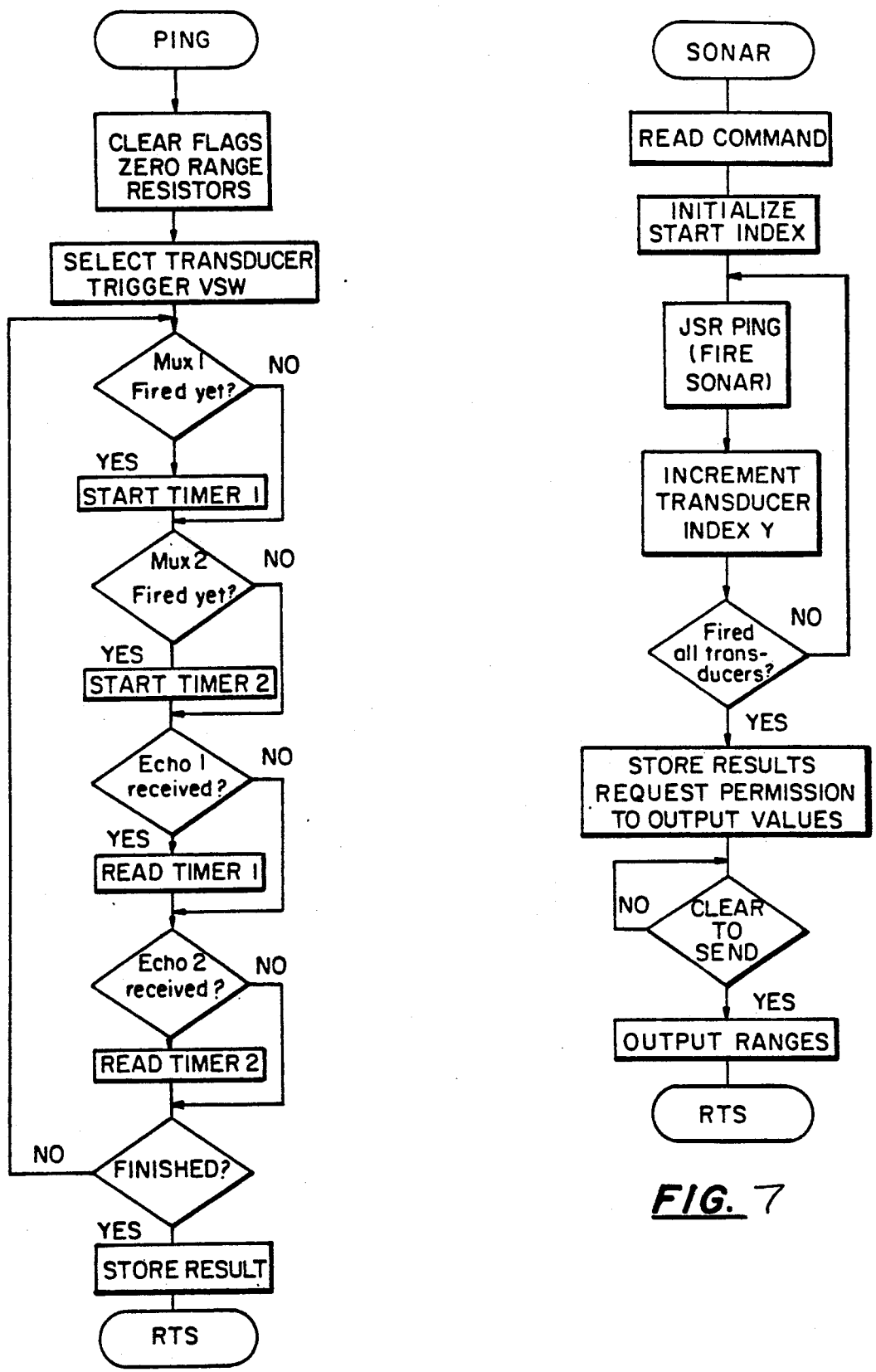

Four input/output (I/O) lines from processing unit 532 handle the switching function of ultrasonic transducers $536_i$ by activating a 4067 analog switch 544. The binary number placed on these I/O lines by the central processing unit 532 determines which channel is selected by switch 544; all other channels assume a high impedance state. Referring to FIG. 5, each of the relays 576 and its associated driver transistor 572 (illustrated in FIG. 4 as Detail A) is substantially identical and illustrated in detail in FIG. 4A. Relay driver transistor 572 is biased into conduction by current limiting resistor 543 via the active channel of analog switch 544 in such a fashion such that only one transistor 572 per switch 544 is conducting at any given time, as determined by the binary number present at the outputs of buffers 537, 538, 540, and 542. This conducting transistor 572 sinks current through its associated relay coil of relay 576, closing the contacts of relay 576. This action causes one of the transducers in array 536 to be connected to and hence driven by the ultrasonic ranging module 548, when ranging module 548 is activated by central processing unit 532 as described below.

Three I/O lines carry the logic inputs to processor 532 from the ranging module 548 for XLOG and MFLOG, and from processor 532 to the ranging module 548 for VSW. Non-inverting buffer 568 is used to trigger switching transistor 562 upon command from central processing unit 532 to initiate the firing sequence of ranging module 548. Resistors 558 and 560 along with transistor 561 form an inverting buffer for the XLOG signal which indicates the actual start of pulse transmission. Resistors 552 and 554 along with transistor 550 form an inverting buffer for the MFLOG signal which indicates detection of the echo. A final I/O line from processor 532 activates switch 533, shown in FIG. 3, to power down the circuitry when not in use to save battery power.

A second parallel port on processor 532 is used to receive commands from local processor 402 which tell processor 532 to power up the ranging units, and then, which sensors to sequentially activate. Commands may be in the form of an eight-bit binary number represented in hexadecimal format, where the upper nibble represents the starting ID and the lower nibble the ending ID for the sequence. For example, the command $1C can be used to activate and take ranges using sensors #1 through #12 sequentially. Each time through the loop, upon completion of the sequence, the stored ranges are transmitted up the hierarchy to the local processor 402 over an RS-232 serial link, with appropriate handshaking. The sequence is repeated in similar fashion until such time as the local processor 402 sends a new command down, or advises central processing unit 532 to power down the ranging subsystem with the special command $FF.

The software of processor 532 may, by way of example, be structured as shown in FIG.'s 6 and 7. When energized by the local processor 402, processor 532 does a power-on reset, initializes all ports and registers, and then waits for a command. When a command is latched into the I/O port, a flag is set automatically that alerts processor 532, which then reads the command and determines the starting and ending identities of the transducers 546 to be sequentially activated. The interface circuitry and ranging units are then powered up, via switch 533 (FIG. 3) and the Y Register is set to the value of the first transducer to be fired.

Continuing the example, Subroutine PING is then called, which enables the particular channel of analog switch 544 dictated by the contents of the Y Register. The VSW control line is sent high, which initiates operation of the ranging module 548 with the selected transducer. The software then watches the multiplexer output XLOG for indication of pulse transmission, before initiating the timing sequence. The contents of the timing counter, representing elapsed time, can be used to calculate range to the target. If this value ever exceeds the maximum specified range of the subsystem, the software will exit the loop, otherwise the counter runs until MFLOG is observed to go high, indicating echo detection. Upon exit from the timing loop, the range value for that particular transducer is saved in indexed storage, and Subroutine PING returns to the main program.

The Y Register is then incremented to enable the next ranging module in the sequence, and Subroutine PING is called again as before. This process is repeated until the Y Register equals the value of the ending index, signifying that all transducers in the sequence specified by the local processor 402 have been activated individually. Processor 532 then requests permission from the local processor 402 to transmit all the stored range values via the RS-232 serial link. When acknowledged, the ranges are sequentially dumped out the serial interface and placed by the local processor 402 in Page Zero indexed storage. Upon completion, processor 532 checks to see if a new command has been sent down altering the ranging sequence, and then repeats the process using the appropriate starting and ending indexes. Thus the software runs continuously in a repetitive fashion, sequentially activating the specified ranging modules, converting elapsed time to distance, storing the individual results, and then finally transmitting all range data at once to the local processor 402, which is thus freed from all associated overhead.

NAVIGATIONAL SONAR SUBSYSTEM

Navigational sonar subsystem 419a may be used to scan the environment in which vehicle 404 is to operate in order to provide data from which host computer 400 is able to initially construct the world model. Referring to FIG.'s 3-7, collectively, navigational sonar subsystem 419a includes processor 532, multiplexers 534b and 534c, and transducer arrays 536b and 536c. By way of example, transducer arrays 536b and 536c each may include twelve ultrasonic transducers which are mounted in a 360 degree circular pattern around the top of vehicle 404 as shown in FIG. 8. For purposes of reference, the twelve ultrasonic transducers of array 536b may be referenced as ultrasonic transducers $536_i$, where i=6 to 17; and the twelve ultrasonic transducers of array 536c may be referenced as ultrasonic transducers $536_i$, where i=18 to 29. All ultrasonic transducers $536_i$ may be of an identical type.

Navigational sonar subsystem 419a operates in a manner that is virtually identical to the way in which collision avoidance subsystem 419b operates. The only difference between the operations of the two subsystems is that navigational sonar subsystem 419a includes a total of 24 ultrasonic transducers whereas collision avoidance subsystem 419b employs five ultrasonic transducers. Furthermore, navigational sonar subsystem 419a may be employed to provide data from which the path planner (described above), which is implemented in host computer 400, may initially construct the world model, rather than provide data which is used by collision avoidance subsystem 419b to maintain the model and avoid obstacles. Therefore, it is to be understood that the descriptions of multiplexer 534a and transducer array 536a, illustrated and described with respect to FIG.'s 3-7, also apply to multiplexers 534b and 534c, and to transducers arrays 536b and 536c. Processor 532 interacts with multiplexers 534b and 534c in the same manner as processor 532 interacted with multiplexer 534a. Furthermore, the data generated by navigational sonar subsystem 419a is provided through local processor 402 to host computer 400. The programming of processor 532 that directs the operations of navigational sonar subsystem 419a also directs the operations of the navigational sonar subsystem 419a.

Operation of the Present Invention

The following operational scenario described below is an example of how the present invention may be employed in a manner whereby vehicle 404 is guided from an initial position at "point A" to a destination "point B" within a sample environment, as presented in FIG. 35. It is to be understood that the invention may be used in environments other than that specifically described with reference to FIG. 35.

Referring to FIG. 35, vehicle 404 is initially positioned at point A in room 101 of building F-36. The Cartesian coordinates of freeway guidepath stripes 910 (running east-west) and 911 (running north-south), and doorway guidepath stripes 913 of the type previously described with reference to FIG. 32 are encoded in the world planner, as unique predesignated cell values, described with reference to FIG. 12. Freeways 910 and 911, and doorway guidepath stripes 913 are chemical guidepath stripes of the type described with reference to FIG. 26 that are applied to the floor of building F-36. Host computer 400 is tasked with directing vehicle 404 from its current position A in room 101 to point J in room 108, and then back again to the starting point A.

The path planner initiates an A* search originating at point A that expands in the general direction of the destination point J. As the expansion routine encounters encoded cell values corresponding to doorway guidepath stripe 913, located just southwest of point B, the A* search reacts to the zero cost associated with such guidepath stripes, and the resulting calculated path segment is made to precisely overlay the location of this doorway guidepath stripe 913. Upon reaching the end of this stripe, the expansion routine continues to point C, where a change in calculated path direction takes place as influenced by the lower perceived cost associated with expansion north towards the destination point J.

This expansion continues until the unique cell values within the model corresponding to east-west freeway guidepath stripe 910 are encountered, whereupon the expansion routine follows the zero-cost freeway point G. The A* search continues in this fashion to the cell values corresponding to doorway guidepath stripe 913 at point H, and then to point I in Room 108. The program then determines the most direct path to the cell corresponding to destination point J. The path planner then backtracks along this search route to create the list of path segments which describe the resultant found path. Appropriate movement commands are then generated by host computer 400, and the first of these is downloaded via the RF link, consisting of transceivers 406 and 408, and antennas 410 and 412, to local processor 402 onboard vehicle 404.

Upon receipt of this move command, local processor 402 directs propulsion module 416 to move forward at a specified velocity for a specified distance calculated by the path planner so as to position vehicle 404 at point B. Propulsion module 416, in responding to this command, begins to periodically pass updated heading as well as X-Y position data calculated by its onboard dead reckoning software to local processor 402. Local processor 402 next instructs sonar subsystem 419b to fire the center five transducers $536_i$ (where i=1 to 5) in collision avoidance array 536a in a continuously repetitive fashion, and return the corresponding range readings after each firing to local processor 402. Local processor 402 examines the ranges for a specified minimum value indicative of a potential collision, and issues a halt command to processor 417 of propulsion module 416 in the event that such a condition is found to exist. Local processor 402 relays all sonar range readings and their associated dead-reckoning X-Y and $\Theta$ parameters to host computer 400 for subsequent entry of vehicle 404 and/or obstacle location information into the world model. This process continues until such time as propulsion module 416 has moved the specified distance, whereupon local processor 402 then informs the host computer 400 that the ordered move has been completed.

At this time, host computer 400 issues the next move command, which instructs local processor 402 to position vehicle 404 to the desired new heading, as dictated by the orientation of the next path segment BC. Local processor 402 passes this command to processor 417, whereby propulsion module 416 begins to rotate in place at point B to the commanded orientation, passing periodic dead-reckoning update information to local processor 402 during the course of this action. Local processor 402 relays this information to host computer 400, and informs host computer 400 when the move is complete. Host computer 400 then downloads the next path segment move command, which tells local processor 402 how far to travel along path segment BC, and in addition, informs local processor 402 that the current segment BC contains a guidepath stripe 913 to assist vehicle 404 in achieving doorway penetration. Local processor 402 issues the move command to processor 417, and then activates stripe follower subsystem 415 of guidepath tracking subsystem 414. Local processor 402 also instructs stripe follower subsystem 415 to enter the "stripe acquisition" mode, and provides data to processor 20 of stripe follower subsystem 415 that propulsion module 416 is moving in the forward direction. Processor 20 of stripe follower subsystem 415 thus receives a command from local processor 402 to activate the forward camera 704 and its corresponding ultraviolet light sources 706. Processor 20 informs local processor 402 of stripe lateral offset and orientation when guidepath stripe 913 has been detected. Local processor 402 then switches stripe follower subsystem 415 through processor 20 to the "stripe following" mode, and relays stripe position parameters, as well as sonar range and dead-reckoning updates, to host computer 400.

Local processor 402 monitors the lateral position of the stripe, and adjusts the direction of travel accordingly by way of heading adjustment commands to processor 417 of propulsion module 416, so as to keep the stripe centered within the field of view of activated camera 704. When vehicle 404 is positioned such that the stripe is centered in the field of view of the tracking camera 704 of stripe follower subsystem 415, local processor 402 resets the perceived vehicle heading $\Theta$ to the known orientation of the doorway guidepath stripe 913, and perceived lateral position of vehicle 404 to the known position of the doorway guidepath stripe 913. Upon receipt of a displacement marker report from stripe follower subsystem 415, local processor 402 also resets the perceived longitudinal position coordinate to the known position of the marker 352, as described with reference to FIG. 32. In this fashion, dead-reckoning errors accumulated while traversing path segment BC are canceled as the vehicle's perceived X-Y and Θ parameters are reset to the known parameters of the stripe. When the doorway guidepath stripe 913 ends, stripe follower subsystem 415 so informs the local processor 402. Local processor 402 then shuts off stripe follower subsystem 415, and no further adjustments are made to vehicle heading for the duration of the current move. Local processor 402 informs host computer 400 when vehicle 404 arrives at point C. Host computer 400 then downloads the required turn information in order to bring vehicle 404 to the appropriate heading for traversal of path segment CDEF.

Segment CDEF is executed in similar fashion, with the local processor 402 activating stripe follower subsystem 415 at the appropriate time in the vicinity of point D so as to detect the doorway guidepath stripe 913 at position D. Accumulated dead-reckoning errors are again eliminated as local processor 402 resets onboard position and heading parameters to those of the stripe, and relays this information to host computer 400. Upon termination of doorway guidepath stripe 913 at point E, stripe follower subsystem 415 is shut down, whereby propulsion module 416 operates under dead-reckoning control for the remaining distance to point F.

Local processor 402 next turns vehicle 404 to the new heading provided by host computer 400 at point F so as to traverse the east-west freeway 910 along path segment FG. The guidepath tracking system is again activated, and the freeway stripe acquired. Local processor 402 then switches to the reflexive control mode, and issues heading correction commands to processor 417 of propulsion module 416 based on the output of stripe follower subsystem 415, so as to precisely guide vehicle 404 along freeway guidepath stripe 910. Lateral position and heading are reset to the known values associated with freeway 910, and longitudinal position is updated each time a longitudinal displacement marker 308, as shown in FIG. 31, is encountered (every three feet in the preferred embodiment). Upon reaching point G, stripe following subsystem 415 is deactivated, and local processor 402 informs host computer 400 that the current move is completed.

This process of switching periodically to reflexive control for purposes of updating the dead reckoning position is repeated as described until the robot reaches the destination, point J. If so desired, host computer 400 can then direct vehicle 404 to return to the starting position A, and a similar procedure, as described above, would be implemented in order for vehicle 404 to be guided back to room 101. One of the important features of the present invention is that after executing this example of a round trip, described with reference to FIG. 35, the accumulated dead reckoning error at point A would be only that which accrued from point B to point A, a distance of about 4 feet. Under a conventional dead reckoning approach, the dead-reckoning error would have accumulated over the entire route (ABCDEFGHIJ) and back (JIHGFEDCBA). This latter distance of approximately 130 feet would probably exceed the acceptable limits for an uncorrected dead reckoning move, in that approximate dead-reckoning accuracies for common propulsion subsystems are on the order of 99.5% of distance travelled.

Of course, the present invention may be employed to direct and guide vehicle 404 from any initial point to any destination point within an operating environment.

Obviously, many modifications and variations of the present invention are possible in light of the above teachings. It is therefore to be understood that within the scope of the appended claims, the invention may be practiced otherwise than as specifically described.

We claim:

1. A navigational control system for directing an autonomous vehicle to travel along a generally planar surface, such as a floor, from a first location to a destination within an operating environment, comprising:

an autonomous vehicle including a self-propelled and steerable propulsion module providing position signals corresponding to a dead-reckoning determination of a position and bearing of said module with respect to a reference position;

at least one long, narrow guidepath stripe applied to said surface of said environment to define a desired pathway having predetermined coordinates along which said module may be selectively guided, said guidepath stripe encoded with a plurality of displacement markers positioned at predetermined intervals along the length of said guidepath stripe, said markers having predetermined coordinates;

stripe detecting means mounted to said module for detecting said guidepath stripe and said displacement markers, and for providing recognition signals when said stripe detecting means detects said guidepath stripe and for providing recognition signals when said guidepath stripe detection means detects one of said displacement markers;

ranging means mounted to said module for measuring the range between said module and any object and for providing range signals corresponding to said measured range; and processing means for determining an optimal path for said module to follow to said destination, said processing means: coupled to receive said position signals for monitoring said dead-reckoning determined position of said module along said path; coupled to receive said range signals for revising said path in order to avoid an obstacle blocking said path; and coupled to receive said recognition signals for revising said dead-reckoning position of said module into an updated position; said processing means for revising said optimal path in response to said updated position; and for providing navigational control signals to guide said module along said optimal path.

2. The navigational control system of claim 1 wherein:

said processing means maintains a mathematical model of said operating environment and updates said updated position determination of said module within said model in real-time.

3. The navigational control system of claim 2 wherein:

said path has coordinates encoded within said mathematical model; and said module is directed to follow at least some portion of said guidepath stripe when at least some portion of said guidepath stripe is oriented in a general direction of an intended path.

4. The navigational control system of claim 3 wherein:

said ranging means includes a plurality of ultrasonic transducers.

5. The navigational control system of claim 4 wherein:
said guidepath stripe detecting means includes:
at least one video camera mounted to said module such that said lens is directed to towards said floor for providing a video signal corresponding to detection of said guidepath stripe,
at least one light source mounted to said module and directed to illuminate said guidepath stripe, and
digitizing means mounted to said module and coupled to receive said video signal for providing said recognition output to said processing means.

6. The navigational control system of claim 5 wherein:
said guidepath stripe is made of a material that is invisible under ambient lighting conditions and fluoresces when irradiated with ultraviolet light; and
said displacement markers are areas of said material having a predetermined shape that are applied contiguous to the edge of said guidepath stripe at said predetermined intervals along the length of said guidepath stripe so as to produce recognizable discontinuity patterns along the edge of said guidepath stripe.

7. The navigational control system of claim 6 wherein:
said processing means is a host computer that includes programming that represents said mathematical model of said environment, said model includes parameters of Cartesian coordinates of permanent features of said environment and said coordinates of said guidepath stripe, said host computer determines said initial optimum and revised paths by using a path-planning algorithm operating within the context of said parameters.

8. The navigational control system of claim 7 wherein:
said digitizing means is a video line digitizer.

9. A navigational control system for directing an autonomous vehicle to travel along a generally planar surface, such as a floor, from a first location to a destination within an operating environment, comprising:
an autonomous vehicle including a self-propelled and steerable propulsion module providing position signals corresponding to a dead-reckoning determination of a position and bearing of said module with respect to a reference position;
at least one long, narrow guidepath stripe of reflective material applied to said surface of said environment to define a desired pathway having predetermined coordinates along which said module may be selectively guided, said guidepath stripe encoded with a plurality of displacement markers positioned at predetermined intervals along the length of said guidepath stripe, said markers having predetermined coordinates, said guidepath stripe contrasting with said floor;
stripe detecting means mounted to said module for detecting said guidepath stripe and said displacement markers, and for providing recognition signals when said stripe detecting means detects said guidepath stripe and for providing recognition signals when said guidepath stripe detection means detects one of said displacement markers;
ranging means mounted to said module for measuring the range between said module and any object and for providing range signals corresponding to said measured range; and
processing means for determining an optimal path for said module to follow to said destination, said processing means: coupled to receive said position signals for monitoring said dead-reckoning determined position of said module along said path; coupled to receive said range signals for revising said path in order to avoid an obstacle blocking said path; and coupled to receive said recognition signals for revising said dead-reckoning position of said module into an updated position; said processing means for revising said optimal path in response to said updated position; and for providing navigational control signals to guide said module along said optimal path.

10. The navigational control system of claim 9 wherein:
said processing means maintains a mathematical model of said operating environment and updates said updated position determination of said module within said model in real-time.

11. The navigational control system of claim 10 wherein:
said path has coordinates encoded within said mathematical model; and
said module is directed to follow at least some portion of said guidepath stripe when at least some portion of said guidepath stripe is oriented in a general direction of an intended path.

12. The navigational control system of claim 11 wherein:
said ranging means includes a plurality of ultrasonic transducers.

13. The navigational control system of claim 11 wherein:
said stripe detecting means includes:
at least one video camera mounted to said module such that
said lens is directed to towards said floor for providing a video signal corresponding to detection of said guidepath stripe,
at least one light source mounted to said module and directed to illuminate said guidepath stripe, and
digitizing means mounted to said module and operably coupled to receive said video signal for providing said recognition output to said processing means.

14. The navigational control system of claim 13 wherein:
said displacement markers are areas of said guidepath material having a predetermined shape that are applied contiguous to the edge of said guidepath stripe at said predetermined intervals along the length of said guidepath stripe so as to produce recognizable discontinuity patterns along the edge of said guidepath stripe.

15. The navigational control system of claim 14 wherein:
said processing means is a host computer that includes programming that represents said mathematical model of said environment, said model includes parameters of Cartesian coordinates of permanent features of said environment and said coordinates of said guidepath stripe, said host computer determines said initial optimum and revised paths by using a path-planning algorithm operating within the context of said parameters.

16. The navigational control system of claim 15 wherein:
said digitizing means is a video line digitizer.

17. A navigational control system for directing an autonomous vehicle to travel along a generally planar surface, such as a floor, from a first location to a destination within an operating environment, comprising:
an autonomous vehicle including a self-propelled and steerable propulsion module providing position signals corresponding to a dead-reckoning determination of a position and bearing of said module with respect to a reference position;
at least one long, narrow guidepath stripe applied to said surface of said environment to define a desired pathway having predetermined coordinates along which said module may be selectively guided, said guidepath stripe encoded with a plurality of displacement markers positioned at predetermined intervals along the length of said guidepath stripe, said markers having predetermined coordinates, said guidepath stripe is invisible when irradiated with visible light and fluoresces when irradiated with ultraviolet light;
stripe detecting means mounted to said module for detecting said guidepath stripe and said displacement markers, and for providing recognition signals when said stripe detecting means detects said guidepath stripe and for providing recognition signals when said guidepath stripe detection means detects one of said displacement markers;
ranging means mounted to said module for measuring the range between said module and any object and for providing range signals corresponding to said measured range; and
processing means for determining an optimal path for said module to follow to said destination, said processing means: coupled to receive said position signals for monitoring said dead-reckoning determined position of said module along said path; coupled to receive said range signals for revising said path in order to avoid an obstacle blocking said path; and coupled to receive said recognition signals for revising said dead-reckoning position of said module into an updated position; said updated position functionally related to said position encoded in said position signals and to said position corresponding to said location associated with said recognition signals; said processor means for revising said optimal path in response to said updated position; and for providing navigational control signals to guide said module along said optimal path.

18. The navigational control system of claim 17 wherein:
said processing means maintains a mathematical model of said operating environment and updates said updated position determination of said module within said model in real-time.

19. The navigational control system of claim 18 wherein:
said path has coordinates encoded within said mathematical model; and
said module is directed to follow at least some portion of said guidepath stripe when at least some portion of said guidepath stripe is oriented in a general direction of an intended path.

20. The navigational control system of claim 19 wherein:
said ranging means includes a plurality of ultrasonic transducers.

21. The navigational control system of claim 20 wherein:
said stripe detecting means includes:
at least one video camera mounted to said module such that said lens is directed to towards said floor for providing a video signal corresponding to detection of said guidepath stripe,
at least one ultraviolet light source mounted to said module and directed to illuminate said guidepath stripe, and
digitizing means mounted to said module and coupled to receive said video signal for providing said recognition output to said processing means.

22. The navigational control system of claim 21 wherein:
said guidepath stripe is made of a material that is invisible under ambient lighting conditions and fluoresces when irradiated with ultraviolet light; and
said displacement markers are areas of said material having a predetermined shape that are applied contiguous to the edge of said guidepath stripe at said predetermined intervals along the length of said guidepath stripe so as to produce recognizable discontinuity patterns along the edge of said guidepath stripe.

23. The navigational control system of claim 22 wherein:
said processing means is a host computer that includes programming that represents said mathematical model of said environment, said model includes parameters of Cartesian coordinates of permanent features of said environment and said coordinates of said guidepath stripe, said host computer determines said initial optimum and revised paths by using a path-planning algorithm operating within the context of said parameters.

* * * * *